(12) United States Patent
Niwano

(10) Patent No.: US 9,131,456 B2
(45) Date of Patent: *Sep. 8, 2015

(54) TRANSMISSION CONTROL METHOD, MOBILE STATION, AND COMMUNICATION SYSTEM

(75) Inventor: Kazuhito Niwano, Tokyo (JP)

(73) Assignee: BlackBerry Limited, Waterloo, Ontario (CA)

( * ) Notice: Subject to any disclaimer, the term of this patent is extended or adjusted under 35 U.S.C. 154(b) by 274 days.

This patent is subject to a terminal disclaimer.

(21) Appl. No.: 13/618,438

(22) Filed: Sep. 14, 2012

(65) Prior Publication Data

US 2013/0022028 A1  Jan. 24, 2013

Related U.S. Application Data

(63) Continuation of application No. 11/814,967, filed as application No. PCT/JP2005/006360 on Mar. 31, 2005, now Pat. No. 8,320,307.

(30) Foreign Application Priority Data

Feb. 1, 2005  (JP) .................. 2005/001414

(51) Int. Cl.
| | | |
|---|---|---|
| H04B 7/216 | (2006.01) | |
| H04W 52/34 | (2009.01) | |
| H04W 52/28 | (2009.01) | |
| H04W 52/14 | (2009.01) | |

(52) U.S. Cl.
CPC .......... *H04W 52/346* (2013.01); *H04W 52/286* (2013.01); *H04W 52/146* (2013.01)

(58) Field of Classification Search
CPC .......................... H04W 52/265; H04W 52/286
USPC ........................................... 370/335
See application file for complete search history.

(56) References Cited

U.S. PATENT DOCUMENTS

| | | | | |
|---|---|---|---|---|
| 6,708,041 | B1 * | 3/2004 | Butovitsch et al. | 455/522 |
| 6,735,447 | B1 * | 5/2004 | Muller | 455/522 |
| 7,161,916 | B2 | 1/2007 | Malladi et al. | |
| 7,215,655 | B2 * | 5/2007 | Zhang et al. | 370/320 |
| 7,596,122 | B2 | 9/2009 | Han et al. | |
| 8,885,611 | B2 * | 11/2014 | Mella et al. | 370/332 |
| 2005/0047416 | A1 | 3/2005 | Heo et al. | |
| 2005/0169293 | A1 * | 8/2005 | Zhang et al. | 370/437 |

(Continued)

FOREIGN PATENT DOCUMENTS

| | | |
|---|---|---|
| JP | 2004 215276 | 7/2004 |
| JP | 2004 521526 | 7/2004 |

OTHER PUBLICATIONS

Infineon, "Considerations on e-TFC selection principles", Nov. 15, 2004, 3GPP TSG-RAN WG2 Meeting #45, pp. 1-2.*

(Continued)

*Primary Examiner* — Guang Li
(74) *Attorney, Agent, or Firm* — Fish & Richardson P.C.

(57) ABSTRACT

A transmission control method includes a step of selecting transmission control information according to a combination of user data transmitted, via a transport channel, from an upper layer, and a step of transmitting the transmission control information, as well as a physical channel into which two or more transport channels are multiplexed, to a fixed station, the transmission control information including at least transmit power information.

15 Claims, 25 Drawing Sheets

(56) References Cited

U.S. PATENT DOCUMENTS

| | | | |
|---|---|---|---|
| 2005/0220042 A1 | 10/2005 | Chang et al. | |
| 2006/0013268 A1 | 1/2006 | Terry | |
| 2006/0023628 A1 | 2/2006 | Uehara et al. | |
| 2006/0268821 A1* | 11/2006 | Terry | 370/349 |
| 2006/0268938 A1 | 11/2006 | Terry | |
| 2007/0115871 A1* | 5/2007 | Zhang et al. | 370/318 |
| 2007/0140179 A1* | 6/2007 | Zhang et al. | 370/335 |
| 2007/0168827 A1 | 7/2007 | Lohr et al. | |

OTHER PUBLICATIONS

"3rd Generation Partnership Project; Technical Specification Group Radio Access Network; User Equipment (UE) Radio Transmission and Reception (FOO) (Release 5)" 3GPP TS 25.101 V5.12.0, pp. 1-14, 2004.

"E-TFC Selection" (Panasonic) 3GPP TSG-RAN WG 2 #45bis Meeting, R2-050065, Sophia Antipolis, France, 2005.

"On E-DCH TFC Selection", (NEC) 3GPP TSG-RAN Working Group 1 #38bis, R1-04-1131, Seoul, Korea, 2004.

3GPP TS 25.101 V5.12.0, 3rd Generation Partnership Project; Technical Specification Group Radio Access Network; User Equipment (UE) Radio Transmission and Reception (FDD) (Releases), Technical Specification, pp. 1-101, 2004.

3GPP TS 25.133 V5.12.0, "3rd Generation Partnership Project; Technical Specification Group Radio Access Network; Requirements for Support of Radio Resource Management (FDD) (Release)", Technical Specification, pp. 1-171, 2004.

3GPP TS 25.309 V6.1.0, "3rd Generation Partnership Project; Technical Specification Group Radio Access Network; FDD Enhanced Uplink; Overall Description; Stage 2 (Release 6)", Technical Specification, pp. 1-26, 2004.

3GPP TS 25.321 V5.9.0, 3rd Generation Partnership Project; Technical Specification Group Radio Access Network; Medium Access Control (MAC) Protocol Specification (Release 5), Technical Specification, pp. 1-61, 2004.

3GPP TSG-RAN WG2 Meeting #44, "E-DCH-TFC Selection", Siemens, Sophia Antipolis, France, R2-042121, 2004.

3GPP TSG-RAN WG2 Meeting #45, "Considerations on E-TFC Selection Principles", TDOC R2-042447, 2004.

3GPP TSG-RAN WG2 Meeting #45bis, "TFC Selection Scheme AZ Details", Qualcomm, Sophia Antipolis, France, R2-050177, 2005.

Chinese Patent Office Communication for Chinese Patent Application No. 200580047615.9, dated May 30, 2012 (3 pages).

International Preliminary Report on Patentability in International Application No. PCT/JP2005/006360, dated mailed on Aug. 7, 2007, 14 pages (with translation).

International Search Report and Written Opinion in International Application No. PCT/JP2005/006363, dated Jul. 19, 2005, 18 pages (with translation).

On E-TFC Selection Scheme, (Mitsubishi Electric), 3GPP TSG-RAN WG2 Meeting #46, R2-050387, 2005.

TSG-RAN Working Group2 #45bis, "Remaining Power vs. HS-DPCCH Power", NEC, Sophia Antipolis, France, 2005.

Motorola; "E-TFC Selection"; TSG-RAN WG2 Meeting #45bis (R2-050122); Sophia-Antipolis, France; Jan. 10-14, 2005; 3 pages.

Motorola; "PAR and PA Back-Off Issues Related to the HS-DPCCH"; 3GPP RAN1 Adhoc (R1-040013); Espoo, Finland; Jan. 27-30, 2004; 4 pages.

Panasonic; "An Approach to Reduce PAR Impact in EUDTCH"; 3GPP TSG RAN WG1 Ad Hoc Meeting (R1-040093); Espoo, Finland; Jan. 27-30, 2004; 2 pages.

Supplementary European Search Report in European Application No. 05727607.3, dated May 29, 2015,.

* cited by examiner (a)

| E-TFC(I) | TBS (bit) | $\beta eu(/\beta c)$ |
|---|---|---|
| 0 | 0 | 0 |
| ... | ... | ... |
| $2^N-1$ | X | Y |

(b)

| E-TFC(I) | TBS (bit) | $\Delta$ Poffset |
|---|---|---|
| 0 | 0 | 0 |
| ... | ... | ... |
| $2^N-1$ | X | Y |

FIG. 11

Transport Channel Parameters (Conversation/Sound/12.2Kbps for Uplinks)/Circuit Switch RAB

| Upper Layer | Radio Access Bearer (RAB)/ Signaling Radio Bearer | | High Order Data 1 | High Order Data 2 | High Order Data 3 |
|---|---|---|---|---|---|
| RLC Layer | Logic Channel Type | | DTCH | | |
| | RLC Mode | | TM | TM | TM |
| | Payload Size, bit | | 39,81(alt.0, 39, 81) | 103 | 60 |
| | Maximum Data Rate, bps | | 12200 | | |
| | TrD PDU Header, bit | | 0 | | |
| MAC Layer | MAC Header, bit | | 0 | | |
| | MAC Multiplexing | | N/A | | |
| Layer 1 | Transport Channel Type | | E-DCH | E-DCH | E-DCH |
| | TB Size, bit | | 39,81(alt.0, 39, 81) | 103 | 60 |
| | Transport Format Set (TFS) | TF0, bits | 0x81(alt.0,1x0)(note) | 0x103 | 0x60 |
| | | TF1, bits | 1x39 | 1x103 | 1x60 |
| | | TF2, bits | 1x81 | N/A | N/A |
| | TTI, ms | | 20 | 20 | 20 |
| | Coding Type | | CC 1/3 | CC 1/3 | CC 1/2 |
| | CRC, bit | | 12 | N/A | N/A |
| | Maximum Bit Number After Coded | | 303 | 333 | 136 |
| | Uplink Maximum Bit Number Before Rate Matching/Frame | | 152 | 167 | 68 |
| | Rate Matching Attribute | | 180-220 | 170-210 | 215-256 |
| | Power Offset | | 1-2 | 2-3 | 3-3 |
| | Maximum Transmission Number | | 5 | 5 | 5 |

Transport Channel Parameter (Uplink: 3.4Kbps SRB for DCCH)

| Upper Layer | Radio Access Bearer (RAB)/Signaling Radio Bearer | | SRB#1 | SRB#2 | SRB#3 | SRB#4 |
|---|---|---|---|---|---|---|
| | Radio Bearer User | | RRC | RRC | NAS_DT High prio | NAS_DT Low prio |
| RLC Layer | Logic Channel Type | | DCCH | DCCH | DCCH | DCCH |
| | RLC Mode | | UM | AM | AM | AM |
| | Payload Size, bit | | 136 | 128 | 128 | 128 |
| | Maximum Data Rate, bps | | 3400 | 3200 | 3200 | 3200 |
| | AMD/UMD/PDU Header, bit | | 8 | 16 | 16 | 16 |
| MAC Layer | MAC headerbit | | 4 | 4 | 4 | 4 |
| | MAC Multiplexing | | Multiplexing Of Four Logical Channels | | | |
| Layer 1 | Transport Channel Type | | E-DCH | | | |
| | TB Size, bit | | 148(alt.0, 148) | | | |
| | Transport Format Set (TFS) | TF0, bits | 0x148(alt 1x0) | | | |
| | | TF1, bits | 1x148 | | | |
| | TTI, ms | | 40 | | | |
| | Coding Type | | CC 1/3 | | | |
| | CRC, bit | | 16 | | | |
| | Maximum Bit Number After Coded/TTI | | 516 | | | |
| | Uplink Maximum Bit Number Before Rate Matching/Frame | | 129 | | | |
| | Rate Matching Attribute | | 155-185 | | | |

TFCS

| TFCS Size | 6 |
|---|---|
| TFCS | (RAB subflow#1, RAB subflow#2, RAB subflow#3, DCCH)= (TF0, TF0, TF0, TF0), (TF1, TF0, TF0, TF0), (TF2, TF1, TF1, TF0), (TF0, TF0, TF0, TF1), (TF1, TF0, TF0, TF1), (TF2, TF1, TF1, TF1) |

(a) Transition Among States of Each E-TFC (Three States)

(b) E-TFC Concept

| E-TFCI | State |
|--------|-------|
| 0 | Supported State |
| 1 | Supported State | ← E-TFC, Min Setting
| 2 | Supported State |
| : | Excess-Power State | ← Setting to Excess-Power State According to Transmit Power Margin
| : | Excess-Power State |
| : | Blocked State | ← Setting to Blocked State According to Scheduling Result
| : | Blocked State |
| $2^N-1$ | Blocked State |

FIG. 18

Transport Channel Parameter (Conversation/Sound/12.2Kbps for Uplinks)/Circuit Switch RAB

| Upper Layer | Radio Access Bearer (RAB)/ Signaling Radio Bearer(SRB) | | High Order Data 1 | High Order Data 2 | High Order Data 3 |
|---|---|---|---|---|---|
| RLC Layer | Logic Channel Type | | DTCH | | |
| | RLC Mode | | TM | TM | TM |
| | Payload Size, bit | | 39, 81(alt.0, 39, 81) | 103 | 60 |
| | Maximum Data Rate, bps | | 12200 | | |
| | TrD PDU Header, bit | | 0 | | |
| MAC Layer | MAC Header, bit | | 0 | | |
| | MAC Multiplexing | | N/A | | |
| | Power Offset, dB | | 1-2 | | |
| | Maximum Transmission Frequency | | 5 | | |
| | Transport Channel Type | | E-DCH | E-DCH | E-DCH |
| | TB Size, bit | | 39, 81(alt.0, 39, 81) | 103 | 60 |
| | Transport Format Set (TFS) | TF0, bits | 0x81(alt.0 1x0)(note) | 0x103 | 0x60 |
| | | TF1, bits | 1x39 | 1x103 | 1x60 |
| | | TF2, bits | 1x81 | N/A | N/A |
| | TTI, ms | | 20 | 20 | 20 |
| | Coding Type | | CC 1/3 | CC 1/3 | CC 1/2 |
| | CRC, bit | | 12 | N/A | N/A |
| | Maximum Bit Number After Coded/TTI | | 303 | 333 | 136 |
| | Uplink Maximum Bit Number Before Rate Matching/Frame | | 152 | 167 | 68 |
| | Rate Matching Attribute | | 180-220 | 170-210 | 215-256 |

Transport Channel Parameters (Uplink: 3.4Kbps SRB for DCCH)

| Upper Layer | Radio Access Bearer (RAB)/ Signaling Radio Bearer(SRB) | | SRB#1 | SRB#2 | SRB#3 | SRB#4 |
|---|---|---|---|---|---|---|
| | Radio Bearer User | | RRC | RRC | NAS_DT High prio | NAS_DT Low prio |
| RLC Layer | Logic Channel Type | | DCCH | DCCH | DCCH | DCCH |
| | RLC Mode | | UM | AM | AM | AM |
| | Payload Size, bit | | 136 | 128 | 128 | 128 |
| | Maximum Data Rate, bps | | 3400 | 3200 | 3200 | 3200 |
| | AMD/UMD/PDU Header, bit | | 8 | 16 | 16 | 16 |
| MAC Layer | MAC Header, bit | | 4 | 4 | 4 | 4 |
| | MAC Multiplexing | | Multiplexing of Four Logical Channels | | | |
| | Power Offset, dB | | 2-3 | | | |
| | Maximum Transmission Frequency | | 5 | | | |
| Layer 1 | Transport Channel Type | | E-DCH | | | |
| | TB Size, bit | | 148(alt 0, 148) | | | |
| | Transport Format Set (TFS) | TF0, bits | 0x148(alt 1x0) | | | |
| | | TF1, bits | 1x148 | | | |
| | TTI, ms | | 40 | | | |
| | Coding Type | | CC 1/3 | | | |
| | CRC, bit | | 16 | | | |
| | Maximum Bit Number After Coded/TTI | | 516 | | | |
| | Uplink Maximum Bit Number Before Rate Matching/Frame | | 129 | | | |
| | Rate Matching Attribute | | 155-185 | | | |

TFCS

| TFCSsize | 6 |
|---|---|
| TFCS | (RAB subflow#1, RAB subflow#2, RAB subflow#3, DCCH, power offset)= (TF0, TF0, TF0, TF0, 0), (TF1, TF0, TF0, TF0, 1), (TF2, TF1, TF1, TF0, 2), (TF0, TF0, TF0, TF1, 3), (TF1, TF0, TF0, TF1, 3), (TF2, TF1, TF1, TF1, 3) |

FIG. 19

Transport Channel Parameter (Conversation/Sound/12.2Kbps for Uplinks)/Circuit Switch RAB

| Upper Layer | Radio Access Bearer (RAB)/ Signaling Radio Bearer(SRB) | | High Order Data 1 | High Order Data 2 | High Order Data 3 |
|---|---|---|---|---|---|
| RLC Layer | Logic Channel Type | | DTCH | | |
| | RLC Mode | | TM | TM | TM |
| | Payload Size, bit | | 39, 81(alt.0, 39, 81) | 103 | 60 |
| | Maximum Data Rate, bps | | 12200 | | |
| | TrD Header, bit | | 0 | | |
| MAC Layer | MAC Header, bit | | 0 | | |
| | MAC Multiplexing | | N/A | | |
| | Transport Channel Type | | E-DCH | E-DCH | E-DCH |
| | TB Size, bit | | 39, 81(alt.0, 39, 81) | 103 | 60 |
| | Transport Format Set (TFS) | TF0, bits | 0x81(alt.0|0x0)(note) | 0x103 | 0x60 |
| | | TF1, bits | 1x39 | 1x103 | 1x60 |
| | | TF2, bits | 1x81 | N/A | N/A |
| | TTI, ms | | 20 | 20 | 20 |
| | Coding Type | | CC 1/3 | CC 1/3 | CC 1/2 |
| | CRC, bit | | 12 | N/A | N/A |
| | Maximum Bit Number After Coded/TTI | | 303 | 333 | 136 |
| | Uplink Maximum Bit Number Before Rate Matching/Frame | | 152 | 167 | 68 |
| | Rate Matching Attribute | | 180-220 | 170-210 | 215-256 |

Transport Channel Parameter (Uplink: 3.4Kbps SRB For DCCH)

| Upper Layer | Radio Access Bearer (RAB)/ Signaling Radio Bearer(SRB) | | SRB#1 | SRB#2 | SRB#3 | SRB#4 |
|---|---|---|---|---|---|---|
| | Radio Bearer User | | RRC | RRC | NAS_DT High prio | NAS_DT Low prio |
| RLC Layer | Logic Channel Type | | DCCH | DCCH | DCCH | DCCH |
| | RLC Mode | | UM | AM | AM | AM |
| | Payload Size, bit | | 136 | 128 | 128 | 128 |
| | Maximum Data Rate, bps | | 3400 | 3200 | 3200 | 3200 |
| | AMD/UMD/PDU Header, bit | | 8 | 16 | 16 | 16 |
| MAC Layer | MAC Header, bit | | 4 | 4 | 4 | 4 |
| | MAC Multiplexing | | Multiplexing Of Four Logical Channels | | | |
| Layer1 | Transport Channel Type | | E-DCH | | | |
| | TB Size, bit | | 148(alt 0, 148) | | | |
| | Transport Format Set (TFS) | TF0, bits | 0x148(alt 1x0) | | | |
| | | TF1, bits | 1x148 | | | |
| | TTI, ms | | 40 | | | |
| | Coding Type | | CC 1/3 | | | |
| | CRC, bit | | 16 | | | |
| | Maximum Bit Number After Coded/TTI | | 516 | | | |
| | Uplink Maximum Bit Number Before Rate Matching/Frame | | 129 | | | |
| | Rate Matching Attribute | | 155-185 | | | |

TFCS

| TFCSsize | 6 |
|---|---|
| TFCS | (RAB subflow#1, RAB subflow#2, RAB subflow#3, DCCH)= (TF0, TF0, TF0, TF0), (TF1, TF0, TF0, TF0), (TF2, TF1, TF1, TF0), (TF0, TF0, TF0, TF1), (TF1, TF0, TF0, TF1), (TF2, TF1, TF1, TF1) |
| Power Offset, dB | 2-3 |
| Maximum Transmission Frequency | 5 |

(a) Transition Among States Of Each E-TFC (Two States) FIG.20

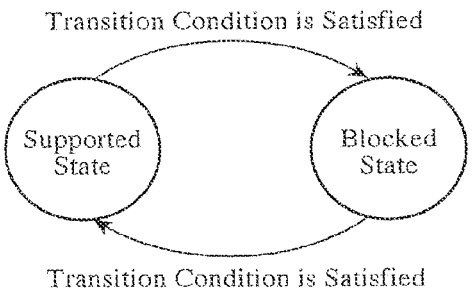

Transition Condition is Satisfied (top)
Transition Condition is Satisfied (bottom)

(b) E-TFC Concept

| E-TFCI | State |
|---|---|
| 0 | Supported State |
| 1 | Supported State | ← E-TFC, Min Setting
| 2 | Supported State |
| : | Supported State |
| : | Blocked State | ← Setting to Blocked State According to Transmit Power Margin
| : | Blocked State |
| : | Blocked State | ← Setting to Blocked State According to Scheduling Result
| $2^N-1$ | Blocked State |

(C) E-TFC Concept

| E-TFCI | State |
|---|---|
| 0 | Supported State |
| 1 | Supported State | ← E-TFC, Min Setting
| 2 | Supported State | ← Setting to Supported State According to Scheduling Result
| : | Supported State |
| : | Supported State | ← Setting to Supported State According to Transmit Power Margin
| : | Blocked State |
| : | Blocked State |
| $2^N-1$ | Blocked State |

FIG.21

(a) Pmax($\beta$d, $\beta$c, $\beta$hs, $\beta$eu)

| Operation Band | Power Class 1 | | Power Class 2 | | Power Class 3 | | Power Class 4 | |
|---|---|---|---|---|---|---|---|---|
| | Transmit Power (dBm) | Deviation (dB) | Transmit Power (dBm) | Deviation (dB) | Transmit Power (dBm) | Deviation (dB) | Transmit Power (dBm) | Deviation (dB) |
| Band I | +31 | +1/-3 | +25 | +1/-3 | +22 | +1/-3 | +19 | +2/-2 |
| Band II | - | - | - | - | +22 | +1/-3 | +19 | +2/-2 |
| Band III | - | - | - | - | +22 | +1/-3 | +19 | +2/-2 |

(b) Pmax($\beta$d, $\beta$c, $\beta$hs, $\beta$eu)

| $\beta$eu (For All Values of $\beta$d, $\beta$c, and $\beta$hs) | Power Class 3 | | Power Class 4 | |
|---|---|---|---|---|
| | Transmit Power (dBm) | Deviation (dB) | Transmit Power (dBm) | Deviation (dB) |
| 1/15 ≤ $\beta$eu ≤ 12/15 | +24 | +1/-3 | +21 | +2/-2 |
| 13/15 ≤ $\beta$eu ≤ 15/8 | +23 | +2/-3 | +20 | +3/-2 |
| 15/7 ≤ $\beta$eu ≤ 15/0 | +22 | +3/-3 | +19 | +4/-2 |

(c) Pmax($\beta$d, $\beta$c, $\beta$hs, $\beta$eu)

| E-DCH Category | | | Power Class 3 | | Power Class 4 | |
|---|---|---|---|---|---|---|
| Category | Maximum E-DPDCH Configuration | 2ms TTI-EDCH Enable/Disable | Transmit Power (dBm) | Deviation (dB) | Transmit Power (dBm) | Deviation (dB) |
| 1 | SF4 | No | +24 | +1/-3 | +21 | +2/-2 |
| 2 | SF4 | Yes | +24 | +2/-3 | +21 | +3/-2 |
| 3 | 2xSF4 | Yes | +23 | -3/-3 | +20 | +4/-2 |
| 4 | 2xSF4 | No | +23 | +1/-3 | +20 | +2/-2 |
| 5 | 2xSF2 | Yes | +22 | +2/-3 | +19 | +3/-2 |
| 6 | 2xSF2 | No | +22 | +1/-3 | +19 | +2/-2 |
| 7 | 2xSF2+2xSF4 | Yes | +21 | +2/-3 | +18 | +3/-2 |
| 8 | 2xSF2+2xSF4 | Yes | +21 | +3/-3 | +18 | +4/-2 |

(d) Pmax($\beta$d, $\beta$c, $\beta$hs, $\beta$eu)

| E-DCH Category | | Power Class 3 | | Power Class 4 | |
|---|---|---|---|---|---|
| Category | DPDCH Enable/Disable | Transmit Power (dBm) | Deviation (dB) | Transmit Power (dBm) | Deviation (dB) |
| 1 | No | +22 | +1/-3 | +20 | +2/-2 |
| 2 | Yes | +21 | +2/-3 | +19 | +3/-2 |

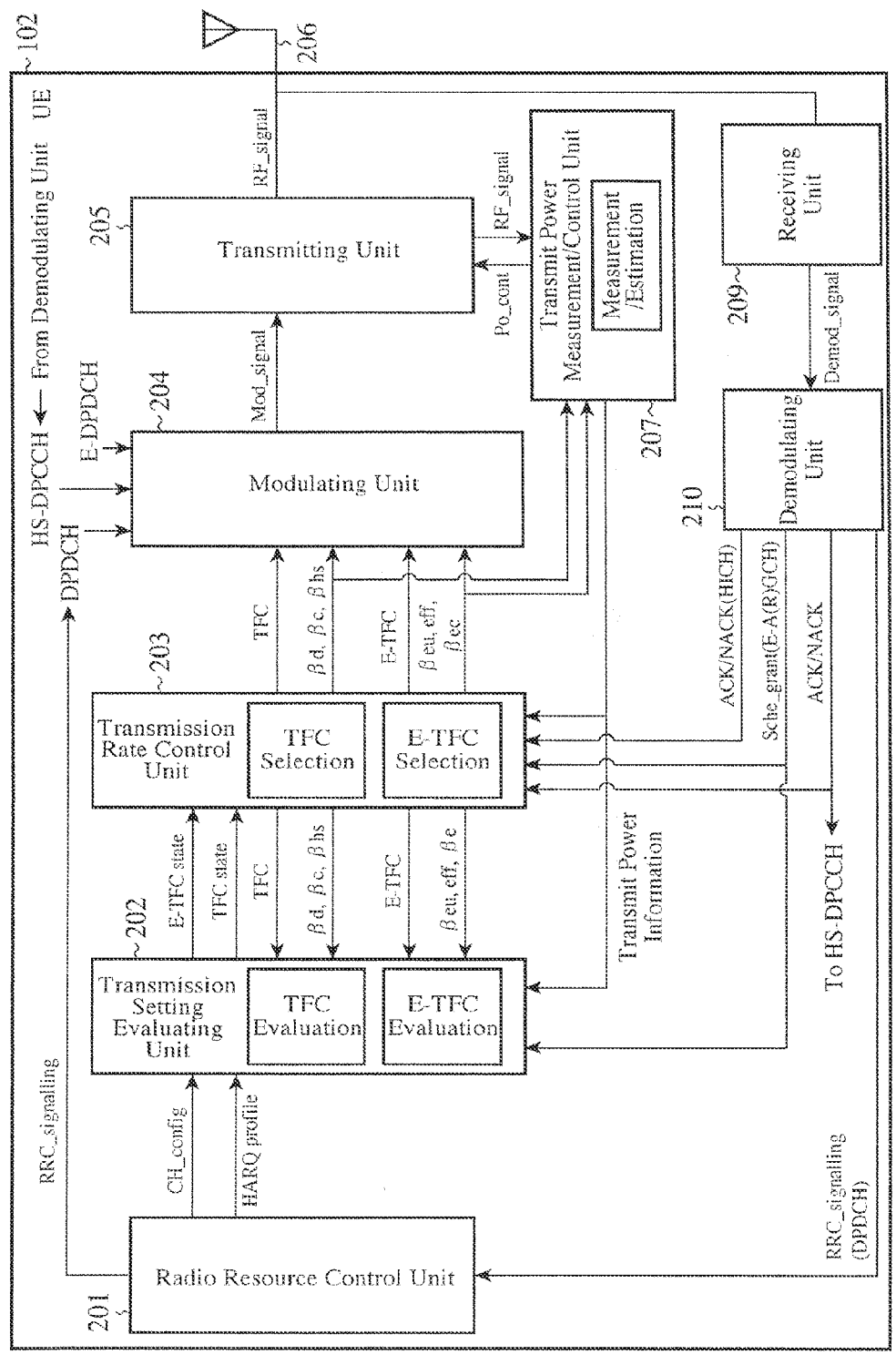

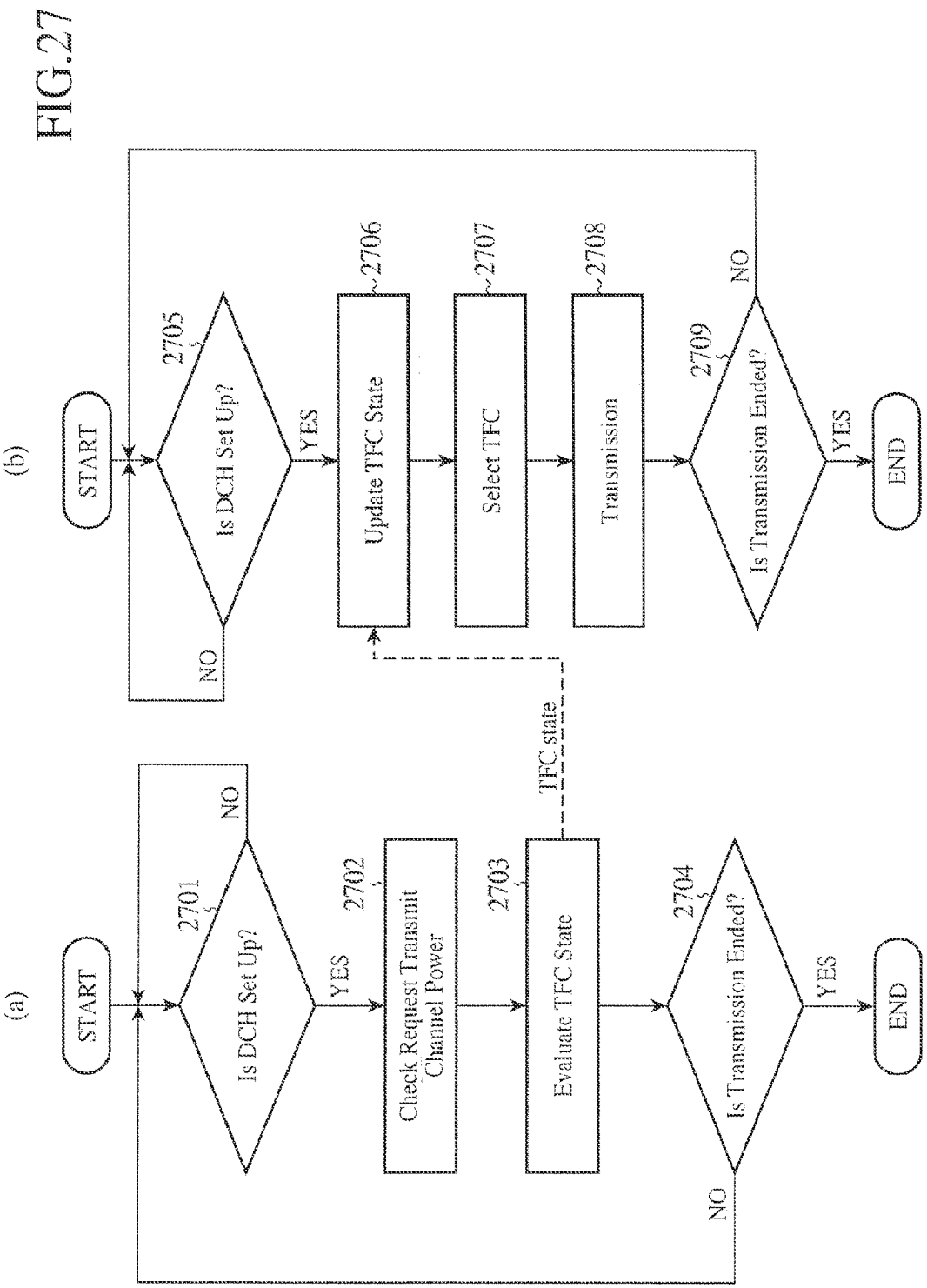

TRANSMISSION CONTROL METHOD, MOBILE STATION, AND COMMUNICATION SYSTEM

CROSS REFERENCE TO RELATED APPLICATIONS

This application is a continuation of U.S. application Ser. No. 11/814,967, filed Jul. 27, 2007 (allowed), and claims the benefit of priority from U.S. application Ser. No. 11/814,967, which is a National Stage Entry of PCT Application No. PCT/JP2005/006360, filed Mar. 31, 2005, which claims the benefit of priority from PCT Application No. PCT/JP2005/001414, filed Feb. 1, 2005, all of which are incorporated herein by reference.

FIELD OF THE INVENTION

The present invention relates to a mobile station, a fixed station, and a communications method which are implemented in a communications system to which a CDMA (Code Division Multiple Access) method is applied. More particularly, it relates to a mobile station, a fixed station, a communications system, and a communications method which are implemented in a mobile communications system in which a channel via which high-speed packet data are transmitted in an uplink is set up.

BACKGROUND OF THE INVENTION

In recent years, plural telecommunications standards called third generation are adopted as IMT-2000 by the International Telecommunications Union (ITU) for high-speed COMA mobile telecommunications methods. For W-CDMA (FDD: Frequency Division Duplex) which is one of the plural telecommunications standards, commercial services were started in Japan in 2001. For W-CDMA systems, the standardization organization 3GPP (3rd Generation Partnership Project) determined the first specifications to summarize them as the release 1999th edition (Version name: 3.x.x) in 1999. Currently, release 4 and release 5 are specified as other new versions of the release 1999th edition, and release 6 is under review and being created.

Hereafter, related main channels will be explained below briefly. As physical-layer channels which are individually assigned to a mobile station as release-1999-compliant channels, there are a DPCCH (Dedicated Physical Control CHannel) and a DPDCH-1 (Dedicated Physical Data CHannel). The DPCCH is a channel via which various pieces of control information for a physical layer (e.g., a pilot signal for synchronization and a transmission-power-control signal) are transmitted. The DPDCH is a channel via which various data from a MAC layer (Media Access Control: a protocol layer which is located above the physical layer) are transmitted. Incidentally, channels used for transmission of data between the MAC layer and the physical layer is called transport channels (Transport channels). In release 1999, a transport channel which corresponds to the DPDCH which is the physical-layer channel is called a DCH (Dedicated Channel). The above-mentioned DPCCH and DPDCH are set up for both uplink and downlink.

In release 5, an HSDPA (High Speed Downlink Packet Access) technology is introduced in order to achieve increase in the efficiency of the packet transmission via downlinks, and, as physical-layer channels for downlinks, an HS-PDSCH (High Speed-Physical Downlink Shared CHannel) and an HS-SCCH (High Speed-Shared Control CHannel) are added. The HS-PDSCH and the HS-SCCH are used by two or more mobile stations. The HS-PDSCH is a channel via which data from the MAC layer are transmitted, like the release-1999-compliant DPDCH. The HS-SCCH is a channel via which control information (e.g., a modulation method of transmission data and a packet data size) at the time of transmitting data via the HS-PDSCH is transmitted.

The spreading factor of the HS-PDSCH is fixed to 16, and two or more spread codes (i.e., two or more channels) can be assigned to one mobile station at a time of packet transmission. Allocation control (what is called scheduling) is carried out by a base station (i.e., a fixed station). In release 5, an HS-DPCCH (High Speed-Dedicated Physical Control CHannel) is added as a physical-layer channel for uplinks. The mobile station transmits a reception judgment result (ACK/NACK) for data sent thereto via the HS-PDSCH, and downlink radio environment information (CQI: Channel Quality Information) to the base station using the HS-DPCCH.

The base station transmits HS-PDSCH and HS-SCCH data in a pair. The mobile station receives the HS-PDSCH and HS-SCCH data which are sent from the base station, judges whether the data include any error, and transmits a judgment result (ACK/NACK) using the HS-DPCCH. Therefore, the frequency with which the mobile station transmits ACK/NACK to the base station varies according to the frequency of the downlink packet transmission. The mobile station also transmits CQI to the base station according to the value of a period which is set up in advance of the communications.

When transmitting data using the DPDCH, the transmit side piggybacks information about a multiplexing method of multiplexing the data and the size of data per unit time (i.e., a transmission rate), which are transmitted from the higher-level protocol layer, onto the DPCCH, and transmits the information to the receive side to notify it to the receive side. The notification information containing "the multiplexing method of multiplexing data" and "the data size" is called TFC (Transport Format Combination), and TFCI (TFC Index) which is the index of TFC is transmitted to the receive side. When the transmission rate is decided by TFC, a gain factor (pd) which defines the transmit power of the DPDCH is decided. The whole of TFC which can be provided when transmission is called TFCS (TFC Set), and is set up between the mobile station and the fixed station at the time of initial settings for communications or during communications. Furthermore, for each TFC, a transition among states (support, Excess Power, and Block) is defined, and that the state (and state transition) of each TFC is determined so that it reflects the state of the transmission is defined in the written standards TS25.321 (see Chapter 11.4 of nonpatent reference 1, and FIG. 11.4.1 of Transport format combination selection in UE). A transition among the states of each TFC for the DPDCH is made to take place by evaluating (Evaluation) the number of unit transmission times (slot: 1/15 of 10 milliseconds) that the total transmit power value (an estimated or actual measurement) of the mobile station reaches a maximum transmit power predetermined value (or a maximum transmit power set value). This is defined by the technical specification TS25.133 (see Chapter 6.4 of nonpatent reference 2, and Chapter 6.4.2 Requirements of Transport format combination selection in UE).

[Patent reference 1] JP, 2004-245276, A

[Nonpatent reference 1] 3rd Generation Partnership Project; Technical Specification Group Radio Access Network; Medium Access Control (MAC) protocol specification (Release 5) 3GPP TS 25.321 V5.9.0 (2004-06)

[Nonpatent reference 2] 3rd Generation Partnership Project; Technical Specification Group Radio Access Network;

Requirements for support of radio resource management (FDD) (Release 5) 3GPP TS 25.133 V5.12.0 (2004-09)

[Nonpatent reference 3] 3rd Generation Partnership Project Technical Specification Group Radio Access Network; Feasibility Study for Enhanced Uplink for UTRA FDD (Release 6) 3GPP TS 25.309 V6.1.0 (2004-12)

[Nonpatent reference 4] 3GPP TSG RAN WG2 Meeting #45 Shin-Yokohama, Japan, 15-19 Nov. 2004 Tdoc R2-042447 Agenda Item: 12.2 Title: Consideration on E-TFC selection principles

[Nonpatent reference 5] 3rd Generation Partnership Project; Technical Specification Group Radio Access Network; User Equipment (UE) radio transmission and reception (FDD) (Release 5) 3GPP TS 25.101 V5.12.0 (2004-09)

Release 1999 is decided by mainly assuming transmission and reception of continuous data like voice calls. In release 5, HSDPA which makes it possible to carry out downlink high-speed packet communications is added, though no specifications assuming uplink high-speed packet communications are not developed but the release 1999 specifications are applied just as they are. Therefore, also in a case in which burst (Burst) transmission like transmission of packet data from a mobile station to a base station is carried out, dedicated channels (DCH and DPDCH) for exclusive use must be assigned to each mobile station. Therefore, by taking into consideration an increase in demand of uplink packet data transmission which is caused by the widespread use of the Internet, there is a problem from the viewpoint of the effective use of the radio resources.

Data transmission from a mobile station is performed through autonomous transmission control (Autonomous Transmission) by the mobile station. In this case, the transmission timing from each mobile station is defined arbitrarily (or at a statistically random). The system in which the mobile station is carrying out the autonomous transmission control and the data transmission, the fixed station is not concerned about the transmission timing of the mobile station. In a communication system to which the CDMA communications method is applied, although transmission from other mobile stations all serves as a source of interference, a fixed station which manages the radio resources can only carry out a statistical prediction (or management) of the amount of interference noises and an amount of variations in the amount of interference noises for the base station's reception. Thus, because the fixed station which manages the radio resources in the communications system using the CDMA communication method is not concerned about the transmission timing of each mobile station and cannot predict correctly the amount of interference noises, the fixed station carries out radio resource allocation control which ensures a sufficient margin by assuming a case in which the amount of variations in the interference noise amount is large. Such radio resource management by a fixed station is carried out by not a base station itself, but a base station control apparatus (RNC: Radio Network Controller) which adjusts two or more base stations.

The radio resource management which the base station control apparatus (RNC) carries out for mobile stations and notifications which accompany the radio resource management need a relatively-long processing time (of the order of several 100 milliseconds). For this reason, no appropriate control of the allocation of the radio resources according to a rapid change in the radio transmission environment, the transmission states of other mobile stations (=the amount of interference from other mobile stations), etc. cannot be carried out. Therefore, in release 6, an introduction of an E-OCH (Enhanced DCH) technology is examined in order to implement the effective use of the radio resources and high-speed allocation of the radio resources. The E-DCH technology may be called HSUPA (High Speed Uplink Packet Access). In the E-DCH technology, not only an AMC (Adaptive Modulation and Coding) technology, an HARQ (Hybrid Automatic Repeat reQuest) technology, etc. which are introduced for HSDPA in release 5, but also a short transmission time interval (TTI: Transmission Time Interval) can be used. The E-DCH means a transport channel which is an extension of a DCH which is a transport channel which complies with the conventional standards, and is set up independently of the DCH.

For the E-DCH, the fixed station carries out uplink radio resource control which is called "scheduling." Because the electric wave propagation environment and so on differ between uplinks and downlinks, the scheduling differs from the scheduling for the HSDPA. The mobile station carries out control of transmission of data on the basis of scheduling results notified from the fixed station. The fixed station transmits a judgment result (ACK/NACK) for the received data to the mobile station. A base station (referred to as NodeB in 3GPP) is assumed as an apparatus which is included in fixed stations and which carries out the scheduling. An example of a concrete method of carrying out the scheduling for E-DCH in a base station is disclosed by JP, 2004-215276, A (patent reference 1).

Furthermore, TS25.309v6.0.0 (nonpatent reference 3) is provided as the technical specification (Technical Specification) of 3GPP which is created for E-DCH.

In release 6, E-DPDCH (Enhanced-DPDCH) and E-DPCCH (Enhanced-DPCCH) are added as uplink physical channels for E-DCH. E-DPDCH and E-DPCCH are the physical channels to which correspond to the DPDCH and DPCCH which comply with release 5 and earlier standards, the E-DPDCH is a channel via which data from the MAC layer are transmitted, and the E-DPCCH is a channel via which control in format ion is transmitted. Furthermore, as in the case of TFC for DPDCH, it is determined that E-TFC (Enhanced-TFC) which defines the transmission rate is used. When the transmission rate is decided, a gain factor (βeu) for E-DPDCH is decided. In addition, in release 6, as downlink physical channels for E-DCH, an E-AGCH (Enhanced-Absolute Grant CHannel) and an E-RGCH (Enhanced-Relative Grant CHannel) via which scheduling results are notified, and an E-HICH (E-DCH HARQ Acknowledgement Indicator CHannel) via which a reception judgment result (ACK/NACK) is notified are added.

It is decided that at the time of data transmission from a mobile station, E-DCH and DCH data are treated as independent data streams (Data Stream), and a higher priority is given to DCH transmission than to E-DCH transmission. Thus, because E-DCH data are a data stream which is independent of DCH data and a higher priority is given to DCH transmission than to E-DCH transmission, the mobile station ensures transmit power required for the DCH transmission, selects an E-TFC in consideration of a remaining transmit power margin, and then transmits E-DCH data. The proposal R2-042447 to 3GPP defines a state transition also for E-TFC which is similar to that or TFC.

The above-mentioned nonpatent reference 4 defines a transition between two states (i.e., an available state and a restricted state) as a state transition of E-TFC. In the nonpatent reference, a state transition which is made according to a scheduling result (Scheduling grants) from a fixed station is disclosed.

Hereafter, a problem with uplink transmission control which arises due to the addition of the E-DCH will be explained. As disclosed in the above-mentioned nonpatent reference 4, a case in which a state transition is defined for E-TFC will be considered. The DPCCH has a fixed transmission rate, and ensures required quality (what is called Eb/No) through transmit power control (what is called closed loop control) for maintaining the physical radio links. Because the same Eb/No needs to be ensured for other channels, a gain factor (in the case of TS25.309, referred to as a reference power offset) for deciding a power offset amount for DPCCH according to the transmission rate (E-TFC) which is used at the time of data transmission is decided.

On the other hand, in accordance with nonpatent reference 3 (see Chapters 7.1 and 7.2 of TS25.309), plural data (or two or more kinds of data) from higher-level protocol layers are multiplexed, and can be transmit via one E-DCH or E-DPDCH. A required communication quality (QoS: Quality of Service) request is made for each of upper layer data streams (referred to as a MAC-D flow according to TS25.309) which are multiplexed into an E-DCH (or an E-DPDCH in the physical layer) data stream. When actually transmitting data via the E-DPDCH according to this QoS request (information which defines this QoS request is called an HARQ profile), giving an additional power offset is defined separately. That is, in the case of E-DPDCH when multiplexing two or more MAC-d flow data into one transmission interval (=1 TTI), a transmit power offset which is a maximum of the transmit power offsets of the two or more MAC-d flows is used on the basis of the HARQ profile of each MAC-d flow. Therefore, two or more E-DPDCH channel transmit power possible values (or equivalent channel amplitude coefficients) are equivalently set up for transmission with a certain transmission rate (E-TFC) setting.

Hereafter, control of maximum total transmit power (referred to as Pmax from here on) by a mobile station will be considered. Furthermore, assume a status in which the total transmit power of a mobile station reaches the maximum total transmit power (Pmax) when transmitting E-DCH (E-DPDCH) data. As previously explained, when two or more kinds of data from a higher level protocol layer are multiplexed and transmitted using the E-DPDCH, a power offset amount applied to the E-DPDCH varies according to how to multiplex the data to be transmitted (i.e., the MAC-D flows). As a result, even if they are transmitted at the same transmission rate (E-TFC), it is evaluated that the total transmit power with different E-DPDCH channel transmit power reaches Pmax. A problem is therefore that because only the transmission rate is defined for the E-TFC, the state transition of the E-TFC changes with QoS for the descriptions of the data to be transmitted, and therefore the mobile station operation is not decided uniquely.

According to TS25.309, it is decided that a higher priority is be given to transmission of DCH data that to transmission of E-DCH data. The state transition of TFC is changed by evaluating whether the total transmit power of the mobile station reaches Pmax. For this reason, also when the total transmit power of the mobile station reaches Pmax because it includes the transmit power of E-DCH data transmitted in parallel to the DCH data (namely, when the total transmit power of the mobile station does not reach Pmax if no E-DCH data are transmitted), the evaluation of the state transition of TFC is affected. For this reason, when the state in which the total transmit power of the mobile station reaches Pmax continues because of successive transmission of E-DCH data, for example, the mobile station makes a transition from a "supported state" (Support) to an "excess of transmit power" (Excess Power), and then to a "blocked state" (blocked), thereby reducing the transmission rate (TFC) of DCH. In such a case, the rule to give a higher priority to DCH transmission than to E-DCH transmission loses effect as a matter of fact.

Furthermore, according to TS25.309, the transmission rate (E-TFC) at the time of E-DCH transmission is determined on the basis of margin power (i.e., a transmit power margin) in which power required for DCH transmission has been ensured from the maximum total transmit power of the mobile station. On the other hand, according to release 5, changing the Pmax specification according to whether or not transmission of HS-DPCCH data from the mobile station is carried out is defined by the technical specification TS25.101 (see Chapter 6.2.2 UE maximum output power with HS-DPCCH of nonpatent reference 5).

When E-DCH data are transmitted, the transmission rate (E-TFC) is determined from the transmit power margin. A problem is however that because the definitions of the transmit power margin are indefinite, the operation of the communications system becomes unstable and the radio resources cannot be used efficiently. It is considered that the definitions of the transmit power margin: (1) the range of the transmit power margin; (2) whether there is a necessity to change the predetermined value Pmax with a combination of channels; (3) the definitions of the transmit power margin in a case in which the total transmit power of the mobile station does not reach Pmax; and (4) the timing which defines the transmit power margin are indefinite.

In above-mentioned nonpatent reference 4 (R2-042447), a transition among the states of E-TFC is made on the basis of scheduling result information. However, the transmit power margin of the mobile station is not taken into consideration in the evaluation of the state transition of E-TFC. Therefore, the estimated transmit power which is estimated before actual transmission may exceed Pmax, depending on the selected E-TFC. When it is expected that the estimated transmit power exceeds Pmax, a process of equally scaling the powers of all the channels is carried out in order to reduce the transmit power to Pmax or lower. However, carrying out such a process may degrade the communication quality.

The present invention is made to solve the problems which arise due to the addition of the E-DCH, and it is therefore an object of the present invention to provide a mobile station, a fixed station, a communications system, and a communications method which carry out uplink transmission control and radio resource control appropriately.

DISCLOSURE OF THE INVENTION

In accordance with the present invention, there is provided a transmission control method of performing a step of selecting transmission control information according to a combination of user data transmitted, via a transport channel, from an upper layer, and a step of transmitting the transmission control information, as well as a physical channel into which the two or more transport channels are multiplexed, to a fixed station, the transmission control information including at least transmit power information.

In accordance with the present invention, there is provided a transmission control method of transmitting user data which are transmitted using a transport channel from an upper layer to a fixed station via a physical channel containing a first data channel and a second data channel, the method including: a step of judging whether transmit power of transmission data transmitted to the fixed station reaches a maximum transmit power value; a step of judging whether the second data channel has been transmitted; a step of making a transition of a state of transmission control information selected according to a combination of the transport channels which are multiplexed into the first data channel when the transmit power reaches the maximum transmit power value a predetermined number of times; and a step of determining that the transmit power reaches the maximum transmit power value when the transmit power has reached the maximum transmit power value and the second data channel has not been transmitted.

In accordance with the present invention, there is provided a transmission control method of transmitting user data transmitted using a transport channel from an upper layer to a fixed station via physical channels containing a first data channel and a second data channel, in which the transmission control method includes: a step of receiving scheduling information which is used for controlling transmission of the second data channel; a transmit power margin measuring step of excluding at least transmit power of the first data channel from maximum transmit power so as to calculate a transmit power margin; and a state transition step of making a transition of a state of transmission control information selected according to a combination of the transport channels multiplexed into the second data channel among a transmission supported state, a transmit power excess state, and a transmission blocked state on a basis of the scheduling information and the transmit power margin.

In accordance with the present invention, there is provided a mobile station including a transmission control means for evaluating a state of transmission control information which is set to a physical channel, via which user data transmitted via a transport channel from an upper layer are transmitted to a fixed station, according to a combination of the user data, and for selecting the transmission control information associated with the physical channel according to a result of this evaluation, a multiplexing/modulation means for carrying out multiplexing/modulation of the physical channel outputted from the transmission control means, and for outputting a modulation signal, and a transmitting means for amplifying the modulation signal outputted from the multiplexing/modulation means so that it has predetermined transmit power, and for transmitting it, in which the transmission control information includes at least transmit power information.

In accordance with the present invention, there is provided a mobile station including a transmission control means for evaluating a state of transmission control information which is set to a first data channel and a second data channel which are physical channels, via which user data transmitted via a transport channel from an upper layer are transmitted to a fixed station, according to a combination of the user data, and for selecting the transmission control information associated with the physical channels according to a result of this evaluation, a multiplexing/modulation means for carrying out multiplexing/modulation of the physical channels outputted from the transmission control means, and for outputting a modulation signal, and a transmitting means for amplifying the modulation signal outputted from the multiplexing/modulation means so that it has predetermined transmit power, and for transmitting it to the fixed station, in which the transmission control means controls a process of making a transition of a state of the transmission control information associated with the first data channel by judging whether transmit power of the modulation signal transmitted from the transmitting means reaches maximum transmit power, according to whether or not there is presence or absence of transmission via the second data channel.

In accordance with the present invention, there is provided a mobile station including a transmission control means for evaluating a state of transmission control information which is set to a first data channel and a second data channel which are physical channels, via which user data transmitted via a transport channel from an upper layer are transmitted to a fixed station, according to a combination of the user data, and for selecting the transmission control information associated with the physical channels according to a result of this evaluation, a multiplexing/modulation means for carrying out multiplexing/modulation of the physical channels outputted from the transmission control means, and for outputting a modulation signal, and a transmitting means for amplifying the modulation signal outputted from the multiplexing/modulation means so that it has predetermined transmit power, and for transmitting it to the fixed station, in which the transmission control means makes a transition of the state of the transmission control information associated with the second data channel on a basis of scheduling information which is used for controlling transmission of the second data channel, and a transmit power margin which is calculated from maximum transmit power except at least transmit power of the first data channel.

In accordance with the present invention, there is provided a communication system including: a mobile station having a transmission control means for evaluating a state of transmission control information including at least transmit power information, which is set to a second one of a first data channel and a second data channel via which user data are transmitted to a fixed station according to a combination of user data multiplexed into the second data channel, and for selecting the transmission control information associated with the second data channel, a multiplexing/modulation means for carrying out multiplexing/modulation of the physical channels outputted from the transmission control means, and for outputting a modulation signal, and a transmitting means for amplifying the modulation signal outputted from the multiplexing/modulation means so that it has predetermined transmit power, and for transmitting it, and the fixed station for transmitting scheduling information for controlling transmission of the second data channel to the mobile station, and for receiving the second data channel transmitted according to this scheduling information.

In accordance with the present invention, in the transmission control method of performing a step of selecting transmission control information according to a combination of user data transmitted, via a transport channel, from an upper layer, and a step of transmitting the transmission control information, as well as a physical channel into which the two or more transport channels are multiplexed, to a fixed station, the transmission control information includes at least transmit power information. That is, information about the transmit power, such as a power offset and a gain factor, are included in the definition of an E-TFC which is the transmission control information. Therefore, even in a case in which a different channel power offset is set up for the same transmission rate of the physical channel, an E-TFC evaluation by a mobile station is defined uniquely.

In accordance with the present invention, the transmission control method of transmitting user data which are transmitted using a transport channel from an upper layer to a fixed station via a physical channel containing a first data channel and a second data channel includes the step of judging whether transmit power of transmission data transmitted to the fixed station reaches a maximum transmit power value: a step of judging whether the second data channel has been transmitted, the step of making a transition of a state of transmission control information selected according to a combination of the transport channels which are multiplexed into the first data channel when the transmit power reaches the maximum transmit power value a predetermined number of times, and the step of determining that the transmit power reaches the maximum transmit power value when the transmit power has reached the maximum transmit power value and the second data channel has not been transmitted. Therefore, because the transmit power of a channel for E-DCH is excluded in a state evaluation at the time of a TFC selection for a DCH which is the first data channel, the presence or absence of transmission of E-DCH has no influence upon the state evaluation, and a higher priority is given to transmission of DCH than to transmission of E-DCH.

In accordance with the present invention, the transmission control method of transmitting user data transmitted using a transport channel from an upper layer to a fixed station via physical channels containing a first data channel and a second data channel, includes the step of receiving scheduling information which is used for controlling transmission of the second data channel, the transmit power margin measuring step of excluding at least transmit power of the first data channel from maximum transmit power so as to calculate a transmit power margin, and the state transition step of making a transition of a state of transmission control information selected according to a combination of the transport channels multiplexed into the second data channel among a transmission supported state, a transmit power excess state, and a transmission blocked state on a basis of the scheduling information and the transmit power margin. Therefore, the state transition of the transmission control information (E-TFC) of an E-DPDCH which is the second data channel can be defined in consideration of not only the scheduling information, but also the transmit power margin.

In accordance with the present invention, in the mobile station including the transmission control means for evaluating a state of transmission control information which is set to a physical channel, via which user data transmitted via a transport channel from an upper layer are transmitted to a fixed station, according to a combination of the user data, and for selecting the transmission control information associated with the physical channel according to a result of this evaluation, the multiplexing/modulation means for carrying out multiplexing/modulation of the physical channel outputted from the transmission control means, and for outputting a modulation signal, and the transmitting means for amplifying the modulation signal outputted from the multiplexing/modulation means so that it has predetermined transmit power, and for transmitting it, the transmission control information includes at least transmit power information. That is, information about the transmit power, such as a power offset and a gain factor, are included in the definition of an E-TFC which is the transmission control information. Therefore, even in a case in which a different channel power offset is set up for the same transmission rate of the physical channel, an E-TFC evaluation by the mobile station is defined uniquely.

In accordance with the present invention, in the mobile station including the transmission control means for evaluating a state of transmission control information which is set to a first data channel and a second data channel which are physical channels, via which user data transmitted via a transport channel from an upper layer are transmitted to a fixed station, according to a combination of the user data, and for selecting the transmission control information associated with the physical channels according to a result of this evaluation, the multiplexing/modulation means for carrying out multiplexing/modulation of the physical channels outputted from the transmission control means, and for outputting a modulation signal, and the transmitting means for amplifying the modulation signal outputted from the multiplexing/modulation means so that it has predetermined transmit power, and for transmitting it to the fixed station, in which the transmission control means controls the process of making a transition of a state of the transmission control information associated with the first data channel by judging whether the transmit power of the modulation signal transmitted from the transmitting means reaches the maximum transmit power, according to whether or not there is presence or absence of transmission via the second data channel. Therefore, because the transmit power of a channel for E-DCH is excluded in a state evaluation at the time of a TFC selection for a DCH which is the first data channel, the presence or absence of transmission of E-DCH has no influence upon the state evaluation, and a higher priority is given to transmission of DCH than to transmission of E-DCH.

In accordance with the present invention, in the mobile station including the transmission control means for evaluating a state of transmission control information which is set to a first data channel, and a second data channel which are physical channels, via which user data transmitted via a transport channel from an upper layer are transmitted to a fixed station, according to a combination of the user data, and for selecting the transmission control information associated with the physical channels according to a result of this evaluation, the multiplexing/modulation means for carrying out multiplexing/modulation of the physical channels outputted from the transmission control means, and for outputting a modulation signal, and the transmitting means for amplifying the modulation signal outputted from the multiplexing/modulation means so that it has predetermined transmit power, and for transmitting it to the fixed station, in which the transmission control means makes a transition of the state of the transmission control information associated with the second data channel on the basis of the scheduling information which is used for controlling transmission of the second data channel, and a transmit power margin which is calculated from the maximum transmit power except at least the transmit power of the first data channel. Therefore, the state transition of the transmission control information (E-TFC) of an E-DPDCH which is the second data channel can be defined in consideration of not only the scheduling information, but also the transmit power margin.

In accordance with the present invention, the communication system includes: the mobile station having the transmission control means for evaluating a state of transmission control information including at least transmit power information, which is set to a second one of a first data channel and a second data channel via which user data are transmitted to a fixed station according to a combination of user data multiplexed into the second data channel, and for selecting the transmission control information associated with the second data channel, the multiplexing/modulation means for carrying out multiplexing/modulation of the physical channels outputted from the transmission control means, and for outputting a modulation signal, and the transmitting means for amplifying the modulation signal outputted from the multiplexing/modulation means so that it has predetermined transmit power, and for transmitting it, and the fixed station for transmitting scheduling information for controlling transmission of the second data channel to the mobile station, and for receiving the second data channel transmitted according to this scheduling information. That is, information about the transmit power, such as a power offset and a gain factor, are included in the definition of an E-TFC which is the transmission control information. Therefore, even in a case in which a different channel power offset is set up for the transmission rate of the same physical channel, an E-TFC evaluation by a mobile station is defined uniquely.

BRIEF DESCRIPTION OF THE FIGURES

FIG. 11 is tables showing a RAB (Radio Access Bearer) setting in a W-CDMA communications system;

FIG. 18 is tables showing a RAB setting in a W-CDMA communications system;

FIG. 19 is tables showing a RAB setting in a W-CDMA communications system;

FIG. 20 is an explanatory diagram for explaining another example of a transition between the states of an E-TFC;

FIG. 21 is a table showing an example of the specifications of maximum transmit power;

FIG. 26 is a block diagram showing the structure of a mobile station in accordance with embodiment 11 of the present invention;

FIG. 27 is a flow chart for explaining a transmission control process for DCH in accordance with embodiment 12 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

The invention in accordance with this embodiment 1 will be explained with reference to figures. First of all, the structure of each unit of a communications system will be shown with reference to FIGS. 1 to 3. Next, the flow of E-DCH transmission control is shown with reference to FIGS. 4 to 8.

Figure 1:
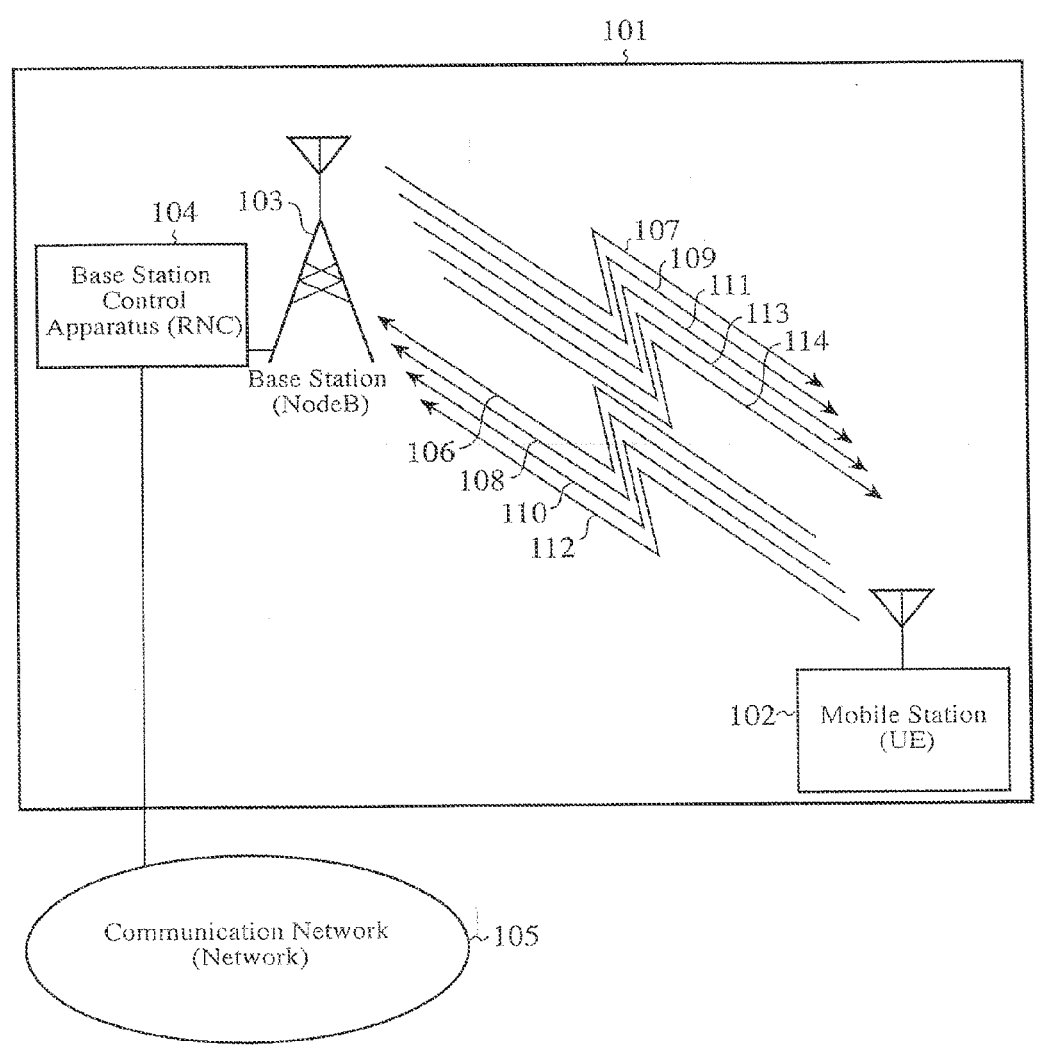
FIG. 1 is a block diagram showing the structure of a radio communications system in accordance with embodiment 1 of the present invention.

FIG. 1 is an explanatory diagram showing schematically the structure of the radio communications system in accordance with embodiment 1 of the present invention. In FIG. 1, the radio communications system 101 is provided with a mobile station 102, a base station 103, and a base station control apparatus 104. The base station 103 covers a specific communications area (generally called a sector or cell), and carries out wireless communications with a plurality of mobile stations 102. In FIG. 1, only one mobile station 102 is shown for the sake of simplicity. Communications are carried out between the mobile station 102 and the base station 103 using one or two or more radio links (or channels). The base station control apparatus 104 communicates with a plurality of base stations 103, is connected to an external communication network 105, such as a public telephone network or the internet, and relays packet communications between a base station 103 and the communication network 105. In FIG. 1, only one base station 103 is shown for the sake of simplicity. In the W-CDMA standards, the above-mentioned mobile station 102 is called UE (User Equipment), the above-mentioned base station 103 is called Node-B, and the above-mentioned base station control apparatus 104 is called RNC (Radio Network Controller).

An uplink DPCCH (Dedicated Physical Control CHannel) 106 is a physical channel for control (Physical Control Channel) from the mobile station 102, and a downlink DPCCH 107 is a physical control channel from the base station 103. Synchronous control of the transmit-receive timing between the mobile station 102 and the base station 103, and so on are performed via two DPCCHs (106 and 107) as mentioned above so that a physical radio link under communications is maintained. The uplink DPCCH 106, an uplink DPDCH 108, an uplink HS-DPCCH 110, and the downlink DPCCH 107, a downlink DPDCH 109, and a downlink HS-PDSCH/HS-SCCH 111 are channels according to release or earlier standards. An uplink E-DPDCH/E-DPCCH 112 is a physical channel for E-DCH transmission. The E-DPDCH/E-DPCCH 112 is used for transmission in a pair. The following explanation will be made focusing on the E-DPDCH, though a reference will also be made to the E-DPCCH if needed.

A downlink E-HICH 113 is a channel for notifying a reception judgment result (ACK/NACK) of E-DCH data by the base station 103 to the mobile station 102. A downlink E-AGCH/E-RGCH 114 is a channel for notifying a scheduling result for E-DCH. As the expression form of radio resource allocation results, transmission rate information (e.g., an E-TFC and a maximum transmission rate) and power information (e.g., a maximum transmit power (a ratio of maximum transmit powers) and a channel amplitude coefficient (a ratio of channel amplitude coefficients) are provided.

Figure 2:
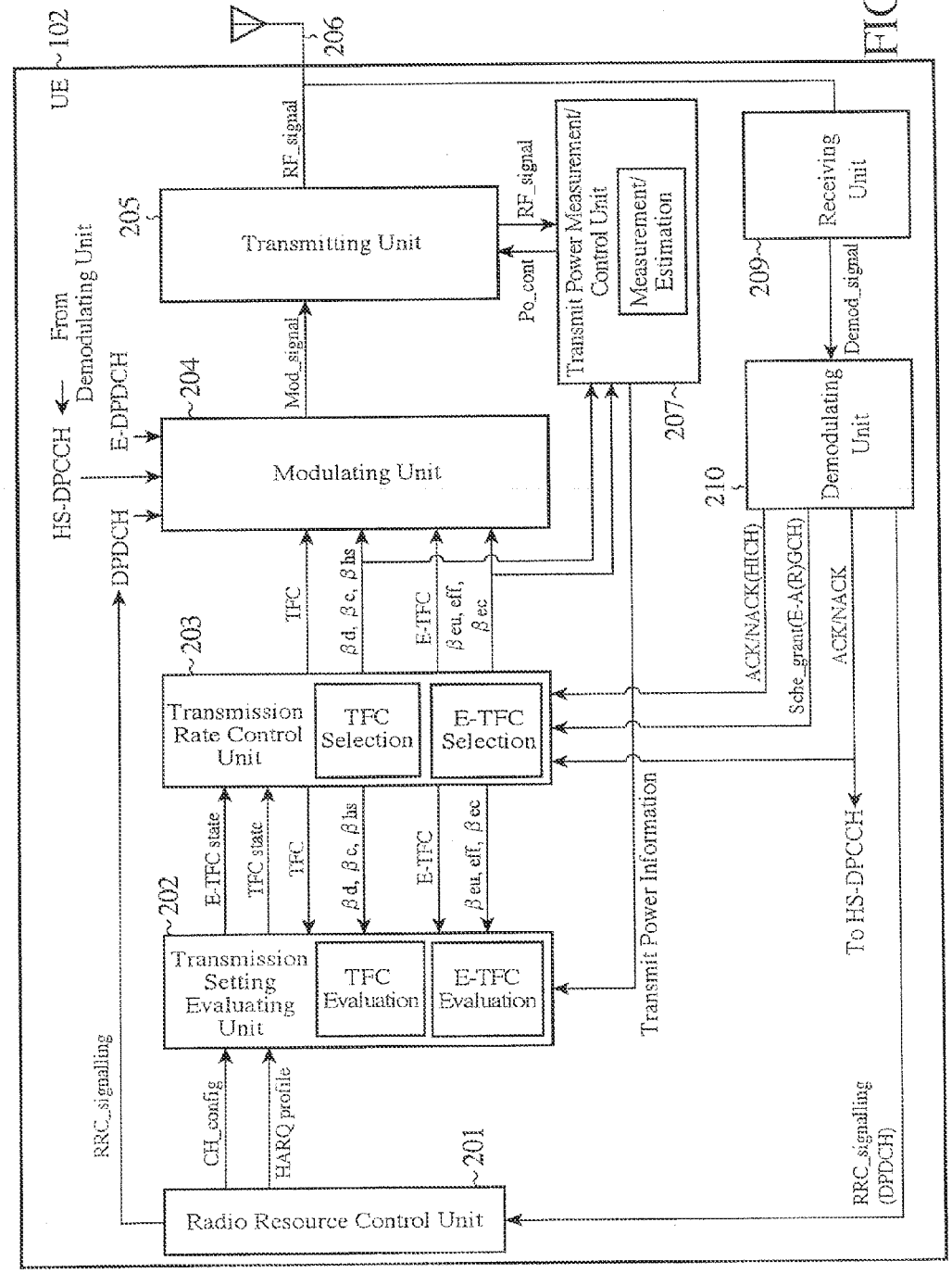
FIG. 2 is a block diagram showing the structure of a mobile station in accordance with embodiment 1 of the present invention.

FIG. 2 is a block diagram showing the structure of the mobile station in accordance with embodiment 1 of the present invention. Hereafter, the internal structure of the mobile station (e.g., functional blocks, and a flow of data and control signals) will be explained with reference to FIG. 2. A radio resource control unit 201 controls various settings, such as a combination of channels required for transmission and reception, and a transmission rate. The radio resource control unit 201 outputs setting information (CH_config) and QoS information (HARQ profile). Maximum total transmit power setting information, a channel amplitude coefficient (or a gain factor ($\beta$) setting information of each channel, transmission timing setting information, etc. are included in the setting information (CH_config). The setting information (CH_config) is notified from the base station control apparatus 104, via the base station 103, to the mobile station 102 (the notification is referred to as RRC signaling in the W-CDMA system), at the time when communications are started or during communications, and is then stored in the radio resource control unit 201 by way of an antenna 206, a receiving unit 209, and a demodulating unit 210. The radio resource control unit 201 piggybacks, as data, an exchange (RRC signaling) of information between the radio resource control unit of a fixed station (including the base station control apparatus 104 and the base station 103), which will be mentioned later, onto the DPDCH.

A transmission setting evaluating unit 202 has a function of evaluating (Evaluation) a TFC for DCH and an E-TFC for E-DCH. Focusing the evaluation of the E-TFC for E-DCH, the transmission setting evaluating unit 202 performs an evaluation of the transmission status using a functional block for evaluation (E-TFC Evaluation) from the various pieces of setting information (CH_config) inputted from the radio resource control unit 201, the E-TFC and gain factors from a transmission rate control unit 203, and transmit power information (UE transmit power) inputted from a transmit power measurement/control unit 207, and controls a state transition between an enable state and a disable state of each E-TFC. The transmission setting evaluating unit also outputs the evaluation result to the transmission rate control unit 203 as state information (E-TFC_state) of each E-TFC. The transmission setting evaluating unit 202 also makes an evaluation of the TFC for DCH using the various pieces of setting information (CH_config) inputted from the radio resource control unit 201, the TFC and gain factors from the transmission rate control unit 203, and the transmit power information (UE transmit power) inputted from the transmit power measurement/control unit 207, controls a state transition between an enable state and a disable state of each TFC, and outputs the evaluation result to the transmission rate control unit 203 as state information (TFC_state) of each TFC.

The transmission rate control unit 203 has a function (E-TFC selection) of selecting an E-TFC which it uses at the time of E-DCH transmission. The transmission rate control unit 203 determines an E-TFC which it uses at the time of actual data transmission on the basis of the state information (E-TFC_state) inputted from the transmission setting evaluating unit 202 and the scheduling result information (Sche_grant) which is demultiplexed from the received E-AGCH/E-RGCH data, and outputs an E-DPDCH gain factor ($\beta$eu,eff) and an equivalent E-DPCCH gain factor ($\beta$ec) which are obtained in consideration of QoS to the transmission setting evaluating unit 202 and a modulating unit 204. The transmission rate control unit 203 reflects the scheduling result information, has an maximum of an available uplink radio resource (for example, a channel power ratio of E-DPDCH) as an internal variable (Serving grant), and carries out an E-TFC selection so that E-DPDCH data with a higher priority can be transmitted within the limit of the available uplink radio resource. The transmission rate control unit 203 can output a power offset whose maximum is selected on the basis of the QoS of the transmission data multiplexed, as well as $\beta$eu, instead of $\beta$eu,eff. When there exist data to be simultaneously transmitted which are associated with other channels, the transmission rate control unit 203 outputs TFC information and the gain factors ($\beta$d, $\beta$c, and $\beta$hs) of the various channels (DPDCH, DPCCH, and HS-DPCCH) to both the transmission setting evaluating unit 202 and the modulating unit 204. A transmission control means is comprised of the radio resource control unit 201, the transmission setting evaluating unit 202, and the transmission rate control unit 203, which are mentioned above.

The modulating unit 204 multiplexes the inputted TFC and E-TFC and the gain factors ($\beta$d, $\beta$c, $\beta$hs, $\beta$eu,eff, and $\beta$ec), and the uplink DPDCH, DPCCH, HS-DPCCH, E-DPDCH, and E-DPCCH data which are to be actually transmitted by using a known technique which is so-called IQ multiplexing. By using a known technique, the modulating unit 204 further carries out a spread-spectrum modulation process and outputs a modulation signal (Mod_signal). The modulating unit 204 constructs a multiplexing/modulation means. A transmitting unit 205 amplifies the inputted modulation signal (Mod_signal) so that it has required power by using a known technique, and outputs a radio signal (RF_signal). The radio signal (RF_signal) is outputted to the transmit power measurement/control unit 207 while it is transmitted by radio from the antenna 206. The transmitting unit 205 adjusts the power of the radio signal (RF_signal) according to transmit power control information (Po_cont) from the transmit power measurement/control unit 207.

The transmit power measurement/control unit 207 carries out transmit power control on the basis of the gain factors ($\beta$d, $\beta$c, $\beta$hs, $\beta$eu,eff, and $\beta$ec) inputted from the transmission rate control unit 203, and outputs control information (Po_cont) to the transmitting unit 205. Furthermore, the transmit power measurement/control unit 207 has a power measurement function (shown by Measure in the figure). The transmit power measurement/control unit 207 estimates or measures average transmit power which is averaged within a predetermined time period (1 TTI, 1 slot, or the like) from the radio signal (RF_signal) outputted from the transmitting unit 205, and outputs transmit power information (UE transmit power) to the transmission setting evaluating unit 202. A transmitting means is comprised of the transmitting unit 205, the antenna 206, and the transmit power measurement/control unit 207, which are mentioned above.

The receiving unit 209 inputs a downlink radio signal (RF_signal) received by the antenna 206, demodulates it using a well-known de-spreading technology, and outputs a demodulation signal (Demod_signal). The demodulating unit 210 inputs the demodulation signal (Demod_signal), and demultiplexes data associated with various downlink channels from the signal by using a known technique. The demodulating unit 210 extracts result information (ACK/NACK) on E-DCH data reception judgment by the base station from received E-HICH data, and outputs the extracted result information to the transmission rate control unit 203. The demodulating unit further extracts scheduling result information (Sche_grant) for E-DCH from received E-AGCH/E-RGCH data, and outputs the extracted scheduling result information to the transmission rate control unit 203. The demodulating unit 210 also demultiplexes DPDCH and DPCCH data from the demodulation signal, extracts control information (RRC_signaling) including the setting information (CH_config) from the DPDCH data, and outputs the control information to the radio resource control unit 201. When receiving HS-DSCH data, the demodulating unit 210 also performs a reception judgment and outputs the judgment result (ACK/NACK) to the transmission rate control unit 203 while piggybacking it onto the HS-DPCCH. The reception judgment result (ACK/NACK) is transmitted, as HS-DPCCH data, to the base station 103 by way of the modulating unit 204, the transmitting unit 205, and the antenna 206.

Figure 3:
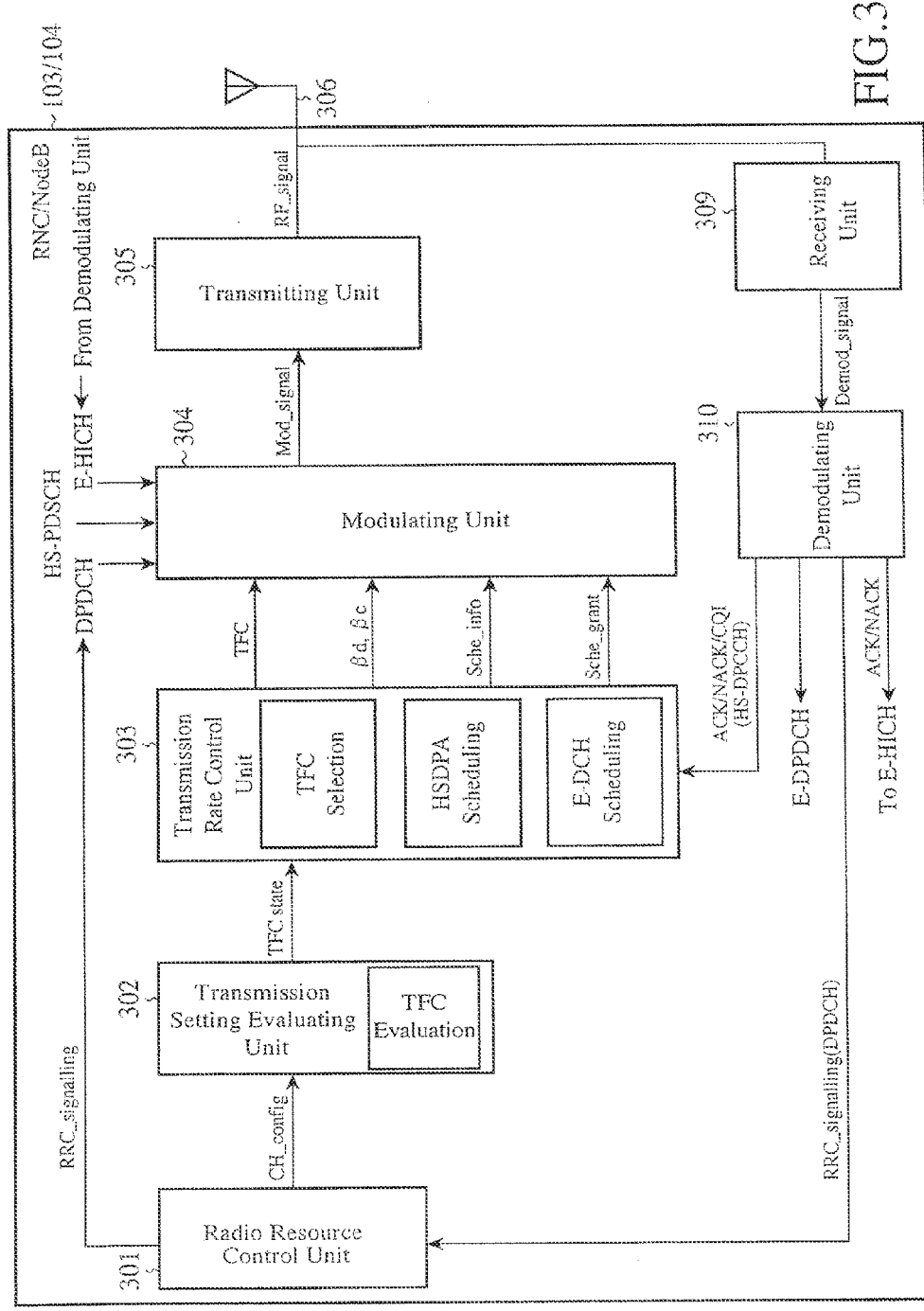
FIG. 3 is a block diagram showing the structure of a base station (or a fixed station) in accordance with embodiment 1 of the present invention.

FIG. 3 is a block diagram showing the structure of the fixed station in accordance with embodiment 1 of the pre sent invention. Hereafter, the internal structure of the fixed station (functional blocks, and a flow of data and control signals) will be explained with reference to FIG. 3. Assume that each block included in the fixed station, such as the base station, represents a functional unit (entity), and exists in one of both the base station 103 and the base station control apparatus 104 or an independent another apparatus according to the implementation of the base station 103 and the base station control apparatus 104. According to the 3GPP standards, the fixed station is called UTRAN (Universal Terrestrial Radio Access Network), the UTRAN including the base station control apparatus (RNC) and the base station (NodeB).

A radio resource control unit 301 controls various settings, such as a combination of channels required for transmission and reception to and from the mobile station 102, and a transmission rate. The radio resource control unit 301 also outputs the above-mentioned various pieces of setting information (CH_config). An amplitude coefficient setting for each channel, a transmission timing setting, HARQ profile information, etc. are included in the above-mentioned various pieces of setting information (CH_config). The above-mentioned various pieces of setting information (CH_config) are transmitted from the base station control apparatus 104 to the mobile station 102 via the base station 103 in advance of communications or during communications. The radio resource control unit 301 further outputs information (RRC_signaling) for controlling the mobile station 102. The radio resource control unit 301 also inputs mobile station control information (RRC_signaling) received from the mobile station 102 from a demodulating unit 310 which will be mentioned later.

A transmission setting evaluating unit 302 controls downlink transmission from the various pieces of setting information (CH_config) inputted from the radio resource control unit 201. The transmission setting evaluating unit 302 evaluates the state of each TFC of the downlink DPDCH and outputs state information (TFC_state) to a transmission rate control unit 303. The transmission rate control unit 303 has a transmission rate determination (TFC selection) function of selecting a TFC at the time of actual transmission of DPDCH data, a downlink scheduling (HSDPA Scheduling) function for HSDPA, and a scheduling (E-DCH Scheduling) function for E-DCH. The transmission rate control unit 203 outputs the TFC information (TFC) and the gain factors ($\beta$d and $\beta$c) of each channel which it uses at the time of actual transmission of DPDCH data on the basis of the state information (TFC_state) from the transmission setting evaluating unit 302. In this case, $\beta$d is used for the DPDCH and $\beta$c is used for the DPCCH. While inputting from the demodulating unit 310 which will be mentioned later an HSDPA packet reception judgment result (ACK/NACK) transmitted from the mobile station 102 and using it for the above-mentioned scheduling for HSDPA, the transmission rate control unit outputs the scheduling result information (Sche_info) to a modulating unit 304. A transmission control means is formed of the radio resource control unit 301, the transmission setting evaluating unit 302, and the transmission rate control unit 303.

The modulating unit 304 multiplexes downlink DPDCH, DPCCH, and HS-PDSCH data which are to be actually transmitted by using a known technique, like what is called IQ multiplexing, on the basis the TFC information (TFC) on the DPDCH inputted from the transmission rate control unit 303, and amplitude information ($\beta$d and $\beta$c) on the channels and the scheduling result information (Sche_info). The modulating unit 304 forms E-AGCH or E-RGCH data from the E-DCH scheduling result information (Sche_grant), and multiplexes the E-AGCH or E-RGCH data with data associated with other channels. The modulating unit 304 further performs a spreading process and a modulation process on the data using a known technique, and outputs a modulation signal (Mod_signal). A transmitting unit 305 amplifies the inputted modulation signal (Mod_signal) so that it has required power by using a known technique, and outputs a radio signal (RF_signal). The radio signal (RF_signal) is transmitted by radio as downlink channel (DPCCH 107, DPDCH 109, HS-PDSCH 111, E-HICH 113, and E-AGCH/E-RGCH 114) data from an antenna 306.

A receiving unit 309 inputs an uplink radio signal (RF_signal) received by the antenna 306, and outputs a demodulation signal (Demod_signal). A demodulating unit 310 inputs the demodulation signal (Demod_signal), and demultiplexes signals associated with the uplink various channels (DPCCH, DPDCH, HS-DPCCH, and E-DPDCH/E-DPCCH) from the demodulation signal, and also demultiplexes data (DPDCH), a control signal (DPCCH), and packet reception judgment result information (ACK/NACK) for HSDPA from the demodulation signal. The demodulating unit 310 also carries out a demodulation judgment of E-DPDCH, and demultiplexes and outputs a judgment result (ACK/NACK) as E-HICH data. The demodulating unit 310 further demultiplexes the control information (RRC_signaling) from the mobile station 102 from the DPDCH data separately, and outputs the control information to the radio resource control unit 301. The demodulating unit 310 further outputs a packet reception judgment result (ACK/NACK) for HSDPA and downlink channel environment information (CQI) to the transmission rate control unit 302.

Figure 4:
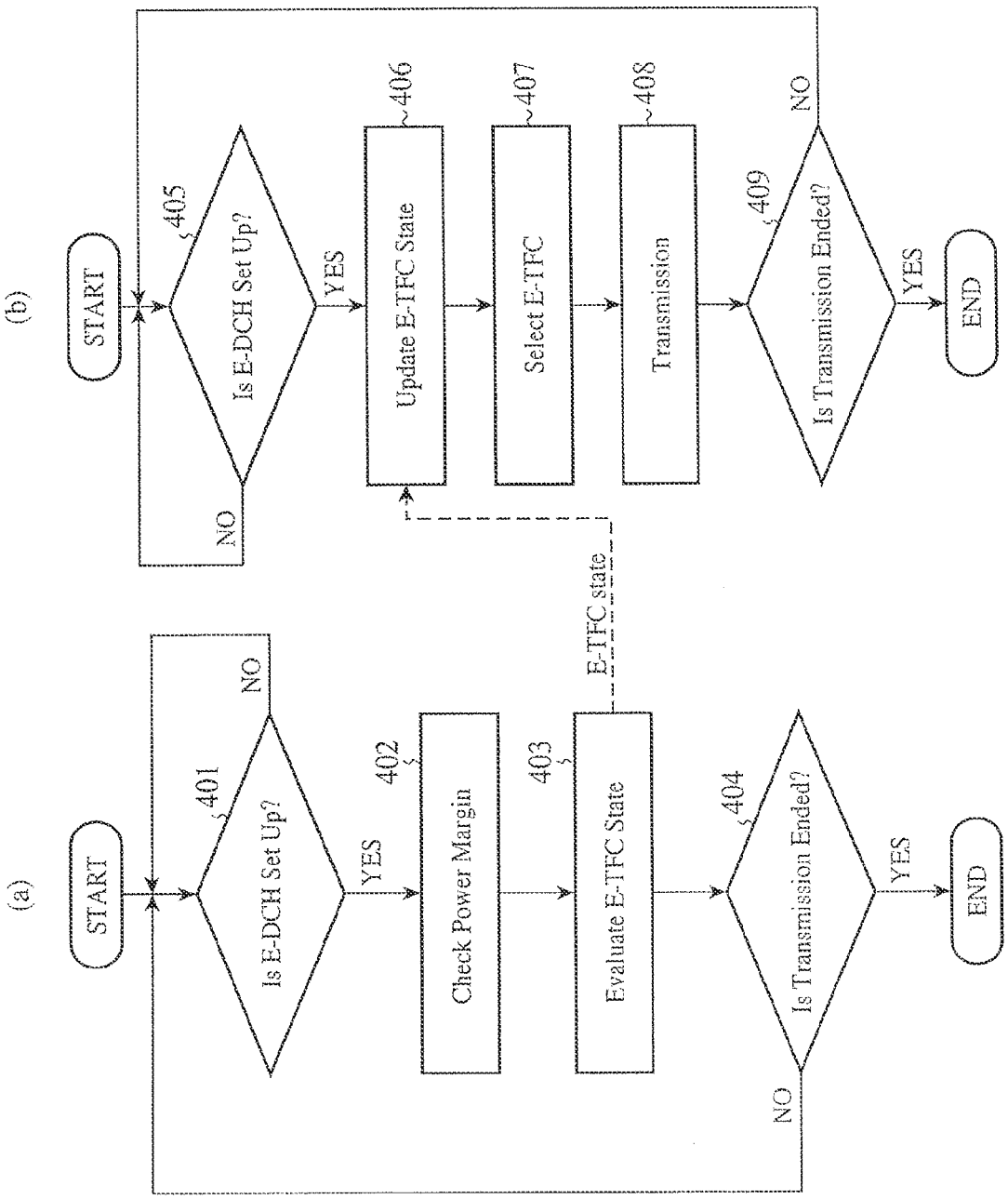
FIG. 4 is a flow chart explaining a transmission control process for E-DCH which is carried out by the mobile station in accordance with embodiment 1 of the present invention.

Next, the E-DCH transmission control by the mobile station 102 will be explained with reference to the block diagrams shown in above-mentioned FIGS. 1 to 3, and the flows shown in FIGS. 4 to 8. FIG. 4 is a flow chart for explaining the transmission control process for E-DCH in accordance with embodiment 1 of the present invention. In FIG. 4, (a) shows the operation of the transmission setting evaluating unit 202, and (b) shows the operations of the transmission rate control unit 203, the modulating unit 204, and the transmitting unit 205. The processes shown in FIGS. 4(a) and 4(b) are carried out in parallel. In advance of a start of communications, initial settings of various radio resources, such as a setting of channels used for communications, a transmission rate setting, and a timing setting, are determined between the radio resource control units of the fixed station and the mobile station 102 on the basis of a communications request from the mobile station 102 or the external network 105. The above processes are well-known ones which are defined by a conventional standard (release 1999 or release 5). In the mobile station 102, the above-mentioned various pieces of setting information notified are stored in the radio resource control unit 201. The radio resource control unit 201 outputs the setting information (CH_config) to the transmission setting evaluating unit 202 in order to control the operation setting of each unit included in the mobile station 102.

Figure 5:
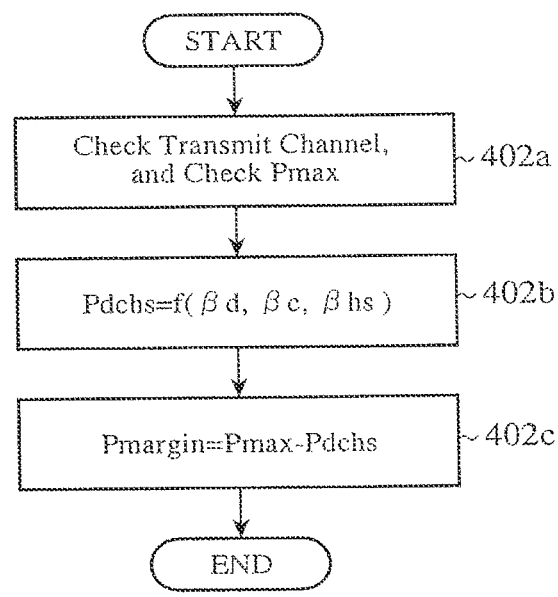
FIG. 5 is a flow chart explaining a process of checking a transmit power margin.

First, the operation of the transmission setting evaluating unit 202 shown in FIG. 4(a) will be explained. The transmission setting evaluating unit 202 checks to see whether the setting of E-DCH transmission has been made first (step 401). Next, the transmission setting evaluating unit 202 estimates or calculates a transmit power margin (step 102). FIG. 5 is a flow chart for explaining the process of estimating the transmit power margin. The details of step 402 are shown in FIG. 5. First, the transmission setting evaluating unit 202 inputs total transmission average power information (UE transmit power) from the transmit power measurement/control unit 207. The transmission setting evaluating unit 202 also checks channels via which data have been actually transmitted. The transmission setting evaluating unit 202 further checks a total transmit power value (Pmax) with which data can be transmitted from the maximum total transmit power setting information included in the various prices of setting information (CH_config) (step 402a). The transmission setting evaluating unit 202 further estimates the sum total of the transmit powers (Pdchs) for DPDCH, DPCCH, and HS-DPCCH on the basis of the gain factors which correspond to the channels via which data have been actually transmitted (step 402b). The transmission setting evaluating unit uses, for example, an estimation (calculation) method of estimating the sum total of the transmit powers from the absolute value of the DPCCH power and the various gain factors according to the following equation:

$$Pdchs = DPCCH\ power \times (\beta d^2 + \beta c^2 \beta hs^2)/\beta c^2 \quad (1)$$

Next, the transmission setting evaluating unit calculates a total transmit power margin (Pmargin) which does not include the E-DCH channel power from the above-mentioned Pmax value and the above-mentioned sum total transmit power (Pdchs) (step 402c).

$$Pmargin = Pmax - Pdchs \quad (2)$$

According to the configuration of the channels which are multiplexed, the transmission setting evaluating unit can skip step 402b and directly calculate the total transmit power margin (Pmargin) from the total transmitted average power information (UE transmit power), E-TFC, βeu information, and power offset information.

Next, in step 403 of FIG. 4(a), the transmission setting evaluating unit evaluates the state of E-TFC used for transmission (Evaluation) according to whether the total transmit average power value (UE transmit power) reaches the Pmax value. The transmission setting evaluating unit 202 notifies the state information (E-TFC state) on each E-TFC to the transmission rate control unit 203 (step 403). As mentioned above, the mobile station continuously evaluates which E-TFC can be used in the E-TFC selection for every predetermined unit time interval. This evaluation is performed for all E-TFCs in an E-TFCS using the transmit power margin estimated. When no HS-DPCCH data are transmitted in a measurement time interval, the transmission setting evaluating unit carries out an estimation of the transmit power margin for a certain E-TFC using the TFC (E-TFC) and the gain factor of each of the channels (DPDCH, DPCCH.E-DPDCH, and E-DPCCH), and reference transmit power. Here, a transmission time interval is one slot which is decided by the timing of slots for the DCH (DPDCH/DPCCH). The reference transmit power is transmit power of each channel within a specific measuring time interval, the transmit power being used at the time of an estimation of a certain transmit power margin. When HS-DPCCH data are transmitted in a part or all of the measurement time interval, an estimation of the transmit power margin for a certain E-TFC is carried out by using the TFC (E-TFC) and the gain factor of each of the channels (DPDCH, DPCCH.E-DPDCH, and E-DPCCH), and a maximum of the gain factor of HS-DPCCH used within the measurement time interval, and the reference transmit power.

Figure 6:
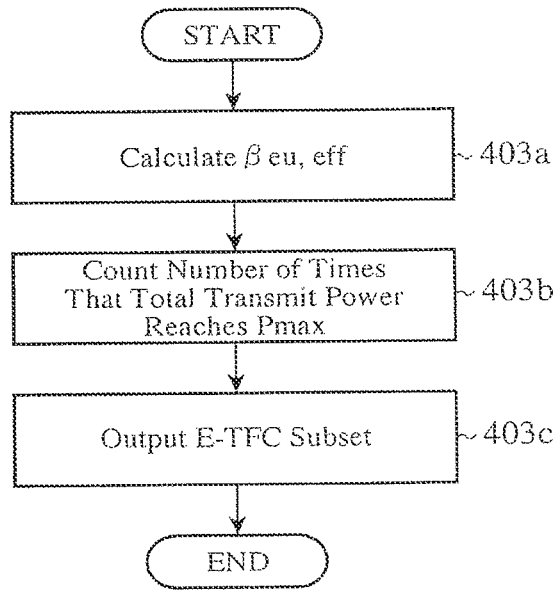
FIG. 6 is a flow chart explaining a process of evaluating the state of E-TFC.

FIG. 6 is a flow chart for explaining the process of evaluating the state of E-TFC. The details of step 403 of FIG. 4 are shown in FIG. 6. First, the transmission setting evaluating unit calculates an equivalent gain factor βeu,eff which is used for the actual setting of the channel amplitude coefficient of the E-DPDCH from the gain factor (βeu) which corresponds to the selected E-TFC and power offset information on an HARQ profile (step 403a). Next, the transmission setting evaluating unit examines whether the total transmit power reaches Pmax, and, when the total transmit power reaches Pmax, increments a count value (step 403b). The transmission setting evaluating unit then outputs a set (E-TFC subset) of available E-TFCs to the transmission rate control unit 203 as state (E-TFC state) information (step 403c). Next, the transmission setting evaluating unit returns to FIG. 4(a) and then checks to see whether the transmission of E-DCH data has been completed. When the transmission has not been completed (i.e., if NO in step 404), the transmission setting evaluating unit returns to step 401. When the transmission has been completed (if YES in step 404), the transmission setting evaluating unit ends the flow (step 404).

Figure 7:
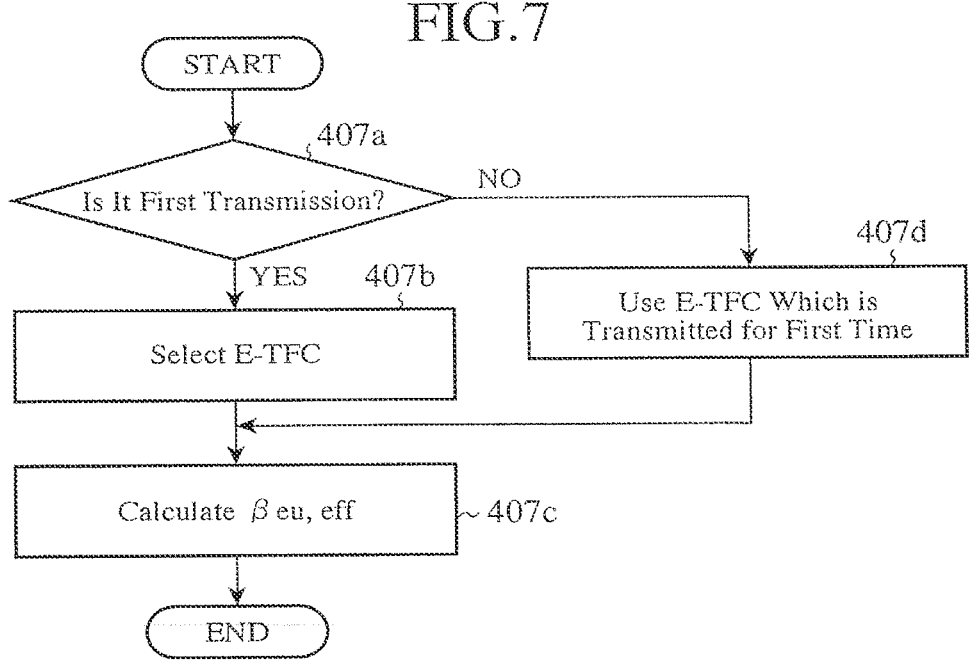
FIG. 7 is a flow chart explaining a process of selecting an E-TFC.

The operations of the transmission rate control unit 203, the modulating unit 204, and the transmitting unit 205 shown in FIG. 4(b) will be explained. The transmission rate control unit 203 checks to see whether the setting of E-DCH transmission has been made first, as in the case of FIG. 4(a) (step 405). Next, the transmission rate control unit checks to see whether update information about the E-TFC state has been delivered thereto from the transmission setting evaluating unit 202, and updates the E-TFC state if needed (step 406). Next, on the basis of the scheduling result information which is extracted from the received E-AGCH and E-RGCH data, the transmission rate control unit updates the value of the variable (Scheduling_Grant) for the internal settings of the mobile station, and selects an E-TFC which it uses for the next transmission interval (TTI) on the basis of the internal variable and the E-TFC state information (step 407). As a method of selecting an E-TFC, one of the following methods: (1) a method of selecting an E-TFC so that the E-DPDCH channel power (or the ratio of channel powers) fails within a permissible range by strictly applying the internal variable and the E-TFC state information; (2) a method of strictly applying the internal variable while calculating the average of a number of TTIs, for example, and then making a margin correction to the average so as to set up an E-TFC state; (3) a method of selecting an E-TFC in consideration of an accumulated value for the transmit power control (TPC), as well as the internal variable and the E-TFC state information; and (4) a method of permitting a selection which allows an E-TFC to temporarily exceed the internal variable can be used, and the method is executed according to the implementation of the mobile station or the definitions of the standards. FIG. 7 is a flow chart explaining the E-TFC selection process. The details of step 407 of FIG. 4 are shown in FIG. 7. In FIG. 7, the transmission rate control unit checks to see whether the transmission is the first-time one or retransmission first (step 407a). When the transmission is the first-time one (i.e., if YES in step 407a), the transmission rate control unit shifts to step 407b. In contrast, when the transmission is retransmission (if NO in step 407a), the transmission rate control unit shifts to step 407d. When the transmission is the first-time one, the transmission rate control unit selects an available E-TFC which falls within the limit of the total transmit power margin (step 407b).

As a method of selecting an E-TFC in step 407b, there can be (1) a method of selecting an E-TFC so that data with a higher priority for the QoS setting assigned to data of MAC-d flows which are multiplexed to the E-DCH can be transmitted at a higher speed; and (2) a method of selecting an E-TFC so that data of a higher priority channel which is used in the higher-level protocol can be transmitted at a higher speed. Which one of the methods is used is defined by either a technical specification or the specifications of the implementation of the communications system. Next, the transmission rate control unit, in step 407c, calculates an equivalent gain factor βeu,eff of the E-DPDCH from the E-TFC selected in step 407b, and outputs the equivalent gain factor, as well as the E-TFC information, to the transmission setting evaluating unit 202 and the modulating unit 204. At this time, when data associated with other channels are transmitted, they are similarly outputted to the transmission setting evaluating unit and the modulating unit. In contrast, when the transmission is retransmission in step 407a (i.e., if NO in step 407a), the transmission rate control unit shifts to step 407c without carrying out any selection of an E-TFC (step 407d).

Figure 8:
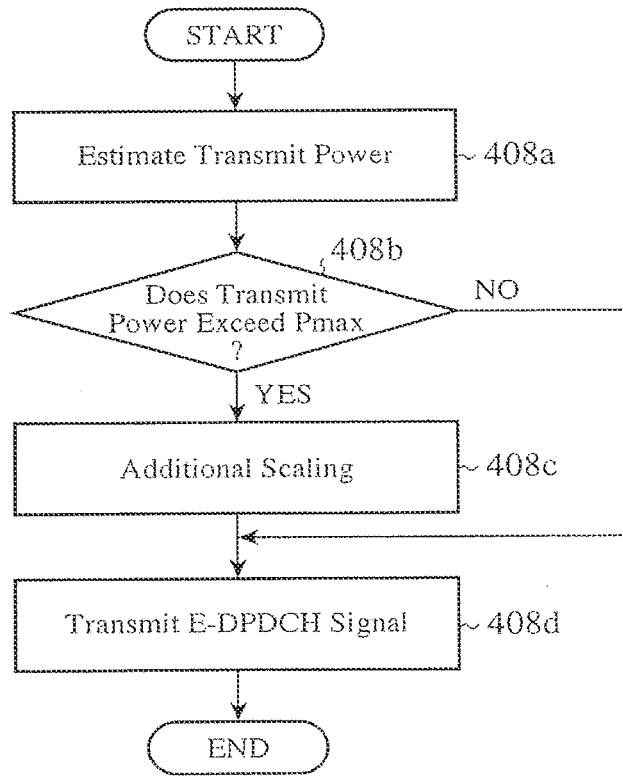
FIG. 8 is a flow chart for explaining a transmission process.

After the E-TFC selection process is carried out in step 407 of FIG. 4, transmission of E-DCH data is carried out by using the E-DPDCH and E-DPCCH in step 408. FIG. 8 is a flow chart for explaining the transmission process. The details of step 408 of FIG. 4 are shown in FIG. 8. First, the modulating unit 204 determines a relative power ratio between the channels on the basis of the gain factors of the transmit channels (E-DPDCH and E-DPCCH), multiplexes and modulates the input data using a known technique, and outputs a modulation signal (Mod_signal) to the transmitting unit 205. The transmit power control unit 207 estimates the total transmit power (Estimated UE transmit power) required for the transmission on the basis of the gain factors and according to a closed-loop transmit-power-control command (TPC) (step 408a). Next, the transmit power measurement/control unit 207 checks to see whether the estimated total transmit power (Estimated UE transmit power) exceeds the maximum transmit power preset value Pmax (step 408b).

The transmit power measurement/control unit 207 outputs the transmit power control information (Po_cont) to the transmitting unit 205 when the estimated total transmit power does not exceed Pmax (i.e., if NO in step 408b). In contrast, when the estimated total transmit power exceeds Pmax (i.e., if YES in step 408b), the transmit power measurement/control unit 207 carries out additional power control (i.e., additional scaling), and shifts to step 408c in which it maintains the ratio between the channels' transmit powers so that the total transmit power becomes lower than Pmax. After making the transmit power control information (Po_cont) reflect this additional power control, the transmit power measurement/control unit outputs the transmit power control information to the transmitting unit 205 and shifts to step 408d. Next, the transmitting unit 205 amplifies the modulation signal (Mod_signal) on the basis of the inputted control information (Po_cont), and outputs the amplified modulation signal as a radio signal (RF_signal). The outputted radio signal (RF_signal) is transmitted by radio from the antenna 206 to the base station 103 (step 408d). Next, in FIG. 4, the mobile station checks to see whether the transmission of the E-DCH data has been completed. When the transmission has not been completed, i.e., if NO, the mobile station returns to step 405. In contrast, when the transmission is completed, i.e., if YES, the mobile station ends the flow (step 409). The transmission setting evaluating unit 202 processes the E-TFC evaluation independently of the TFC evaluation of the DCH which is a conventional technology. As a result, while the backward compatibility (Backward compatibility) is ensured, the transmission control of the mobile station becomes simple. The transmission rate control unit 203 processes the E-TFC selection independently of the TFC selection of the DCH. As a result, the transmission control of the mobile station becomes simple while the backward compatibility (Backward compatibility) is ensured, as in the case of the transmission setting evaluating unit 202. A concrete operation of the TFC evaluation of the DCH is carried out on the basis of the specifications of the maximum transmit power setting, as defined by a conventional technology.

Figures 9, 10:
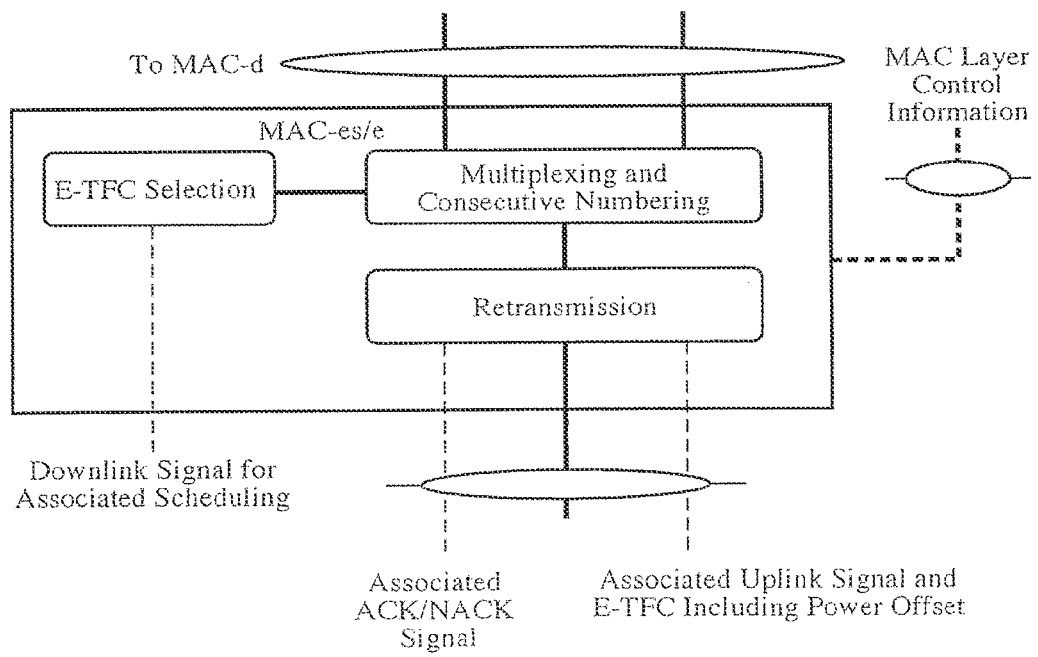
FIG. 9 is an explanatory diagram showing an example of the definition of an E-TFC.
FIG. 10 is an explanatory diagram showing an example of the definitions of the protocol structure of a MAC layer in a mobile station.

FIG. 9 is an explanatory diagram showing an example of the definition of an E-TFC. In the figure, an E-TFCI is an index for distinguishing each E-TFC. N shows the number of bits which are used when an E-TFCI is transmitted by using the E-DPCCH. Here, there are indexes whose number is the Nth power of 2, and they are shown by 0 to 2N−1, respectively. A maximum X of the transmission rate (=TBS: Transport Block size: E-DCH data size per TTI time), and a maximum Y of the gain factor are notified from the radio resource control unit 301 of the fixed station to the mobile station 102 with the above-mentioned various settings (CH_config). The definition of an E-TFC shown in FIG. 9(a) includes, as parameters of the E-TFC, the transmission rate TBS, and the gain factor (βeu,eff) for equivalent E-DPDCH which reflects the power offset of the HARQ profile. The definition includes, as E-TFC, a case of TBS=0 which shows data transmission stop (DTX: Discontinuous Transmission). A gain factor corresponding to the DTX is 0. In a case in which a different equivalent gain factor value can be provided for the same transmission rate, an E-TFC is defined for each equivalent gain factor value. Instead of the method of directly defining a gain factor as a parameter, a method of setting up a channel (in this case, a DPCCH) which is used as reference, and defining a ratio of gain factors (βeu/βc) as a parameter can be used. The expression method is not limited to these examples. The definition of an E-TFC shown in FIG. 9(b) includes, as parameters of the E-TFC, the transmission rate (TBS) and the power offset (ΔPoffset) of the HARQ profile. However, the power offset (ΔPoffset) value defined for each E-TFC is a value (i.e., a maximum) which is finally applied to the physical channels depending upon the multiplexing method of multiplexing upper layer data. When different power offsets can be provided for the same transmission rate (TBS), each power offset is defined as an E-TFC. A normalized power offset can be used instead of the power offset (ΔPoffset).

FIG. 10 is an explanatory diagram showing an example of the definitions of the protocol structure of a MAC layer in the mobile station, and shows an example of the definitions of the protocol structure in the case of including power parameters in an E-TFC. In FIG. 10, MAC-es/e (MAC: Media Access Control) is a protocol layer which is added in the E-DCH, and corresponds to the functions of the transmission setting control unit 202 and the transmission rate control unit 203 of FIG. 2. "E-TFC selection" (E-TFC selection) shows an E-TFC selection functional block, and corresponds to the functions of the E-TFC state evaluation (E-TFC Evaluation) block of the transmission rate evaluating unit 202 shown in FIG. 2 and the E-TFC selection (E-TFC selection) block of the transmission rate control unit 203 shown in FIG. 2. "Multiplexing and consecutive numbering" (Multiplexing and TSN Setting) shows a function of multiplexing higher-level protocol layer data, and consecutively numbering them, and corresponds to the channel multiplexing function of the modulating unit 204 shown in FIG. 2. "Retransmission" (HARQ) shows a retransmission function. "MAC layer control information" (MAC-control) shows various pieces of information which are used for controlling the MAC layer, and includes the above-mentioned setting information (CH_config), the QoS information (HARQ profile), and so on. An ellipse shown in the figure denotes an interface between protocol layers. In FIG. 10, when the power parameters are included in the E-TFC, as shown in FIGS. 9(a) and 9(b), the E-TFC including the power parameters is transmitted to the fixed station as E-DPCCH data. This is shown as "Associated uplink signal and E-TFC including power offset" (Associated uplink Signaling E-TFC including power offset) in FIG. 10. Because the power offset information is not necessarily required for reception by the fixed station, when the E-TFC information is expressed in the E-DPCCH, an index (Index) which corresponds only to the TBS information can be defined separately and can be transmitted.

FIG. 11 is tables showing a radio access bearer (RAB: Radio Access Bearer) setting in the W-CDMA communications system, and is based on the description format defined by the technical specifications of 3GPP. An example of the RAB setting shown in FIG. 11 shows the RAB setting of a conversational-mode communication class, voice communications, 12.2 kbps (bps: bit per second) for uplinks, and a circuit switch (CS: Circuit switch) type. In this case, three kinds of data of a higher-level protocol layer shown in the upper table (RAB subflows #1 to #3: multiplexed into the data dedicated channel DTCH) are multiplexed with dedicated control channel (DCCH) data in a higher-level protocol layer. The DCCH data themselves are the data into which data for control (SRBs #1 to #4) shown in the middle table are multiplexed. TF0 to TF2 in the upper table are the numbers of transmission bits per TTI of the RAB subflows, respectively, (TF0, TF0, TF0, TF0) and so on which are shown in a field written as TFCS of the lower table show E-TFCs, respectively, and also show a combination of the numbers of transmission bits per TTI of the upper layer data (RABs #1 to #4, DCCH). An HARQ profile is set up for each of the MAC-d flows which are multiplexed into the E-DCH. Furthermore, according to this embodiment, in the upper table shown in FIG. 11, as HARQ profile information for each of the upper layer data (RABs #1 to #4), a power offset (Power offset attribute) and a maximum number of times of transmission (Maximum number of transmission) are defined. What power offset value is selected from a range of power offset values (Power offset attributes) (e.g., "1-2" in the figure shows a "range of 1 to 2", or "1 or 2") depends on the E-TFC. As the power offset finally applied to the E-DPDCH, the maximum of the power offset values respectively applied to the RAB subflows which are combined as the E-TFC is chosen.

Whether or not the maximum of the power offset values is finally applied to the E-DPDCH can be changed in the communications system. In this case, the change of the setting is notified with an RRC signaling or the CH_config which is shown in FIG. 3. In FIG. 11, the transport channel types of all the logical channels (DTCH and DCCH) are the E-DCH type. Whether both of them are assigned to an identical MAC-d flow is set with an exchange between the fixed station and the mobile station which is carried out in advance of the communications, the setting is notified as a multiplexing list (Multiplexing list) through an RRC signaling or the CH_config which is shown in FIG. 3. When both of the channels are assigned to an identical MAC-d flow, the HARQ profile of a channel with the highest priority among the both set-up channels is applied, and, when both of the channels are assigned to two different MAC-d flows, respectively, the setting of each of the channels is applied.

As previously explained, a mobile station in accordance with the present invention selects an E-TFC in consideration of a power offset (i.e., a power offset attribute). Furthermore, an E-TFC (I) (an E-DCH Transport Format Combination (Indicator)) means that "E-TFC (i) includes information about the transport block size and the power offset." Thus, because the E-TFC(I) is so set up as to include information about power, like a power offset and a gain factor, even in a case in which different channel power offsets are set up for the same transmission rate of the physical-layer channel, E-TFCs can be distinguished from one another in the E-TFC evaluation, and the E-TFC evaluation of the mobile station can be defined uniquely. Therefore, the present embodiment offers an advantage of being able to provide an efficient communications system.

In this embodiment, Pmax-Pdchs is defined as the total transmit power margin (Pmargin). As an alternative, a difference (Pmax-Pdpcch) between Pmax and the DPCCH power can be defined as the total transmit power margin. The DPCCH power (Pdpcch). In this case, the transmission rate control unit 203 carries out the E-TFC selection by also taking the power of DPDCH or HS-DPCCH into consideration. The transmission rate control unit can also transmit the total transmit power margin which is thus defined to the fixed station as information for the scheduling in the fixed station. As a result, the base station can acquire information on the fundamental transmit power margin status independent of the transmission states of data channels, and can carry out uplink radio resource control which takes both DCH and E-DCH into consideration. Therefore, this embodiment offers an advantage of being able to provide an efficient communications system.

Embodiment 2

As explained in embodiment 1, the E-TFC evaluation block included in the transmission setting evaluating unit 202 carries out an E-TFC evaluation using an E-TFC containing parameters related to power. However, the receiving means (309 and 310) of the fixed station can perform a demodulation operation on E-DPDCH data without any trouble as long as it knows the TBS, even though the information about the power offset value of the channel transmit power of E-DPDCH is not notified thereto. Therefore, a mobile station in accordance with embodiment 2 of the present invention is so constructed as not to include any parameters related to power in a format used for transmitting E-TFC information to the fixed station. The TBS only has to be included as parameters of E-TFC which are to be notified to the fixed station.

That data having a large power offset value are transmitted means that channels (and data) of a higher-level protocol layer with a higher priority are multiplexed into the E-DCH. According to the E-TFC selection algorithm, because an E-TFC is selected so that transmission of data associated with a channel with a higher priority occurs more frequently, a state with a large power offset continues while data with a higher priority are continuously transmitted and data with a lower priority are transmitted after there are no data with a higher priority left any more. Therefore, while each data is transmitted, a one-to-one correspondence is formed substantially between the E-TFC and the power offset (Actually based data transmission). Although the evaluation of E-TFC and the selection operation are similarly changed according to the priority of data to be transmitted, a one-to-one correspondence is formed substantially between the E-TFC and the power offset while each data is transmitted. Therefore, even if two or more power offset can be set up for a certain TBS, the influence upon the mobile station's operation can be reduced.

As mentioned above, the present embodiment offers another advantage of being able to reduce the channel transmit power of E-DPCCH by excluding any parameters related to power from the definition of an E-TFC transmitted to outside the mobile station so that the number of bits required to express an E-TFCI which is needed in order to notify the definition of the E-TFC to the fixed station can be reduced. Furthermore, the present embodiment offers a further advantage of being able to improve the reliability even with the same channel transmit power.

Embodiment 3

Figure 12:
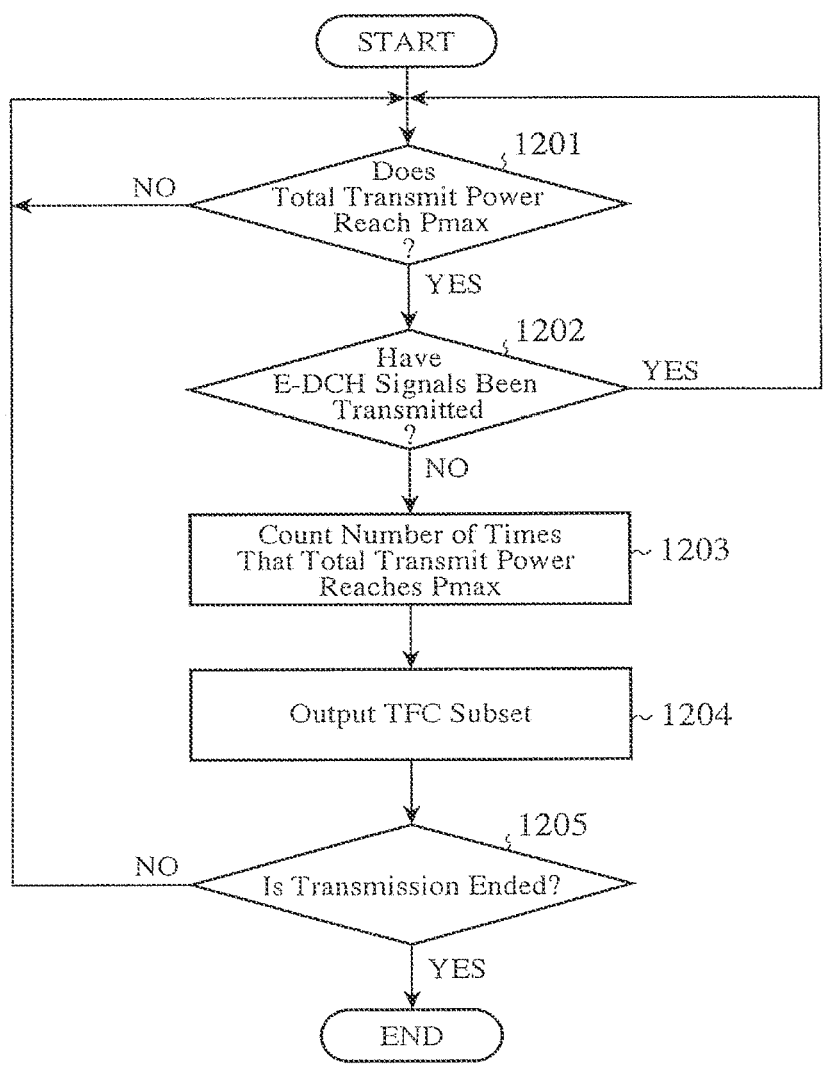
FIG. 12 is a flow chart showing a TFC state evaluation process carried out by a mobile station in accordance with embodiment 3 of the present invention.

FIG. 12 is a flow chart showing a TFC state evaluation process carried out by a mobile station in accordance with embodiment 3 of the present invention. The mobile station in accordance with this embodiment changes the TFC state evaluation algorithm which it uses for uplink DCH (or DPDCH) transmission according to the presence or absence of E-DCH transmission, and eliminates the influence of the E-DCH transmission upon the TFC evaluation (TFC Evaluation) function.

In FIG. 12, the mobile station evaluates whether the total transmit power which it has estimated on the basis of the total transmit power information (UE transmit power) inputted from the transmit power measurement/control unit 207 reaches a Pmax preset value (step 1201). When the total transmit power reaches Pmax, i.e., if YES, the mobile station shifts to step 1202. In contrast, when the total transmit power does not reach Pmax, the mobile station repeats step 1201. When, in step 1201, determining that the total transmit power reaches Pmax, the mobile station judges whether or not E-DCH (E-DPDCH/E-DPCCH) data have been transmitted (step 1202). When E-DCH data have been transmitted (i.e., if YES in step 1202), because the total transmit power does not reach Pmax if the transmit power of the channel for E-DCH is excluded from the total transmit power, the mobile station returns to the first step 1201. In contrast, when no E-DCH data have been transmitted (i.e., if NO in step 1202), because the total transmit power reaches Pmax due to transmission of DCH (DPDCH/DPCCH) or HS-DPCCH data, the mobile station shifts to the following step 1203 and increases the number of times that the total transmit power reaches Pmax by one. The mobile station then counts the number of predetermined time intervals (TTIs or slots) during which the total transmit power reaches Pmax for each TFC, and updates the TFC state according to the conventional standards (step 1204). Next, the mobile station judges whether or not the transmission of DCH data has been completed (step 1205). When the transmission has been completed (i.e., if YES in step 1205), the mobile station ends the processing. In contrast, when the transmission has not been completed (i.e., if NO in step 1204), the mobile station returns to the first step 1201 and repeats the processing.

The mobile station calculates an estimated transmit power (i.e., an estimated UE transmit power) which the mobile station estimates when evaluating the E-TFC state in step 1204 of FIG. 12 by using the gain factors of DPDCH and DPCCH when no HS-DPCCH data are transmitted. In contrast, when HS-DPCCH data is transmitted, the mobile station calculates the estimated transmit power by using the gain factors of DPDCH and DPCCH, the gain factor of HS-DPCCH, and reference transmit power, in either of the both cases, when E-DCH data are transmitted together with the above-mentioned channels' data, the mobile station calculates the estimated transmit power by using the gain factors of E-DPDCH and E-DPCCH, and the reference transmit power, and by subtracting the transmit powers of E-DPDCH and E-DPCCH from the total transmit power.

As mentioned above, when E-DCH data are transmitted in parallel to DCH data in the state evaluation for the TFC selection, because the transmit power of the channel for E-DCH is excluded from the total transmit power, the influence of the transmission of E-DCH data can be eliminated, and the standard specifications of giving a higher priority to the transmission of DCH than to the transmission of E-DCH can be maintained. In this embodiment of the present invention, the state evaluation of TFC and TFC selection are described, though the present embodiment can be combined with either of the above-mentioned embodiments 1 and 2. This variant can solve the problem with the addition of E-DCH, and can optimize the operation of the communications system.

Embodiment 4

Figure 13:
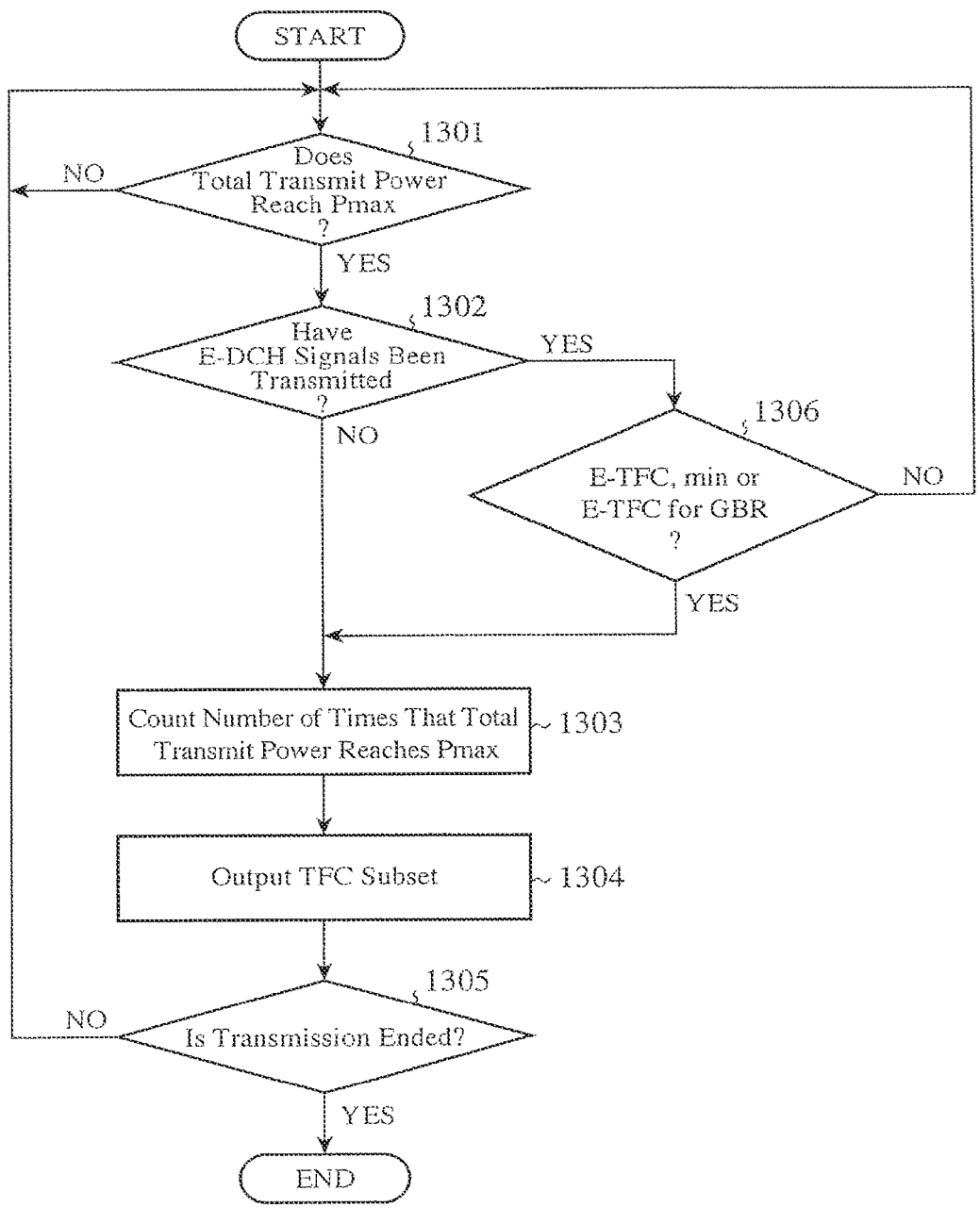
FIG. 13 is a flow chart showing a TFC state evaluation process carried out by a mobile station in accordance with embodiment 4 of the present invention.

FIG. 13 is a flow chart showing a TFC state evaluation process carried out by a mobile station in accordance with embodiment 4 of the present invention. The mobile station in accordance with this embodiment changes the TFC evaluation algorithm at the time of uplink DCH (or DPDCH) transmission, and reduces the influence of the transmission of E-DCH upon the TFC evaluation (TFC Evaluation) function. FIG. 13 shows a process which is carried out when there is either a minimum rule or a rule which defines a guaranteed transmission rate (GBR: Guaranteed bit rate) which is set from a QoS request, for E-TFC. Mobile station control information (RRC signaling), a voice signal, and so on require either the minimum rule or the guarantee transmission rate (GBR) rule for E-TFC. Particularly, the mobile station control information (RRC signaling) requires a delay avoidance and reliable transmission and reception, and is transmitted via DCH according to the conventional standards, though the mobile station control information can be transmitted via E-DCH according to the communication state or the like. In the case of E-DCH transmission, a non-scheduling mode (autonomous mode) in which data can be transmitted at an arbitrary TTI timing and with an arbitrary E-TFC within the limits of allocation of an allowable radio resource different from the results of scheduling for channels, such as E-AGCH/E-RGCH, as in the case of DCH is examined, and it is possible to use the non-scheduling mode for the above-mentioned GBR transmission and so on. Furthermore, the mobile station can have, as a mobile station capability (UE Capability), a function of switching between transmission via DCH and transmission via E-DCH. In this embodiment, assume that the mobile station control information is transmitted via DCH.

Because steps 1301 to 1305 shown in FIG. 13 are the processes which are the same as or similar to those of steps 1201 to 1205 shown in FIG. 12, step 1306 will be explained mainly. Step 1306 is carried out when determining that the total transmit power reaches Pmax as a result of evaluating whether the total transmit power reaches the Pmax setting value on the basis of the total transmit power information (UE transmit power) inputted from the transmit power measurement/control unit 207 (i.e., if YES in step 1301), and E-DOC (E-DPDCH/E-DPCCH) data are transmitted (i.e., if YES in step 1202). In step 1306, the mobile station judges whether the used E-TFC complies with either the minimum rule or the guaranteed transmission rate rule. When the used E-TFC complies with either the minimum rule or the guaranteed transmission rate rule (i.e., if YES in step 1306), the mobile station shifts to step 1303 in which it increments a count for the TFC evaluation by one. In contrast, when the used E-TFC does not comply with either the minimum rule or the guaranteed transmission rate rule (i.e., if NO in-step 1306), the mobile station returns to step 1301 in which it repeats the execution of the sequence of the processes.

The mobile station calculates the estimated transmit power (estimated UE transmit power) which the mobile station, in step 1304 of FIG. 13, estimates when evaluating the E-TFC sate from the total transmit power by using the gain factors of DPDCH and DPCCH when no HS-DPCCH data are transmitted. In contrast, when HS-DPCCH data are transmitted, the mobile station calculates the estimated transmit power by using the gain factors of DPDCH and DPCCH, the gain factor of HS-DPCCH, and reference transmit power. In either of the both cases, when E-DCH data are transmitted together with the both channels' data and the E-TFC complies with either the minimum rate rule (E-TFC, min) or the guaranteed transmission rate rule (GBR), the mobile station calculates the estimated transmit power by using the gain factors of E-DPDCH and E-DPCCH, and the reference transmit power, and by including the transmit powers of E-DPDCH and E-DPCCH into the total transmit power.

As mentioned above, in a case in which there is a minimum transmission rate rule for the E-DCH, because it is taken into consideration in the state evaluation of TFC whether the E-TFC complies with either the minimum rule (E-TFC, min) or the guarantee transmission rate rule (GBR), the minimum transmission rate can be secured for the E-DCH. It is therefore possible to piggyback important control information showing a severe requirement about the delay, such as an RRC signaling which is transmitted conventionally by using the DCH, onto the E-DCH, and DPDCH transmission becomes unnecessary. Therefore, the present embodiment offers an advantage of being able to carry out management of uplink radio resources more efficiently and to increase the capacity of the communications system. In this embodiment of the present invention, the state evaluation of TFC and TFC selection are described, though the present embodiment can be combined with either of the above-mentioned embodiments 1 and 2. This variant can solve the problem with the addition of E-DCH, and can optimize the operation of the communications system.

Embodiment 5

Figure 14:
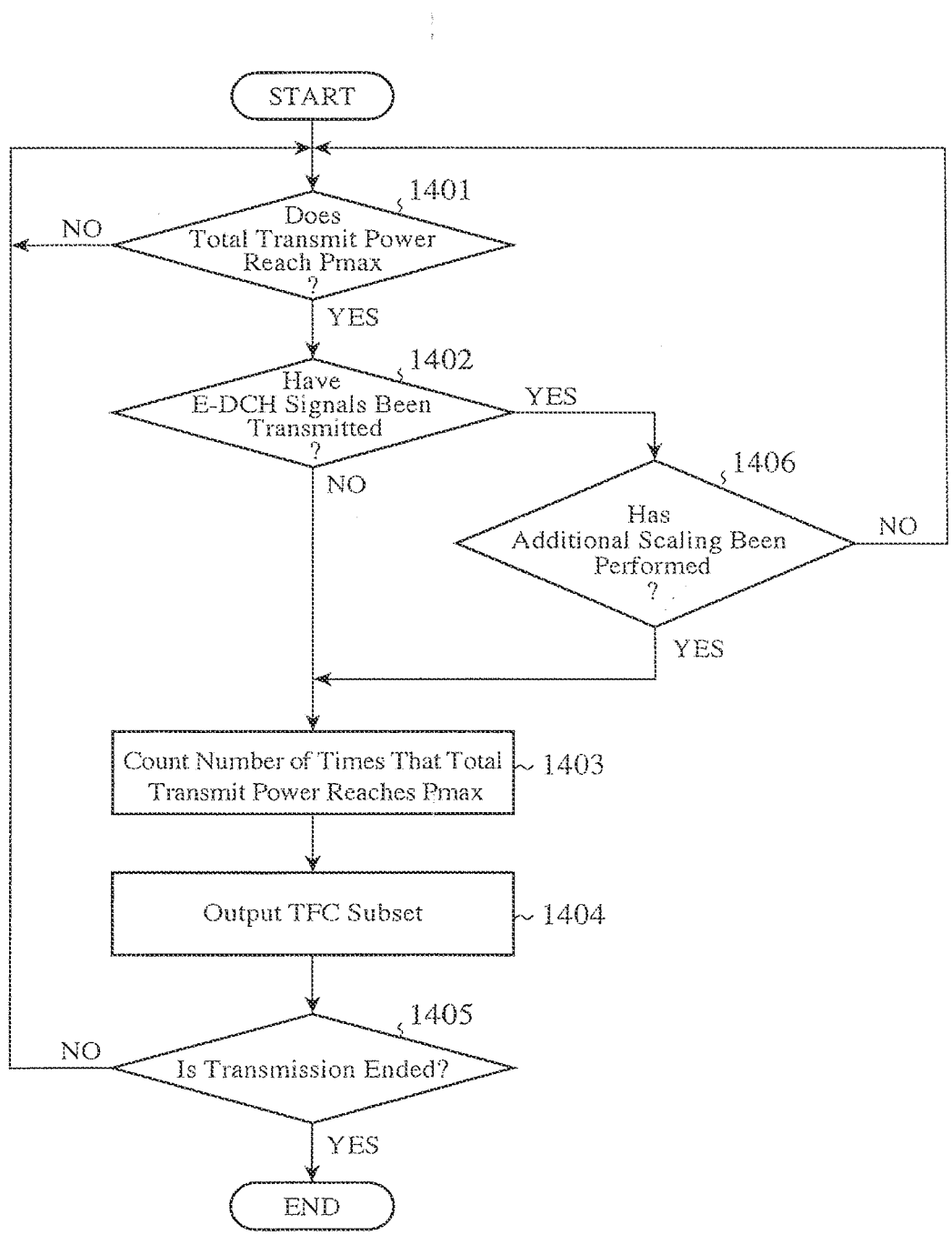
FIG. 14 is a flow chart showing a TFC state evaluation process carried out by a mobile station in accordance with embodiment 5 of the present invention.

FIG. 14 is a flow chart showing a TFC state evaluation process carried out by a mobile station in accordance with embodiment 5 of the present invention. The mobile station in accordance with this embodiment changes the TFC evaluation algorithm in the case of uplink DCH (or DPDCH) transmission, and reduces the influence of the transmission of E-DCH upon the TFC evaluation (TFC Evaluation) function, like that of above-mentioned embodiment 4. FIG. 14 shows a process which is carried out when an additional channel power scaling operation (Additional scaling) is applied when E-TFC data are transmitted.

Because steps 1401 to 1405 shown in FIG. 14 are the processes which are the same as or similar to those of steps 1201 to 1205 shown in FIG. 12, step 1406 will be explained mainly. Step 1406 is carried out when determining that the total transmit power reaches Pmax as a result of evaluating whether the total transmit power reaches the Pmax preset value on the basis of the total transmit power information (UE transmit power) inputted from the transmit power measurement/control unit 207 (i.e., if YES in step 1401), and E-DCH (E-DPDCH/E-DPCCH) data are transmitted (i.e., if YES in step 1402). Before actually transmitting, the mobile station, in step 1406, judges whether it has carried out the additional channel power scaling process (Additional scaling) when estimating that the total transmit power exceeds Pmax. When judging that the additional channel power scaling process has been carried out (i.e., if YES in step 1406), the mobile station shifts to step 1403 in which it increments a count for the TFC evaluation by one. In contrast, when judging that the additional channel power scaling process has not been carried out (i.e., if NO in step 1406), the mobile station returns to step 1401 in which it repeats the execution of the sequence of processes.

The mobile station calculates an estimated transmit power (i.e., an estimated UE transmit power) which the mobile station estimates when evaluating the E-TFC state in step 1404 of FIG. 14 by using the gain factors of DPDCH and DPCCH when no HS-DPCCH data are transmitted. In contrast, when HS-DPCCH data are transmitted, the mobile station calculates the estimated transmit power by using the gain factors of DPDCH and DPCCH, and the gain factor of HS-DPCCH. In either of the both cases, when E-DCH data are transmitted and the additional channel power scaling process is applied, the mobile station calculates the estimated transmit power by taking into consideration the gain factors of E-DPDCH and E-DPCCH, and by excluding the transmit powers of E-DPDCH and E-DPCCH from the total transmit power.

As mentioned above, by taking into consideration whether E-DCH data are transmitted, and whether the additional channel power scaling process (Additional scaling) is applied to the state evaluation of TFC, it can be reflected throughout the TFC evaluation only when the total transmit power may have exceeded greatly due to transmission of E-DCH data. Therefore, the influence of transmission of E-DCH data upon the TFC evaluation and TFC selection can be minimized, and the rule to give a higher priority to transmission of DCH data can be observed as much as possible. In the above-mentioned explanation, the state evaluation of TFC and TFC selection are described, though the present embodiment can be combined with either of the above-mentioned embodiments 1, 2 and 4. This variant can solve the problem with the addition of E-DCH, and can optimize the operation of the communications system.

Embodiment 6

Figure 15:
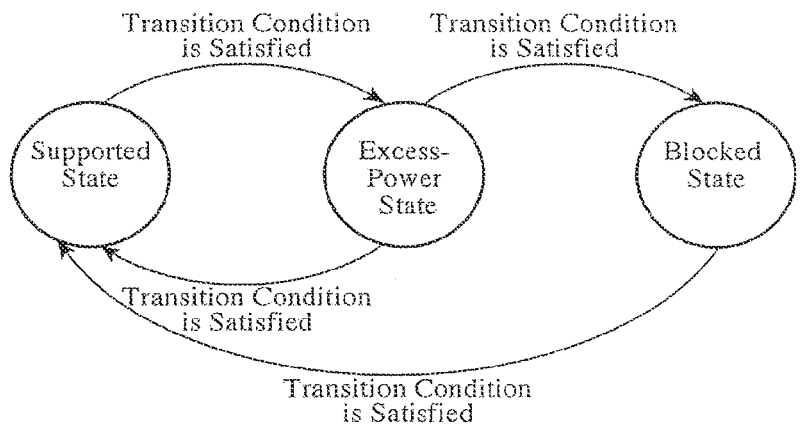
FIG. 15 is an explanatory diagram for explaining a state transition of E-TFC.

FIG. 15 is an explanatory diagram for explaining a state transition of E-TFC. In this embodiment, a state transition of E-TFC is a transition among the following three states: a "supported state" (Supported state), an "excess-power state" (Excess-power state), and a "blocked state" (Blocked state), and conditions for the state transition in an E-TFC state evaluation by the transmission setting evaluating unit 202 will be explained.

In FIG. 15, FIG. 15(a) is an explanatory diagram for explaining a state transition of E-TFC for reflecting a transmit power margin to the E-TFC evaluation, and FIG. 15(b) is a conceptual diagram showing a correspondence between E-TFC(I))s when an E-TFC selection is made and the states (Support, Excess-Power, and Block). In FIG. 15(b), assume that the smaller E-TFCI value, the lower transmission rate or the lower E-DPDCH, channel transmit power. In this embodiment, a case in which a minimum (E-TFC, min) is defined as an E-TFC. When no minimum is defined, all E-TFCs can be placed in any of the three states. Because any state transition of E-TFC is not defined by the 3GPP, the name of each of the states and the names of the transition conditions can be changed from now on. A transition among the three states: the "supported state" (Supported state), the "excess-power state" (Excess-power state), and the "blocked state" (Blocked state) is made when a transition reference ("Elimination criterion", "Blocking criterion", or "Recovery criterion") is satisfied. In advance of a start of communications via the E-DCH, the radio resource control unit 301 of the fixed station notifies, as initial settings, initial-state information (E-TFC state) indicating the Support state or the Block state, and E-TFCS (E-TFC Set) information to both the transmission rate control unit 303 of the fixed station and the transmission rate control unit 203 of the mobile station. Similarly, the notification to the mobile station is performed by using control information (an RRC signaling) which is piggybacked onto the downlink DPDCH 109 or a common channel (a well-known channel, though not illustrated in this embodiment). The mobile station 102 stores state information (E-TFC state), which it has read by demodulating the DPDCH or common channel (a well-known channel, though not illustrated in this embodiment) data which the receiving means (209 and 210) has received, in the radio resource control unit 201, and further stores it in the transmission setting evaluating unit 202 by way of the radio resource control unit 201. In this embodiment, assume that the state information is transmitted and received via the DPDCH.

As an alternative, the radio resource control unit 301 of the fixed station notifies E-DCH channel transmit power information (instead, channel power ratio information, gain factor information, gain factor ratio information, or the like is available) which the mobile station can use to the mobile station 102 so that the mobile station 102 can determine whether each E-TFC is placed in either the supported state (Support state) or the blocked state (Block state) using the above-mentioned E-TFCS information notified thereto. At the time of communications, an E-DCH scheduling functional block in the transmission rate control unit 303 of the fixed station carries out the scheduling. The transmission rate control unit 303 transmits scheduling result information (Sche_grant), via the downlink E-AGCH or E-RGCH, to the mobile station 102. As a method of expressing the scheduling result information (Sche_grant), (1) E-TFC(I) which complies with an available maximum rate, (2) E-DCH channel transmit power (dBm), (3) a channel power ratio (E-DPDCH power/DPCCH power or (E-DPDCH power+E-DPCCH power)/DPCCH power), (4) a gain factor (eu or βeu,eff), (5) a gain factor ratio (βeu/βc, βeu,eff/βc, or βeu/βd), or the like can be considered. In this case, assume that the channel power ratio shown in (3) which is power dimension information is notified to the mobile station. In performing the scheduling operation, the transmission rate control unit 303 of the fixed station does not carry out any specification of the excess-power state (Excess-power state).

The transmission setting evaluating unit 202 of the mobile station 102 monitors the total transmit power margin of the mobile station, and makes an additional decision of whether to make an E-TFC in the supported state (Support state) switch to the excess-power state (Excess-power state) by using both the gain factor ratio (βeu/βc) which is calculated from the channel power ratio included in the scheduling information (Sche_grant) notified from the fixed station, and the equivalent gain factor (βeu,eff) of E-DPDCH set up for each E-TFC. As a reference for judging whether to make an E-TFC in the supported state (Supported state) switch to the excess-power state (Excess-power state), there can be considered various methods including: (1) a method of counting the number of times that the total transmit power reaches Pmax, as in the case of prior art TFC, and changing it gradually (which can be assumed to be a kind of filtering (Filtering) operation); and (2) the method shown in either of embodiments 3 to 5 of the present invention. To the frequency of the updating of the state, (1) a method of updating the state for every TTI, (2) a method of updating the state for every slot, or the like can be applied. Furthermore, not only when the updating is carried out according to the scheduling, but also when an E-TFC continues being placed in the excess-power state (Excess-power state) during a predetermined time period, the E-TFC in the excess-power state can be switched to the blocked state (Blocked state).

When either a minimum E-TFC (E-TFC, min) or an E-TFC which complies with GBR is set up, an E-TFC having a transmission rate which is equal to or lower than that of the E-TFC is in the supported state (Supported state). A reference for making an E-TFC return from the transmit power excess state (Excess-power state) or the blocked state (Blocked state) to the supported state (Supported state) is decided by counting the number of slots in which the total transmit power does not exceed Pmax, as in the case of a prior art TFC state transition, or is decided according to a notification of the scheduling results. The updated E-TFC state information is outputted from the transmission setting evaluating unit 202 to the transmission rate control unit 203, and is applied from the time of the next E-TFC selection or after the expiration of a predetermined time interval.

As mentioned above, because the states to which an E-TFC can be made to switch are increased to the three states, the status of the total transmit power margin of the mobile station, as well as the scheduling results of the fixed station, can be made to take effect. As a result, the possibility that the total transmit power which is estimated to be required at the time of an E-TFC selection exceeds Pmax can be reduced. Therefore, the frequency with which the additional channel power scaling process (Additional scaling) is carried out can be reduced, and the influence upon transmission via other channels can be reduced. Particularly, because the frequency with which the channel transmit power (Eb/No) of DPCCH is insufficient decreases, the frequency of occurrence of out-of-synchronism in communications decreases and the communication quality is improved.

In the case of the E-DCH, as a TTI, 2 ms can be used instead of 10 ms which is the same as that for the DCH which complies with the conventional standards, and evaluation criteria (X, Y, and Z parameter values, as counter value settings, when the same state transition reference as that for TFCs of the DCH is used) can be changed between the case of 10 ms and the case of 2 ms. As an alternative, the evaluation criteria can be changed according to whether or not a handover is performed. Furthermore, in this embodiment, the evaluation criteria are not limited to above-mentioned X, Y and Z. In that case, initialization information which corresponds to the both is notified to the radio resource control unit 201 of the mobile station 102 in advance of the communications. This embodiment can be combined with either of above-mentioned embodiments 1 to 5, and this combination provides a more efficient communications system.

Embodiment 7

Figure 16:
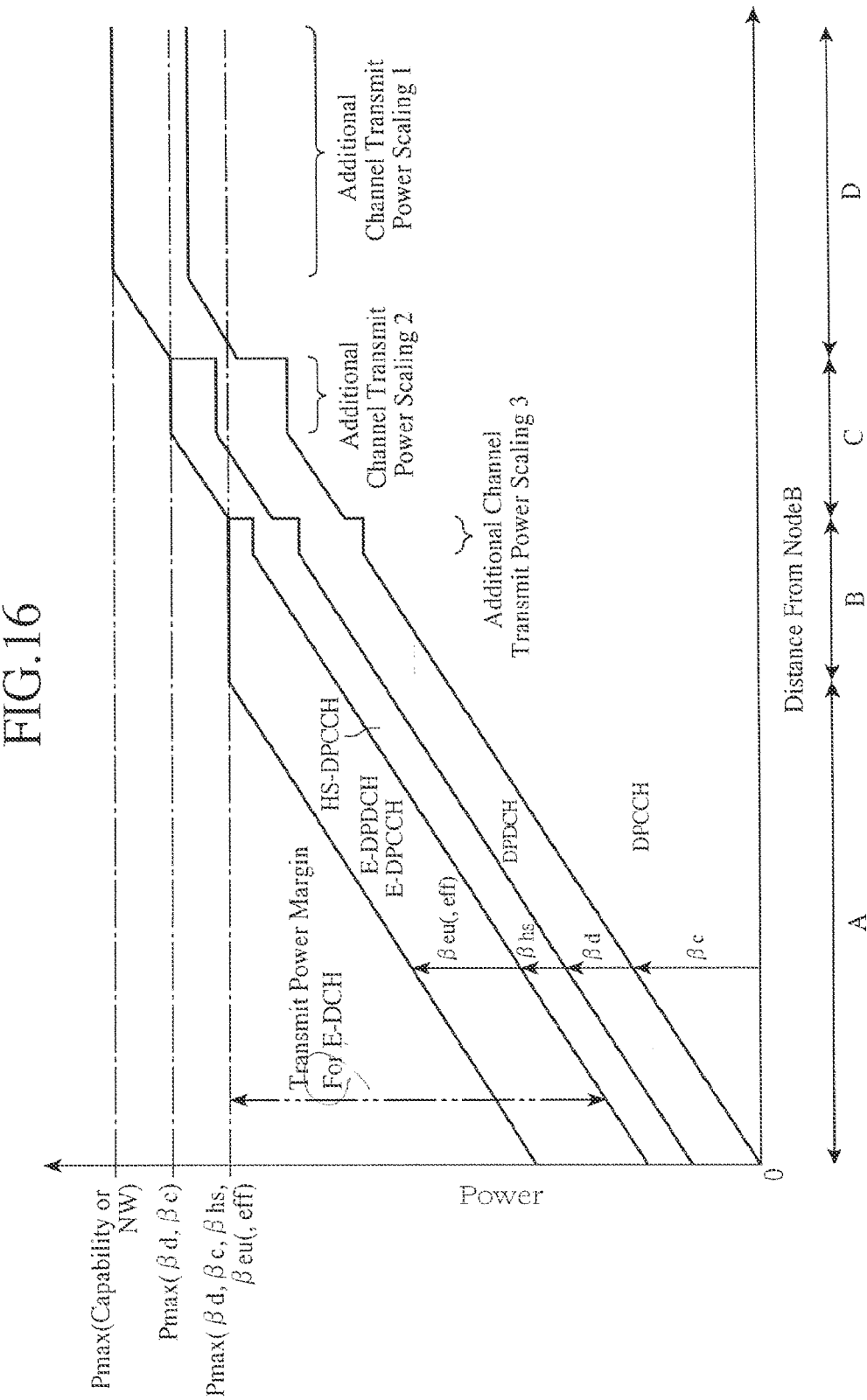
FIG. 16 is an explanatory diagram showing schematically the transmit power and the transmit power margin of each channel for explaining the definition of Pmax.

FIG. 16 is an explanatory diagram showing schematically the transmit power of each channel and the transmit power margin for explaining the definition of Pmax. Hereafter, a Pmax setting value and a reference which are used for an estimation (calculation) of the transmit power margin will be explained. In FIG. 16, Pmax (Capability or NW) shows either maximum transmit power which the mobile station can output within the limit of its capability, or a maximum transmit power setting which is specified by the radio resource control unit 301 of the fixed station. The mobile station cannot carry out transmission with total transmit power which exceeds either the maximum transmit power which the mobile station can output or the maximum transmit power setting which is specified by the fixed station. Pmax ($\beta$d, $\beta$c) of FIG. 16 is a Pmax specification in a case of transmitting data associated with the HS-DPCCH which is a channel for HSDPA, and is set to be a value lower than the above-mentioned Pmax (Capability) in the technical specification TS25.101. Pmax ($\beta$d, $\beta$c, $\beta$hs, $\beta$eu) of FIG. 16 is a Pmax specification in a case in which E-DCH data are transmitted. In this embodiment, as shown in FIG. 16, assume Pmax (Capability or NW)>Pmax ($\beta$d, $\beta$c)>Pmax ($\beta$d, $\beta$c, $\beta$hs, $\beta$eu). Like Pmax ($\beta$d and $\beta$c) at the time of HS-DPCCH transmission, Pmax can be a specification independent of the gain factor of the channel, and whether all the gain factors are included in Pmax is determined depending on the PAR (Peak to Average Ratio) and so on of the radio signal (RF_signal). As an alternative, different specifications can be provided for the time of transmission of channel data for E-DCH and for the time of non-transmission of channel data for E-DCH, respectively. These various Pmax value settings are defined by a technical specification, or are notified from the fixed station. In the conventional technology, Pmax (Capability) of Pmax (Capability or NW) and Pmax ($\beta$d, $\beta$c) are defined by the technical specification.

A channel power offset for the E-DPDCH which is determined from an HARQ profile can be included in the parameters. When a power offset is explicitly included in the parameters, Pmax is set to, for example, Pmax ($\beta$d, $\beta$c, $\beta$hs, $\beta$eu, $\Delta$poffset). When a power offset is implicitly included in the parameters, Pmax is set to, for example, Pmax ($\beta$d, $\beta$c, $\beta$hs, $\beta$eu,eff). In this embodiment, assume that a minimum (E-TFC, min) is specified as the E-TFC. It can be assumed that FIG. 16 shows a relation between a combination of channels at the time of transmission, and the Pmax specification. In FIG. 16, the vertical axis shows the transmit power and the horizontal axis shows a radio-wave-propagation distance from the fixed station. The transmit power of each channel shows a relative relation, and does not show any absolute magnitude. "Additional channel transmit power scaling 1" (Equally scaling 1) in FIG. 16 shows a region in which the additional channel transmit power scaling process (Additional scaling) is applied in a state in which DPDCH/DPCCH data are transmitted or in a state in which an HSDPA is set up, but no HS-DPCCH data are transmitted. At this time, DPDCH data are transmitted at the minimum transmission rate (TFC, min), and the total transmit power is limited to Pmax (Capability or NW) with the power ratio between the transmit power of DPDCH and that of another channel (DPCCH) being maintained.

"Additional channel transmit power scaling 2" (Equally scaling 2) shows a region in which the additional channel transmit power scaling process (Additional scaling) is applied in a state in which DPDCH/DPCCH/HS-DPCCH data are transmitted or in a state in which an E-DCH is set up, but no E-DPDCH/E-DPCCH data are transmitted. Because HS-DPCCH data are transmitted, the highest total transmit power is limited to Pmax ($\beta$d, $\beta$c) "Additional channel transmit power scaling 3" (Equally scaling 3) shows a region in which the additional channel transmit power scaling process (Additional scaling) is applied in a state in which DPDCH/DPCCH/HS-DPCCH/E-DPDCH/E-DPCCH data are transmitted. At this time, B-DPDCH data are transmitted at the minimum transmission rate (E-TFC, min). Because data associated with the channel for E-DCH are transmitted, the highest total transmit power is limited to Pmax ($\beta$d, $\beta$c, $\beta$hs, and $\beta$cu). As cases in which data are transmitted at the minimum transmission rate (E-TFC, min), there can be a case of a service, such as a voice call for which the guaranteed transmission rate (GBR) is set, and a case of transmitting important control information, such as an RRC signaling. In the case of E-DCH transmission, a non-scheduling mode (autonomous mode) in which data can be transmitted at an arbitrary TTI timing and with an arbitrary E-TFC within the limits of allocation of an allowable radio resource different from the results of scheduling for channels, such as E-AGCH/E-RGCH, as in the case of DCH is examined, and it is possible to use the non-scheduling mode for the above-mentioned GBR transmission and so on.

Figure 17:
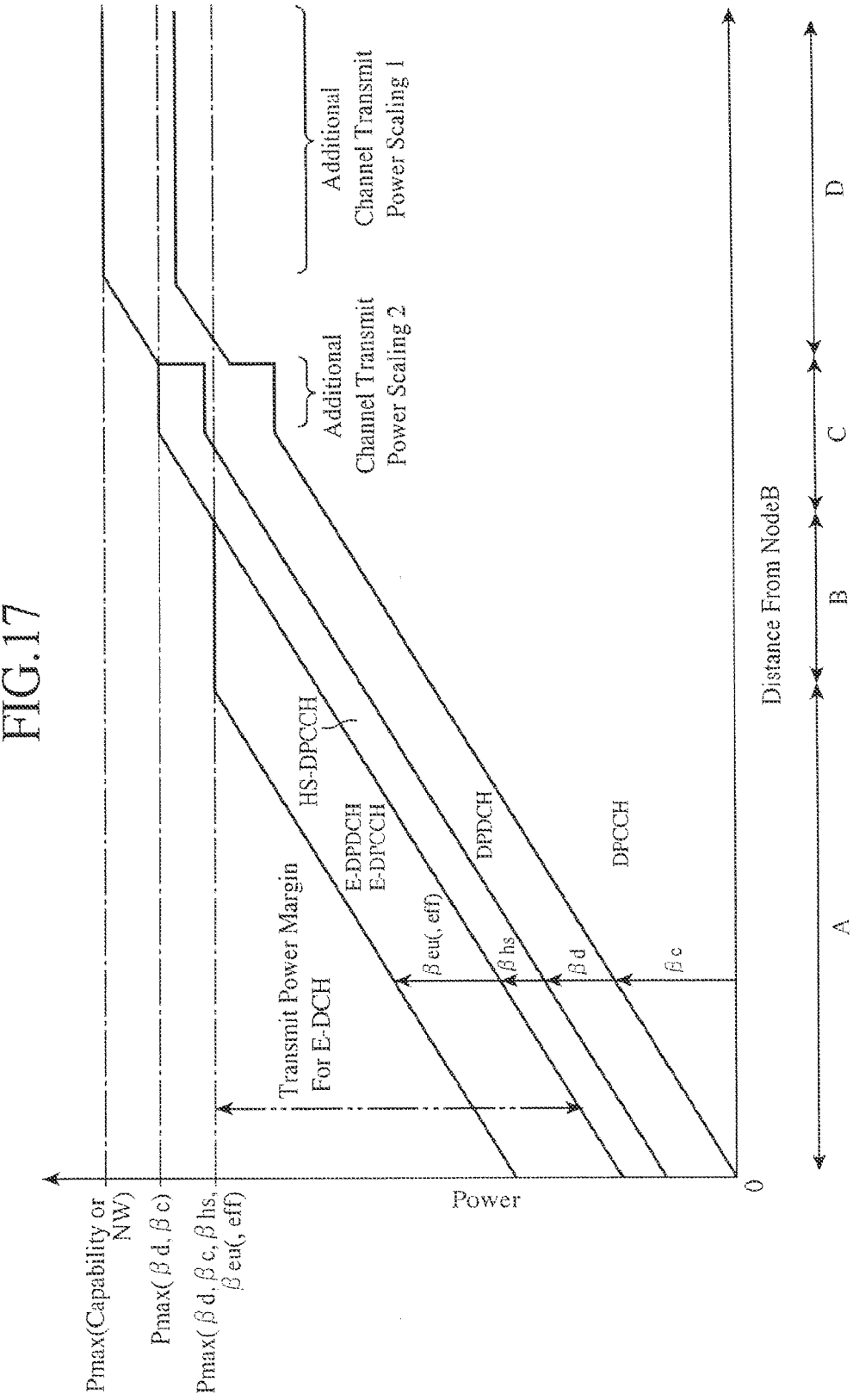
FIG. 17 is an explanatory diagram showing schematically the transmit power and the transmit power margin of each channel for explaining the rule of Pmax.

In a status in which the mobile station moves away from the fixed station while transmitting data by using all the uplink channels, the transmit powers of all the channels are increased with distance from the fixed station because the transmit powers are controlled through the closed-loop transmit power control operation to ensure the power (properly speaking, Eb/No) in the receive antenna of the fixed station. In the region A shown in FIG. 16, although data are transmitted by using all the channels, the total transmit power reaches neither of the Pmax values. In the region B, the total transmit power reaches the Pmax specification (Pmax($\beta$d, $\beta$c, $\beta$hs, $\beta$eu)) at the time of the E-DCH transmission setting. Because a higher priority is given to transmission of E-DCH than to transmission of DCH and data associated with the channel for E-DCH are transmitted within the limit of the transmit power margin, only the transmit power of the channel for E-DCH decreases as the mobile station moves away from the fixed station. The decrease in the transmit power of the channel for E-DCH means that the transmission rate (E-TFC) of E-DCH decreases, and, when the transmission rate reaches the minimum (E-TFC, min) set up for non-scheduling mode transmission and GBR setting services, the additional channel power scaling operation (Additional scaling) is applied. When no minimum is set up, the state "Equally scaling 3" does not occur in the region B, as shown in FIG. 17. At the time of an E-TFC selection performed in units of TTI, because an E-TFC is selected so that the total transmit power falls within the limit of the transmit power margin, ideally, no additional channel power scaling operation is carried out. However, depending on the estimation method of estimating the transmit power margin, the mobile station may enter a state different from that at the time of an E-TFC selection under the influence of a measurement delay etc. In this case, the additional channel power scaling operation may be performed according to how the mobile station is implemented. On the other hand, because transmit power control (what is called TPC: Transmit power control) in units of slot is performed during a TTI time interval, the required total transmit power may exceed the maximum transmit power specification of the mobile station, and the additional channel power scaling operation takes place theoretically. Although it is possible to scale only the channel transmit power of E-DPDCH per slot, the mobile station does not carry out the scaling because re-calculation of the power ratio with the powers of other channels is needed and therefore the control of the mobile station becomes complicated, but performs an additional channel power scaling process of scaling all the channels.

The minimum (E-TFC, min) is a rate requirement, and, in a case in which the scheduling result information notified from the fixed station, via E-AGCH/E-RGCH, to the mobile station is not a value associated with a rate, such as an E-DPDCH channel power ratio (i.e., a power offset), the rate setting is the minimum (E-TFC, min), though transmission may be carried out after the transmit power of the E-DCH channel has decreased to zero (0) according to the status of the transmit power margin (refer to FIG. 17). This is set up according to the requirements of the 3GPP standards which give a higher priority to DCH transmission (DPDCH transmission) than to E-DCH transmission (E-DPDCH transmission). The fixed station can determine whether to carry out the additional channel power scaling operation or whether the data to be transmitted are the target for the additional channel power scaling operation, and can notify the result of the determination to the mobile station through RRC signaling so as to control the mobile station's operation.

In a region C, channel data other than data associated with the channel for E-DCH are transmitted, and HS-DPCCH data are transmitted. In this region, because the total transmit power reaches the Pmax specification (Pmax($\beta$d, $\beta$c, $\beta$hs, $\beta$eu)) only with transmission of the channel data other than the data associated with the channel for E-DCH, the mobile station cannot afford to transmit E-DCH data. Because HS-DPCCH data are transmitted, Pmax is limited by Pmax ($\beta$d, $\beta$c) lower than Pmax (Capability or NW). Because the minimum rate (TFC, min) is set up for DCH, when the total transmit power reaches Pmax ($\beta$d, $\beta$c), the additional channel power scaling operation (Additional scaling) is applied. A region D is the one in which channel data other than E-DCH data are transmitted, but no HS-DPCCH data are transmitted. In this region, because no HS-DPCCH data are transmitted, Pmax (Capability or NW) is applied as the Pmax specification. Because the minimum rate (TFC, min) is set for DCH, when the total transmit power reaches Pmax (Capability or NW), the additional channel power scaling operation (Additional scaling) is applied.

Hereafter, a change in the transmit channel configuration in the state in where the channel for E-DCH is set up, i.e., a transition from the region D to the region B in FIG. 16 will be examined. E-DCH transmission is carried out within the limit of the total transmit power margin. The total transmit power margin is estimated (calculated) as a value which is a subtraction of the sum total power of the channels (DPDCH/DPCCH/HS-DPCCH) except the channel for E-DCH from either of the above-mentioned Pmax specifications. If the Pmax specification which is used for the estimation (calculation) of the transmit power margin is set to Pmax (Capability or NW), in a state in which no data associated with the channel for E-DCH are transmitted (in the region D), the transmit power margin is sufficient because the transmit power margin is defined from Pmax (Capability or NW). Because the total transmit power must be limited to Pmax ($\beta$d, $\beta$c, $\beta$hs, $\beta$eu) when the mobile station shifts to a state (for example, the region B) in which it transmits E-DCH data, and is going to transmit data by using the channel for E-DCH, the probability of carrying out the additional channel power scaling operation (Additional scaling) becomes large. Because DPCCH is physically used for the securing of synchronization with the fixed station etc., the reduction of the channel power of DPCCH can be an issue. For this reason, as the Pmax specification which is used for the estimation (calculation) of the transmit power margin in the case in which E-DCH is set up, the smallest Pmax or Pmax (for example, Pmax ($\beta$d, $\beta$c, $\beta$hs, $\beta$eu)) which is defined for use at the time of E-DCH transmission is used (see a chain double-dashed arrow shown in FIG. 16).

Also in the region A, as the Pmax specification which is used for the estimation (calculation) of the transmit power margin, the smallest Pmax or Pmax which is defined for use at the time of E-DCH transmission, in this embodiment Pmax ($\beta$d, $\beta$c, $\beta$hs, $\beta$eu) is used. Therefore, by using, in the region A, the same Pmax specification as that in the region B for the estimation (calculation) of the transmit power margin, the mobile station performs a consistent operation even if it makes a transition from the state of the region A to the state of the region B. In the regions C and D, as the transmit power margin, either (1) a negative power margin value which is based on either the smallest Pmax or the Pmax which is defined for use at the time of E-DCH transmission or (2) a zero (0) value can be defined. In the case of (1), the transmission setting evaluating unit 202 updates the E-TFC state so that the reference for switching to the Block state is whether the transmit power margin is zero or a negative value. In contrast, in the case of (2), the reference for switching to the Block state is whether or not the transmit power margin is zero.

As mentioned above, the smallest Pmax or Pmax which is defined for use at the time of an E-DCH transmission setting is used for the calculation of the transmit power margin in the case of transmission of data associated with the channel for E-DCH, and, a Pmax value which is used for the control of the maximum transmit power and a Pmax value which is used for the estimation (calculation) of the transmit power margin are defined separately. Therefore, the present embodiment offers an advantage of being able to reduce the influence upon the prior art channels, thereby ensuring the communication quality. Since a mobile station which can set up E-DCH is so constructed as to use a different Pmax specification according to a combination of channels at the time of data transmission, the needless use of the radio resources can be reduced.

In this embodiment, the transmit power margin is expressed in the dimension of power. In a case in which the notification method of notifying the scheduling results from the fixed station is one of the following methods: (1) a method of notifying a gain factor (expressed in dB or true-value); (2) a method of notifying a ratio of gain factors (such as $\beta$eu/$\beta$c or $\beta$eu,eff/$\beta$c, expressed in dB or true-value); and (3) a method of notifying a power ratio (expressed in dB or true-value), the transmit power margin can be expressed in the same form. As a result, the present embodiment offers an advantage of eliminating the necessity to unite the dimensions at the time of the evaluation of the E-TFC state, thereby simplifying the control of the mobile station. This embodiment can be combined with either of above-mentioned embodiments 1 to 7, and this combination provides a more efficient communications system.

As the timing or time interval at or during which the transmission setting evaluating unit 202 defines the transmit power margin, there are (1) a margin of the last slot of a TTI which is located immediately before TTIs in which data are actually transmitted; (2) an average of margins of all the slots of a TTI which is located before TTIs in which data are actually transmitted; (3) an average of margins of several slots which are located before TTIs in which data are actually transmitted; (4) an estimated value in the first slot of TTIs in which data are actually transmitted, the value being estimated in consideration of the closed-loop transmit power control; and (5) an estimated value in several slot of TTIs in which data are actually transmitted, the value being estimated in consideration of the closed-loop transmit power control. An optimal method is selected depending on how the mobile station is implemented or according to the definitions of the technical specification. In the case of (1), because the status of the transmit power margin at a time immediately before the transmission can be taken into consideration, uplink radio resources can be used more efficiently. In the case of (2), an average operation excluding variations in a TTI can be carried out, an improper E-TFC can be selected because of instantaneous variations in units of a slot in the E-TFC selection for every TTI. In the case of (3), the E-TFC state can be changed with a variation during a long time period (for example, a change in the propagation loss caused by a change in the distance from the base station, or the like). In the case of (4) or (4), by taking into consideration the status of the closed-loop transmit power control, and by performing the E-TFC evaluation and the E-TFC selection in consideration of the tendency of future variations, the uplink radio resources can be used more efficiently. The transmission timing of the above-mentioned slots is synchronized with the slot timing of the uplink DCHs (DPDCH and DPCCH). Similarly, the update of the E-TFC is also carried out at the timing of TTIs which is synchronized with the slot timing of the DCHs (DPDCH and DPCCH) As the averaging method, there are (1) an arithmetic average, (2) a weighted average, (3) a geometric average, etc., and one of these averaging methods is selected depending on how the mobile station is implemented, or is defined by the standards.

FIG. 18 is a table showing a RAB setting in the W-CDMA communications system. FIG. 18 shows another example of the specifications of a protocol structure at the time of including power parameters into the E-TFC, like FIG. 11 explained in embodiment 1. In FIG. 11, an HARQ profile is set up also for every high order data. In contrast, in FIG. 18, an HARQ profile is set up for each of data dedicated channels (DTCH and DCCH) A case in which the DTCH and DCCH are assigned to different MAC-d flows, respectively, and both the MAC-d flows are further multiplexed into the E-DCH will be shown. For this reason, a set of HARQ profiles is set up in each of an upper table which defines the DTCH and a middle table which defines the DCCH. As a parameter of each E-TFC setting of a lower table of TFCS, a power offset is included. FIG. 19 is a table showing a RAB setting in the W-CDMA communications system. FIG. 19 shows another example of the specifications of a protocol structure at the time of including power parameters into the E-TFC, like FIG. 11 explained in embodiment 1. In FIG. 11, an HARQ profile is set up also for every high order data. In contrast, in FIG. 19, a case in which the same priority is given to all the channels (DTCH and DCCH) and all data are multiplexed into the same MAC-d flow is shown. Because data associated with channels with the same priority are multiplexed into the same MAC-d flow, one set of HARQ profiles is set up for all E-TFCs and is described in the lower table of TFCS.

FIG. 20 is an explanatory diagram for explaining another example of a transition between the states of an E-TFC in this embodiment, and FIGS. 20(b) and 20(c) are conceptual diagrams each showing a correspondence between E-TFC(I) and states (Support state and Block state). Unlike FIG. 15 explained in embodiment 6, FIG. 20 shows a case in which the transmit power margin is reflected in the E-TFC evaluation when setting up two states, and others shown in this figure are the same as those of FIG. 15. As in the case of FIG. 15, the state of each E-TFC varies when transition conditions are satisfied. Examples of how to reflect the status of the transmit power margin in the case of a transition between the two states are shown in FIGS. 20(b) and 20(c). In FIG. 20(b), a case in which while each state (Support or Block state) is determined with the scheduling result information, the blocked (Block) state is determined from supported states (Support) on the basis of the status of the transmit power margin is shown. In the example of FIG. 20(b), because the transmit power margin is smaller than an E-TFC which is permitted from the scheduling result information, an E-TFC whose channel transmit power is smaller than that at the blocked state (Block) which is determined from the scheduling result information is also placed in the blocked state. On the other hand, in FIG. 20(c), a case in which the supported (Support) state is determined from blocked states (Block) on the basis of the status of the transmit power margin is shown. In the example of FIG. 20(c), because the transmit power margin is larger than an E-TFC which is permitted from the scheduling result information, an E-TFC whose channel transmit power is larger than that at the supported state (Support) which is determined from the scheduling result information is also placed in the blocked state. It takes much time for the fixed station to monitor the amount of data, transmission state, interference level, and so on of each mobile station, and notifies the scheduling result information to each mobile station. For this reason, these pieces of information may not correctly reflect the status of the transmit power margin of each mobile station at the time immediately before an actual transmission timing. By reflecting the transmit power status, as well as the scheduling result, in the E-TFC evaluation, as shown in FIG. 20, a more efficient communications system can be provided.

FIG. 21 is a table showing an example of the specifications of the maximum transmit power. Concrete expression examples of the setting of the maximum transmit power (Pmax) explained in embodiment 7 are shown in FIG. 21. FIG. 21(a) shows an example in which the maximum transmit power is set up according to a mobile station transmit power capability (Power Class), FIG. 21(b) shows an example in which the maximum transmit power is set up depending on the gain factor (βeu), FIG. 21(c) shows an example in which the maximum transmit power is set up depending on the transmission rate (which is proportional to the spreading factor and the number of E-DPDCHs), and FIG. 21(d) shows an example in which the maximum transmit power is set up depending on the presence or absence of transmission using DPDCH channel. In the example of FIG. 21(a), because the maximum transmit power is defined only by the mobile station capability (UE Capability) (i.e., Pmax (Capability)) which is defined by the technical specification (TS25.101) regardless of the configuration of channels via which data are simultaneously transmitted, the maximum transmit power can be specified by the fixed station other than the specifications. Furthermore, in the example of FIG. 21(a), because the minimum (dBm), including the specifications of the conventional standards, is set up for each class, the configuration of channels via which data are simultaneously transmitted does not have any influence upon the estimation of the transmit power margin, as explained with reference to FIG. 16. In the example of FIG. 21(b), the maximum transmit power is applied to a case in which data associated with the channel for E-DCH are transmitted at the same time when data associated with other channels are transmitted, while the conventional specifications are applied to a case in which no data associated with the channel for E-DCH are transmitted at the same time when data associated with other channels are transmitted. In the example of FIG. 21(c), because the maximum transmit power is set up according to a category which is decided by the spreading factor (SF) and the number of E-DP-DCHs, it can be set up in consideration of the level of backoffs (i.e., a difference with Pmax (Capability) defined by the mobile station capability), a required backoff level varying as the PAR (Peak to Average) of the transmit signal (RF_signal) varies according to the SF and the number of E-DPDCHs. In the case of FIG. 21(d), because the maximum transmit power is set up according to the presence or absence of DPDCH transmission, it can be set up in consideration of the amount of backoffs which is assumed to be needed from variations in the PAR due to DPDCH transmission. In the case of FIG. 21(a), the current Pmax specification is used as Pmax at the time of the E-DCH setting (or at the time of transmission), and the value of an immediately-above class (Power class) with larger power can be defined and used as Pmax at the time of E-DCH non-setting (or at the time of non-transmission).

In above-mentioned embodiments 1 to 7, the method of the transmission setting evaluating unit 202 estimating (or calculating) the transmit power margin, the transmit power control unit 207 estimating (or calculating) the total transmit power, and notifying it to the transmission setting evaluating unit 202 as the total transmit power information (UE transmit power) is applied. As an alternative, the transmit power control unit 207 can estimate (or calculate) the transmit power margin, and notify it to the transmission setting evaluating unit 202 as transmit power margin information (not shown). This embodiment can be combined with either of above-mentioned embodiments 1 to 6, and this combination provides a more efficient communications system.

The calculation of the transmit power margin can be carried out by using Pmax (Capability or NW) and the difference (what is called backoff) between Pmax (Capability or NW) and Pmax ($\beta d$, $\beta c$, $\beta hs$, $\beta eu$), instead of directly using Pmax ($\beta d$, $\beta c$, $\beta hs$, $\beta eu$). Furthermore, a second transmit power margin can be defined as the difference between Pmax (Capability or NW) and Pdpcch, and Pmax ($\beta d$, $\beta c$, $\beta hs$, $\beta eu$) or the backoff can be taken into consideration in the E-TFC selection. In this case, the second transmit power margin information is notified to the scheduling functional block of the fixed station. The fixed station can monitor the transmit power margin of all the channels for data transmission from the mobile station, including the channel power of DCH. Therefore, a more efficient communications system can be provided.

Embodiment 8

Figure 22:
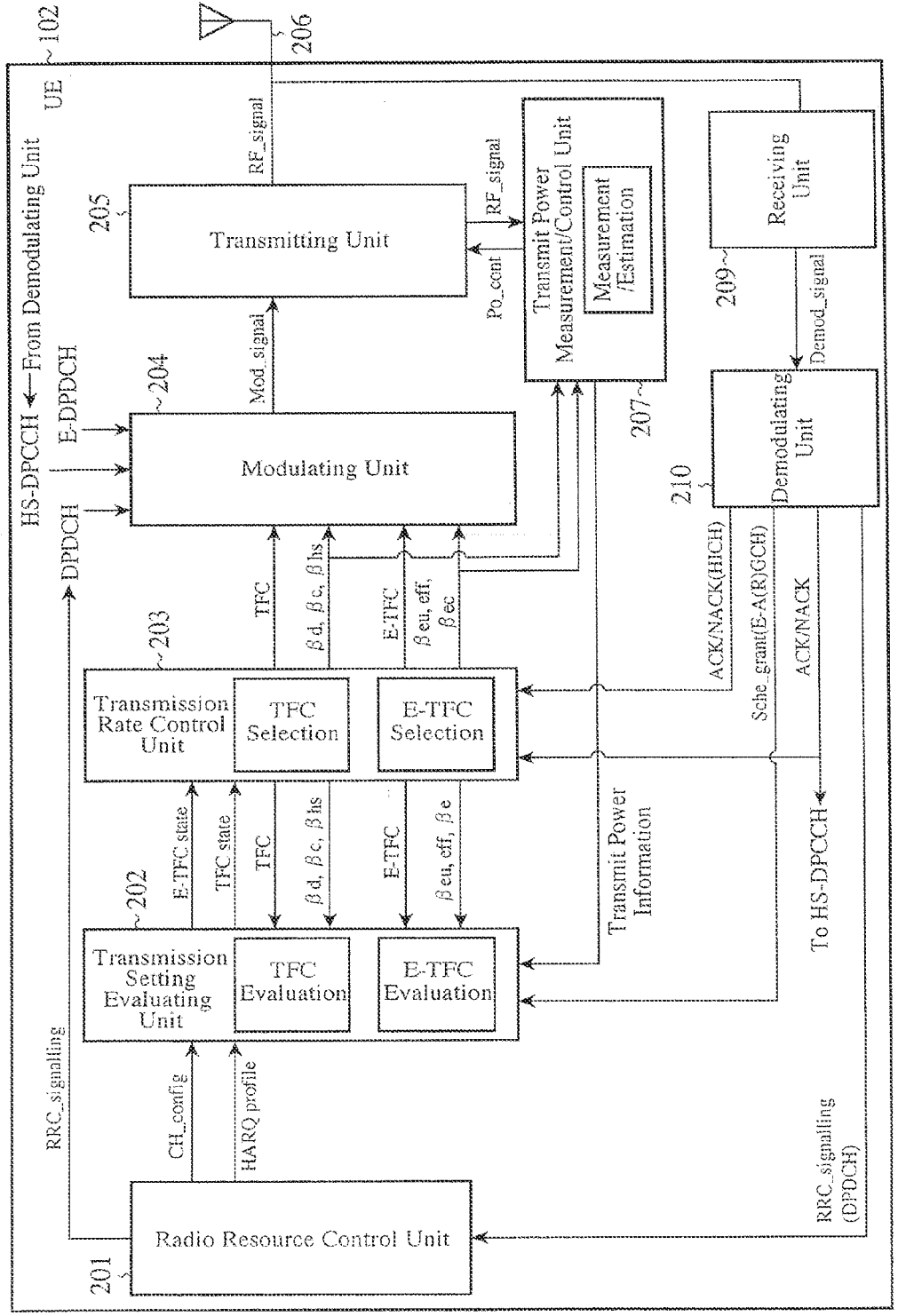
FIG. 22 is a block diagram showing the structure of a mobile station in accordance with embodiment 8 of the present invention.
Figure 23:
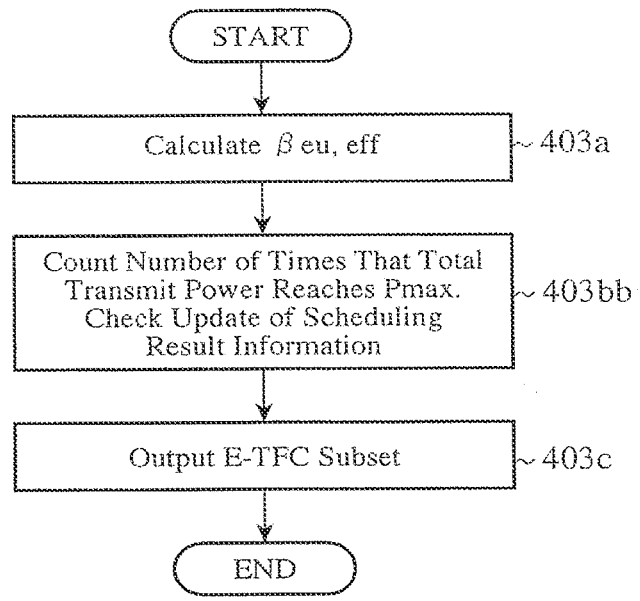
FIG. 23 is a flow chart for explaining a process of evaluating the state of an E-TFC.

FIG. 22 is a block diagram showing the structure of a mobile station in accordance with embodiment 8 of the present invention. The structure of the mobile station differs from that of the mobile station of embodiment 1 shown in FIG. 2 only in that the scheduling result information (Sche_grant) outputted from the demodulating unit 210 is inputted to the transmission setting evaluating unit 202, instead of the transmission rate control unit 203. In other words, in the E-TFC evaluation, both the transmit power information and the scheduling result information are used. In the following explanation, the explanation of the other blocks will be omitted. In embodiment 1, as shown in FIGS. 15 and 20, at the time of the E-TFC selection, whether a certain E-TFC can be selected is determined from both the excess-power state (Excess power) which is decided by the transmit power margin, and the supported state (Support)/blocked state (Block) which is decided by the scheduling result information (Sche_grant). In contrast, in this embodiment, the E-TFC evaluation block also uses the scheduling result information, and the transmission setting evaluating unit 202 determines all the states. In the E-TFC selection, the transmission rate control unit 203 arbitrarily selects an E-TFC from among E-TFCs placed in the supported state (Support) on the basis of the E-TFC state information. At this time, the transmission rate control unit selects an E-TFC with which data with a high priority are transmitted at a higher speed. FIG. 23 is a flow chart for explaining a process of evaluating the state of an E-TFC in this embodiment. This flow chart differs from that for explaining the process of evaluating the state of an E-TFC in accordance with embodiment 1 shown in FIG. 6 only in that in step 403bb, an update of the scheduling result information, as well as a process of counting the number of times that the total transmit power reaches Pmax, are carried out. Thus, the state of each E-TFC is updated. Because the other steps are the same as those shown in FIG. 6, the explanation of the steps will be omitted. As previously explained, the transmission rate control unit 203 can carry out the E-TFC selection by using only the E-TFC subset information. Therefore, the present embodiment offers an advantage of being able to simplify the implementation of the transmission control. The transmission setting evaluating unit 202 can perform the process of counting the number of times that the total transmit power reaches Pmax in the E-TFC evaluation by taking into consideration whether the additional channel scaling operation is performed. The consideration of whether the additional channel scaling operation is performed is not limitedly applied to this embodiment, but can also be applied to the other embodiments.

Embodiment 9

Figure 24:
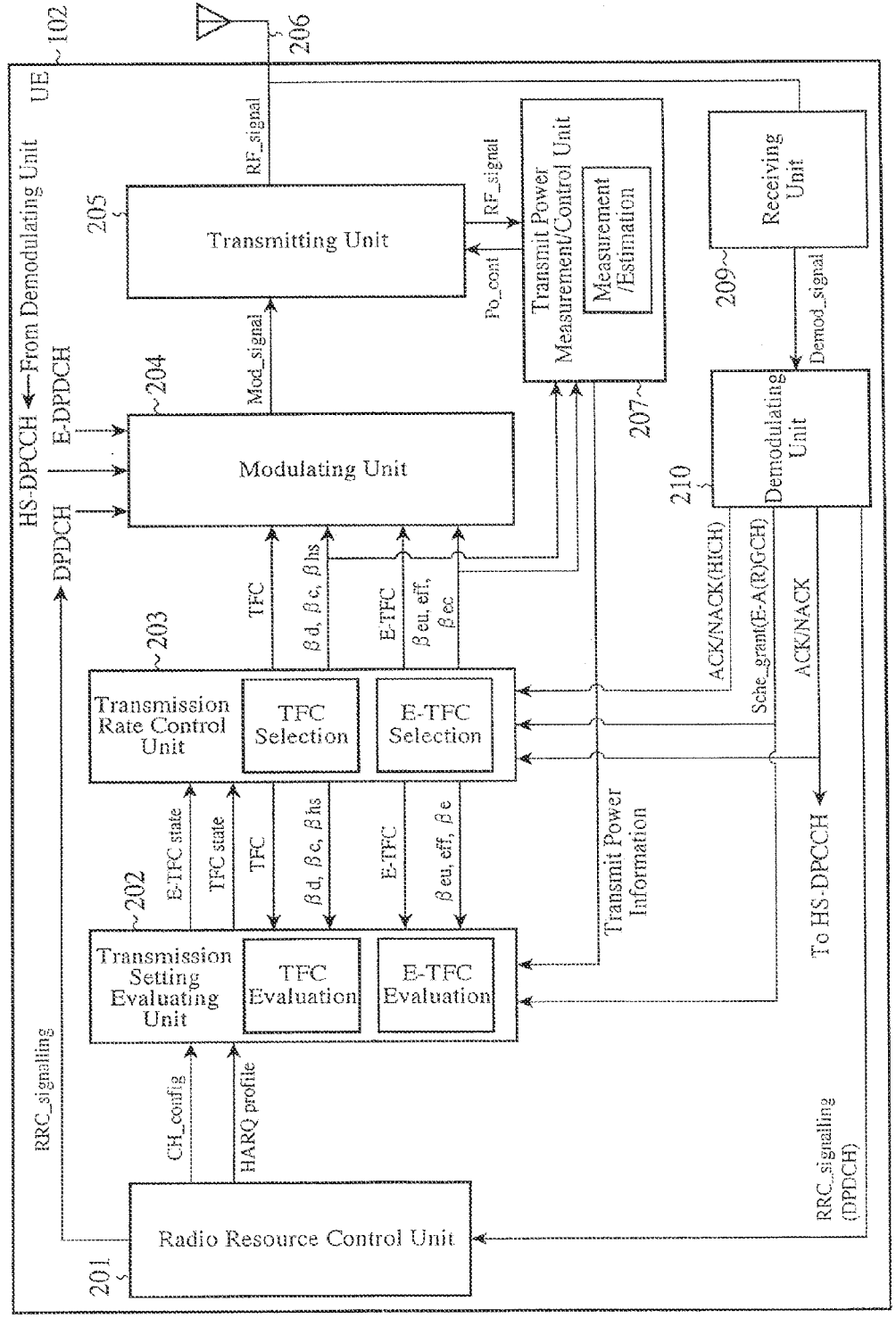
FIG. 24 is a block diagram showing the structure of a mobile station in accordance with embodiment 9 of the present invention.

FIG. 24 is a block diagram showing the structure of a mobile station in accordance with embodiment 9 of the present invention. The structure of the mobile station differs from that of the mobile station of embodiment 1 shown in FIG. 2 only in that the scheduling result information (Sche_grant) outputted from the demodulating unit 210 is inputted also to the transmission setting evaluating unit 202, as well as to the transmission rate control unit 203. In the following explanation, the explanation of the other blocks will be omitted. In this embodiment, the state of a final E-TFC which is required at the time of the E-TFC selection is determined by the transmission setting evaluating unit 202, as shown in above-mentioned embodiment 8, though a delay occurs due to the filtering, as explained in embodiment 6. While the E-TFC evaluation is carried out by using the method of above-mentioned embodiment 8, the scheduling result information (Sche_grant) is inputted also to the transmission setting evaluating unit 202 and is reflected in the E-TFC selection, and therefore the E-TFC selection which reflects the scheduling result information (Sche_grant) received immediately before the selection can be performed. Therefore, the scheduling result information which is transmitted from the base station immediately before the E-TFC selection is done can be reflected in the E-TFC selection. As a result, the present embodiment offers an advantage of being able to make the E-TFC selection reflect the scheduling with less delay. In the E-TFC selection, while the state of each E-TFC (and E-TFC subset) which is determined by the transmission setting evaluating unit 202 is not changed, the scheduling result information is reflected only in the E-TFC selection operation. As an alternative, the state of each E-TFC can be changed also in the E-TFC selection.

Embodiment 10

Figure 25:
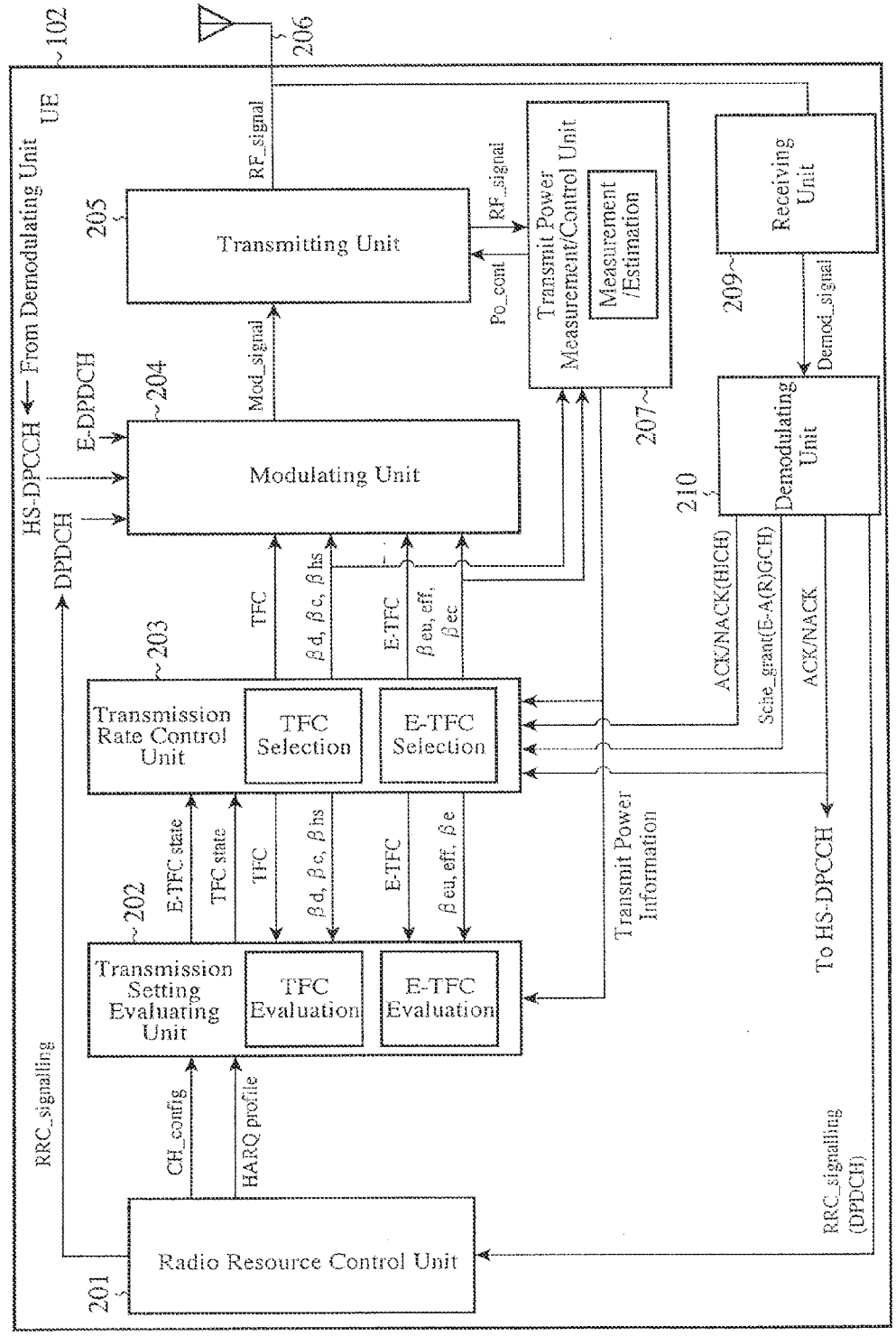
FIG. 25 is a block diagram showing the structure of a mobile station in accordance with embodiment 10 of the present invention.

FIG. 25 is a block diagram showing the structure of a mobile station in accordance with embodiment 10 of the present invention. The structure of the mobile station differs from that of the mobile station of embodiment 1 shown in FIG. 2 only in that the transmit power information (UE transmit power) outputted from the transmit power measurement/control unit 207 is inputted also to the transmission rate control unit 203, as well as to the transmission setting evaluating unit 202. In other words, the status of the transmit power margin is also reflected in the E-TFC selection. In the following explanation, the explanation of the other blocks will be omitted. In this embodiment, the transmit power information (UE transmit power) is used for the E-TFC selection by the transmission rate control unit 203. For example, by performing a measurement (or an estimation) of the transmit power even in units of slot, and by also using information about transmit power control (TPC) which is performed in units of slot for the E-TFC selection, the status of the transmit power margin at a time immediately before the E-TFC selection can be reflected in the E-TFC selection and an E-TFC which enables more efficient use of radio resources can be selected.

Embodiment 11

FIG. 26 is a block diagram showing the structure of a mobile station in accordance with embodiment 11 of the present invention. The structure of the mobile station differs from that of the mobile station of embodiment 1 shown in FIG. 2 only in that both the transmit power information (UE transmit power) and the scheduling result information (Sche_grant) are inputted to both the transmission setting control unit 202 and the transmission rate control unit 203. In other words, in both the E-TFC state evaluation and the E-TFC selection, both the transmit power information (UE transmit power) and the scheduling result information (Sche_grant) are used. In the following explanation, the explanation of the other blocks will be omitted. This embodiment offers an advantage as provided by above-mentioned embodiments 8 to 11 with a combination of the methods of using the transmit power information and the scheduling result information.

Embodiment 12

Next, control of DCH transmission by a mobile station 102 will be explained with reference to the block diagrams of FIGS. 1 to 3 and the flows of FIGS. 27 and 28. FIG. 27 is a flow chart for explaining a process of controlling transmission of DCH in accordance with embodiment 12 of the present invention. The operation shown in this flow chart is defined by the conventional standards. The shown flow, except step 2702, can be assumed to be the same as that of the E-DCH transmission control explained with reference to FIG. 4 of the first embodiment, by substituting "DCH" for "E-DCH" and also substituting "TFC" for "E-TFC". The fundamental operation of the mobile station complies with the technical specification (release 5) shown in Background of the Invention. In this embodiment, what can be explained with the substitution in the above-mentioned embodiments and the same explanation as that in Background of the Invention will be omitted hereafter, and therefore different blocks and different operations will be explained below. In prior art DCH transmission control, the total transmit power required for transmission of all the channels (DPDCH, DPCCH, and HS-DPCCH) in the past TFC selection is estimated when an operation of checking requested transmit channel power of step 2702 is performed. Next, in step 2703, the number of times that the above-mentioned estimated total transmit power has exceeded Pmax (Capability or NW) is counted and is filtered (using X, Y, and Z parameters), and the state (supported state, excess-power state, or blocked state) of each TFC is evaluated. In this embodiment, the E-TFC evaluating operation is performed in the same way that the prior art E-TFC evaluating operation is performed, and there is no necessity to perform such a change as shown in embodiments 3, 4 and 5. The E-TFC evaluating operation is not based on this embodiment.

Figure 28:
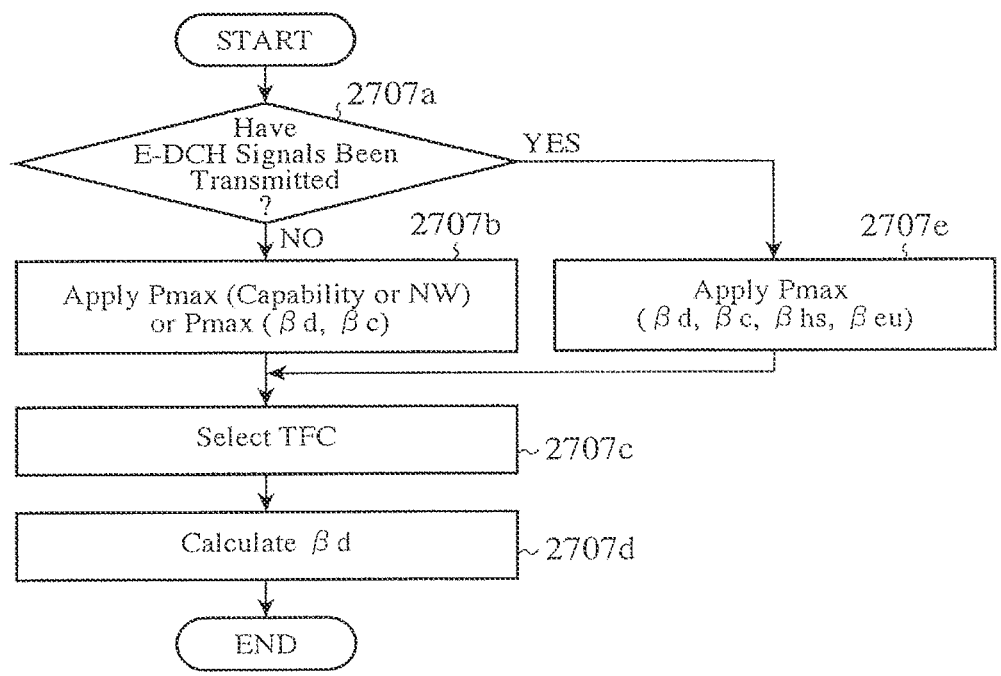
FIG. 28 is the flow chart explaining the details of a TFC selection step for DCH.

A detailed flow of TFC selection step 2707 for DCH of the TFC selecting function of the transmission rate control unit 203 is shown in FIG. 28. In this embodiment, the presence or absence of channel transmission for E-DCH is taken into consideration at the time of the TFC selection. First, the transmission rate control unit checks to see whether E-DCH is set up and E-DCH data are transmitted in parallel with DCH data (step 2707*a*). When no E-DCH data are transmitted (i.e., if NO), the transmission rate control unit, in step 2707*b*, applies either Pmax (Capability or NW) or Pmax (βd, βc) as the maximum transmit power limit according to the presence or absence of transmission of HS-DPCCH data in the same way as the conventional technology, in step 2707*c*, selects a TFC, and, in step 2707*d*, determines id. In contrast, when E-DCH data are transmitted in step 2707*a* (i.e., if YES), the transmission rate control unit, in step 2707*e*, replaces the maximum transmission limit value with Pmax (βd, βc, βhs, βeu). The maximum transmission limit does not necessarily need to be replaced by Pmax (βd, βc, βhs, βeu). For example, the maximum transmission limit can be replaced by a margin preset value which is set up depending on the gain factor of E-DCH. Next, the transmission rate control unit, in step 2707*c*, selects a TFC similarly. As mentioned above, the present embodiment offers an advantage of being able to, by taking the presence or absence of transmission of E-DCH data into consideration, instead of the TFC evaluation, in the TFC selection process, promptly transmit E-DCH data to the base station with a high degree of reliability by reducing the DCH transmit power or the transmission rate exceptionally, thereby reducing the DCH transmit power, in the case of non-scheduling transmission of E-DCH data.

Embodiment 13

Figure 29:
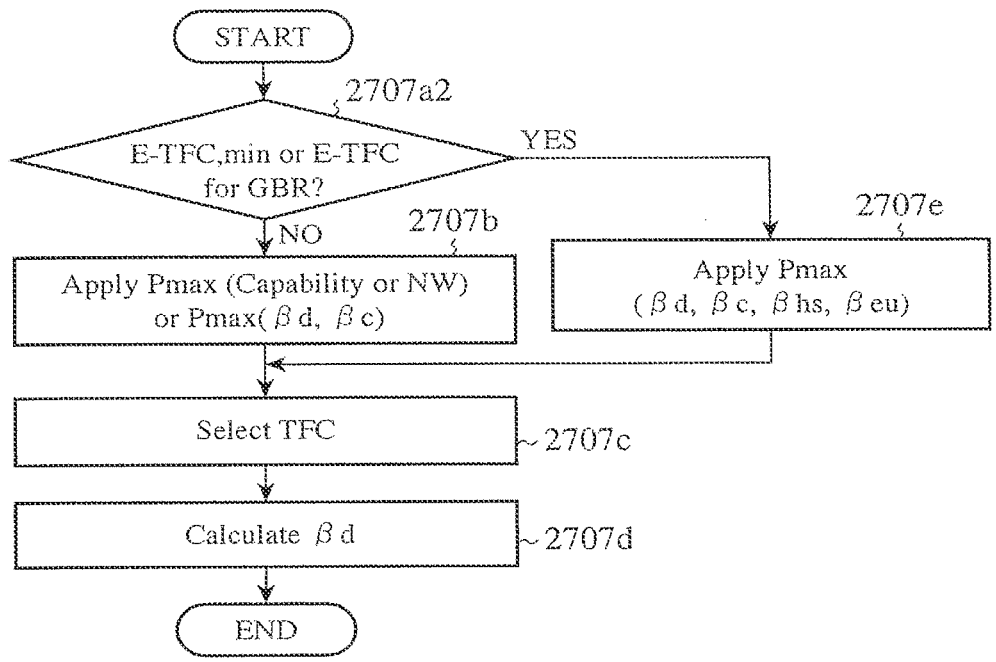
FIG. 29 is a diagram showing a detailed flow chart of TFC selection step 2707 in accordance with embodiment 13 of the present invention.

FIG. 29 is a diagram showing a detailed flow chart of TFC selection step 2707 in accordance with embodiment 13 of the present invention. Because a flow chart of whole TFC transmission control is the same as that shown in FIG. 27, the explanation of the flow chart will be omitted hereafter. This embodiment differs from above-mentioned embodiment 12 in that in step 2707*a*2, either an E-TFC, min or an E-TFC corresponding to a GBR service is taken into consideration at the time of the TFC selection. The TFC evaluation process is evaluated on the basis of Pmax (Capability or NW) in the same way as the conventional technology. As mentioned above, in step 2707 at the Lime of the TFC selection, by taking into consideration either an E-TFC, min or an E-TFC corresponding to a GBR service, it is taken into consideration at the time of the DCH selection in a case in which uplink radio resources for data transmission secured in E-DCH need to be ensured. Therefore, important data, such as RRC signaling information, which require the setting of a delay request can be piggybacked onto the E-DCH, DCH transmission which requires securing of radio resources does not need to be carried out, and an efficient use of the uplink radio resources can be made. Also in this embodiment, the maximum transmission limit does not necessarily need to be replaced by Pmax (βd, βc, βhs, βeu). For example, the maximum transmission limit can be replaced by a margin preset value which is set up depending on the gain factor of E-DCH.

Embodiment 14

Figure 30:
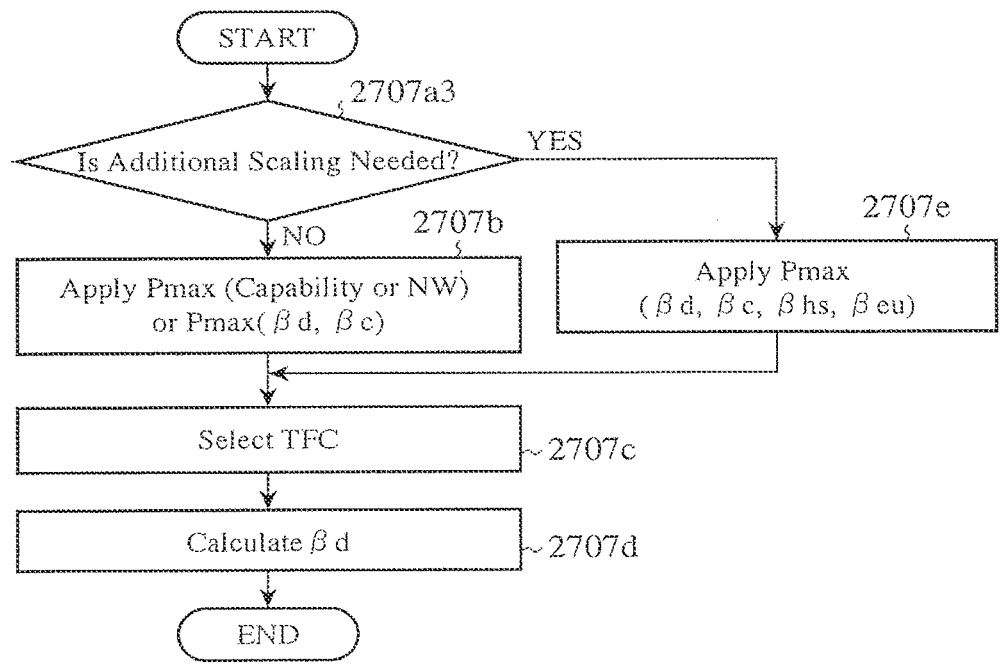
FIG. 30 is a diagram showing a detailed flow chart of TFC selection step 2707 in accordance with embodiment 14 of the present invention.

FIG. 30 is a diagram showing a detailed flow chart of TFC selection step 2707 in accordance with embodiment 14 of the present invention. In this embodiment, an additional channel scaling operation is taken into consideration at the time of the TFC selection. Because the flow chart of whole TFC transmission control is the same as that shown in FIG. 27, the explanation of the flow chart will be omitted hereafter. This embodiment differs from above-mentioned embodiment 12 in that in step 2707*a*3, whether an additional channel scaling is required is taken into consideration at the time of the TFC selection. In the E-TFC selection for E-DCH, on the basis of information about the actual transmit power margin value or estimated value previously or immediately before the selection, the transmission rate and the transmit channel power are determined within the limit of the transmit power margin value for every TTI. However, because of an error which occurs in the determination of the transmit power margin and an error caused by a delay from the timing of the margin value determination, there is a possibility that the estimated channel transmit power of the selected E-TFC exceeds the transmit power margin at an actual transmission timing. At the time of retransmission of data, because the transmission rate is not changed, though the transmit power is controlled so as to fall within the limit of the transmit power margin, there is the same possibility that the estimated channel transmit power of the selected E-TFC exceeds the transmit power margin at an actual transmission timing. In such a case, a method of counting the number of times that the additional channel scaling is performed, or the like is used and reflected in the TFC selection for DCH transmission. Therefore, as the total transmission control of the mobile station, reduction of the frequency of performing the additional channel scaling operation and reduction of the degradation in the link quality due to shortage of the channel electric power of DPCCH can be carried out. Also in this embodiment, the maximum transmission limit does not necessarily need to be replaced by Pmax (βd, βc, βhs, βeu). For example, the maximum transmission limit can be replaced by a margin preset value which is set up depending on the gain factor of E-DCH. The method of making the TFC selection reflect the channel scaling is not limited to the one based on the counting of the number of times.

INDUSTRIAL APPLICABILITY

The present invention can be applied to all aspects of mobile communication terminal equipment including a mobile phone which works in a radio communications system based on the 3GPP standards.

The invention claimed is:

1. A method of transmitting data from a mobile station to a fixed station via a first uplink dedicated physical data channel and a second uplink dedicated physical data channel, said method comprising:
    estimating a transmit power margin which is a transmit power to be assigned to the transmission of the second uplink dedicated physical data channel based on a maximum transmit power value configured by the fixed station, wherein the maximum transmit power value is lower than a value indicating a power capability of the mobile station;
    evaluating a state of candidate E-TFCs (E-DCH (Enhanced Dedicated Channel) Transport Format Combination) when setting the data transmission via said second uplink dedicated physical data channel by using the estimated transmit power margin;
    selecting one of E-TFC to be used for the data transmission via said second uplink dedicated physical data channel from said candidates, by using scheduling result information controlling the transmission of said second uplink dedicated physical data channel and a result of the evaluation; and
    transmitting said data to said fixed station with transmit power calculated based on the selected E-TFC.

2. The method of claim 1, further comprising scaling the calculated transmit power.

3. The method of claim 2, wherein the calculated transmit power is scaled when an estimated total transmit power exceeds the configured maximum transmit power value.

4. The method of claim 1, wherein the mobile station operates in accordance with a wideband code division multiple access standard.

5. The method of claim 1, wherein the fixed station is a node B which operates in accordance with a wideband code division multiple access standard.

6. A mobile station which transmits data to a fixed station using a first uplink dedicated physical data channel and a second uplink dedicated physical data channel, wherein said mobile station is configured to:
    estimate a transmit power margin which is a transmit power to be assigned to the transmission of the second uplink dedicated physical data channel based on a maximum transmit power value configured by the fixed station, wherein the maximum transmit power value is lower than a value indicating a power capability of the mobile station;
    evaluate a state of candidate E-TFCs (E-DCH (Enhanced Dedicated Channel) Transport Format Combination) when setting the data transmission via said second uplink dedicated physical data channel, by using the estimated transmit power margin;
    select one of E-TFC to be used for the data transmission via said second uplink dedicated physical data channel from said candidates, by using scheduling result information controlling the transmission of said second uplink dedicated physical data channel and a result of the evaluation; and
    transmit said data to said fixed station with transmit power calculated based on the selected E-TFC.

7. The mobile station of claim 6, further configured to scale the calculated transmit power.

8. The mobile station of claim 7, wherein the calculated transmit power is scaled when an estimated total transmit power exceeds the configured maximum transmit power value.

9. The mobile station of claim 6, wherein the mobile station operates in accordance with a wideband code division multiple access standard.

10. The mobile station of claim 6, wherein the fixed station is a node B which operates in accordance with a wideband code division multiple access standard.

11. A communication system, comprising:
    a mobile station which transmits data using a first uplink dedicated physical data channel and a second uplink dedicated physical data channel, wherein said mobile station comprises is configured to:
    estimate a transmit power margin which is a transmit power to be assigned for transmission of the second uplink dedicated physical data channel based on a maximum transmit power value configured by the fixed station, wherein the maximum transmit power value is lower than a value indicating a power capability of the mobile station;

evaluate a state of candidates for E-TFCs (E-DCH (Enhanced Dedicated Channel) Transport Format Combination) when setting the data transmission via said second uplink dedicated physical data channel, by using the estimated transmit power margin estimated in said transmit power margin estimating unit;

select one of E-TFCs to be used for the data transmission via said second uplink dedicated physical data channel from said candidates, by using scheduling result information controlling the transmission of said second uplink dedicated physical data channel regarding to a maximum amount and a result of the evaluation;

transmit said data with transmit power calculated based on the selected E-TFC; and a fixed station configured to transmit a response signal indicating a result of reception of a signal transmitted from said mobile station, and said scheduling result information indicating a result of a process of scheduling said second uplink dedicated physical data channel to said mobile station.

12. The communication system of claim 11, wherein said mobile station is further configured to scale the calculated transmit power.

13. The communication system of claim 12, wherein the calculated transmit power is scaled when an estimated total transmit power exceeds the configured maximum transmit power value.

14. The communication system of claim 11, wherein the mobile station operates in accordance with a wideband code division multiple access standard.

15. The communication system of claim 11, wherein the fixed station is a node B which operates in accordance with a wideband code division multiple access standard.

* * * * *